US012537288B2

(12) United States Patent
Suh et al.

(10) Patent No.: US 12,537,288 B2
(45) Date of Patent: Jan. 27, 2026

(54) ANTENNA MODULE IMPLEMENTED IN MULTI-LAYER PACKAGE AND ELECTRONIC DEVICE COMPRISING THE SAME

(71) Applicant: LG ELECTRONICS INC., Seoul (KR)

(72) Inventors: Yusuhk Suh, Seoul (KR); Dongik Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 18/755,500

(22) Filed: Jun. 26, 2024

(65) Prior Publication Data

US 2025/0070450 A1 Feb. 27, 2025

(30) Foreign Application Priority Data

Aug. 25, 2023 (KR) ........................ 10-2023-0112089

(51) Int. Cl.

| | |
|---|---|
| ***H01Q 1/22*** | (2006.01) |
| ***H01Q 1/48*** | (2006.01) |
| ***H01Q 1/50*** | (2006.01) |
| ***H01Q 9/04*** | (2006.01) |
| ***H01Q 21/24*** | (2006.01) |

(52) U.S. Cl.

CPC ............. *H01Q 1/2283* (2013.01); *H01Q 1/48* (2013.01); *H01Q 1/50* (2013.01); *H01Q 9/0414* (2013.01); *H01Q 21/24* (2013.01)

(58) Field of Classification Search

CPC .......... H01Q 1/2283; H01Q 1/38; H01Q 1/48; H01Q 1/52; H01Q 9/0414; H01Q 21/0025; H01Q 21/0075; H01Q 21/06; H01Q 21/24; H01Q 25/00

See application file for complete search history.

(56) References Cited

U.S. PATENT DOCUMENTS

| | | | | |
|---|---|---|---|---|
| 11,228,120 B2 * | 1/2022 | Song | ...................... | H01Q 1/243 |
| 11,276,926 B2 * | 3/2022 | Yun | ........................ | H01Q 1/243 |
| 11,322,832 B2 * | 5/2022 | Jong | ...................... | H01Q 1/243 |
| 2025/0253520 A1 * | 8/2025 | Jo | .......................... | H01Q 21/08 |

* cited by examiner

*Primary Examiner* — Hasan Islam

(74) *Attorney, Agent, or Firm* — LEE, HONG, DEGERMAN, KANG & WAIMEY

(57) ABSTRACT

An antenna module implemented as a multi-layered package includes: a printed circuit board (PCB) having a plurality of layers; a radio frequency integrated circuit (RFIC) disposed on a first surface among outermost surfaces of the PCB; a first array antenna disposed on a second surface, perpendicular to the first surface, among the outermost surfaces of the PCB; a second array antenna disposed on a third surface, perpendicular to the first and second surfaces, among the outermost surfaces of the PCB; and a third array antenna disposed on a fourth surface, perpendicular to the second and third surfaces, among the outermost surfaces of the PCB. First to third signal lines connected to the first to third array antennas form first to third coplanar waveguide structures in which first to third ground regions are formed, respectively.

22 Claims, 25 Drawing Sheets

(a)

(b)

(a)

(b)

(c)

(a)

(b)

(c)

ANTENNA MODULE IMPLEMENTED IN MULTI-LAYER PACKAGE AND ELECTRONIC DEVICE COMPRISING THE SAME

CROSS-REFERENCE TO RELATED APPLICATION

Pursuant to 35 U.S.C. § 119(a), this application claims the benefit of earlier filing date and right of priority to Korean Patent Application No. 10-2023-0112089, filed on Aug. 25, 2023, the contents of which are hereby incorporated by reference herein in its entirety.

TECHNICAL FIELD

The present disclosure relates to a multi-layer circuit type antenna package for millimeter wave band communication. Additionally, the present disclosure relates to an electronic device having an antenna module in the form of a multi-layer circuit type antenna package.

BACKGROUND ART

Millimeter wave (mmWave) band communication method, which is being developed to transmit GBps-level high-speed, large-capacity AV data, can transmit large-capacity data several times faster than existing short/mid-range communication methods such as WiFi, WLAN, WPAN, etc.

This millimeter wave band communication method, unlike the existing short/mid-range communication methods, is very difficult to be implemented in a manner of connecting an antenna and an RFIC, which are separately provided, with a cable. In the millimeter wave band, a signal attenuation phenomenon is dozens of times higher than those in existing commercial frequency bands. In addition, a signal cable dedicated to the millimeter wave band is typically a major obstacle to the commercialization of 60 GHz communication modules, due to unit prices reaching up to tens of dollars. Therefore, in the millimeter wave band, a technology for designing antenna and package are required to dispose an antenna and an RFIC within the shortest distance, to suppress signal loss and attenuation.

As the related art technology for implementing a millimeter wave band antenna/package, a technology of embedding an antenna and a stripline or microstrip type signal transmission line in a multi-layer circuit and electrically connecting the same to an RFIC is widely used. This method implements a transverse electro magnetic (TEM) mode required for a wideband signal line, thereby widening a bandwidth required in the millimeter wave band.

The multi-layer circuit type using the stripline or microstrip is an ideal way for realizing antenna performance. However, in the case of a stripline, a signal line is disposed on a middle layer and ground layers are disposed above and below the signal line, so at least three layers are required. Additionally, in the case of a microstrip, at least two layers are required, including a layer where a signal line is disposed and a ground layer disposed above or below the signal line. Therefore, when designing a multi-layer circuit by combination of antenna, RF interface, inner cavity, power line, etc., the number of layers stacked reaches approximately 7 to 10 layers. In the case of a low temperature co-fired ceramic (LTCC) process that implements this, it needs high production costs, which is an obstacle to the commercialization of the millimeter wave communication technology.

SUMMARY

An aspect of the present disclosure is to provide a structure that minimizes the number of stacked layers as a multi-layer circuit type antenna package for millimeter wave band communication.

Another aspect of the present disclosure is to provide a structure that minimizes a signal phase difference for each patch in a patch array antenna structure for millimeter wave band communication.

Still another aspect of the present disclosure is to provide an antenna module that is capable of transmitting signals to front, bottom, and side regions while being implemented at a low height.

Another aspect of the present disclosure is to provide a structure that minimizes signal interference between a plurality of array antennas.

In order to achieve these and other advantages and in accordance with the purpose of this specification, as embodied and broadly described herein, there is provided an antenna module implemented as a multi-layered package, the antenna module including: a PCB having a plurality of layers; a radio frequency integrated circuit (RFIC) disposed on a first surface among outermost surfaces of the PCB; a first array antenna disposed on a second surface, perpendicular to the first surface, among the outermost surfaces of the PCB; a second array antenna disposed on a third surface, perpendicular to the first and second surfaces, among the outermost surfaces of the PCB; and a third array antenna disposed on a fourth surface, perpendicular to the second and third surfaces, among the outermost surfaces of the PCB. First to third signal lines connected to the first to third array antennas may form first to third coplanar waveguide structures in which first to third ground regions are formed, respectively.

According to an embodiment, the first surface and the fourth surface may form opposing surfaces. The second surface and the third surface may be formed between the first surface and the fourth surface. The plurality of layers may include a plurality of ground layers and layers in which a plurality of coplanar waveguides are disposed. The plurality of layers may be stacked from a first layer to a twelfth layer, the first surface may form one surface of the first layer among the plurality of layers, and the second layer forming a first ground layer, among the plurality of ground layers, may be formed on a surface opposite to the first surface of the first layer.

According to an embodiment, the third layer stacked on the second layer may have a first coplanar waveguide, the first coplanar waveguide may have a first signal line and a first ground region, and the first signal line and the first ground region may be electrically connected to the first array antenna. The fourth layer stacked on the third layer may form a second ground layer, the fifth layer stacked on the fourth layer may have a second coplanar waveguide, the second coplanar waveguide may have a second signal line and a second ground region, and the second signal line and the second ground region may be electrically connected to the second array antenna.

According to an embodiment, the sixth layer stacked on the fifth layer may form a third ground layer, the seventh layer stacked on the sixth layer may have a third coplanar waveguide, the third coplanar waveguide may have a third signal line and a third ground region, and the third signal line and the third ground region are electrically connected to the third array antenna. A plurality of fourth ground layers and a plurality of non-metal regions formed in inner regions of the plurality of fourth ground layers may be disposed on eighth to twelfth layers stacked on the seventh layer. The third array antenna may be disposed in the non-metal region of the twelfth layer.

An electronic device according to another aspect of the present disclosure may include: a display panel that displays images and information; a communication module that wirelessly receives signals for the images and information from an external device, the communication module including a transceiver circuitry and first, second, and third antenna resonating elements; a controller that converts the signals received from the communication module and provides the converted signals to the display panel; a first coplanar waveguide that is configured to transmit the signals at frequencies of 10 GHz to 300 GHz between the transceiver circuitry and the first antenna resonating element; a second coplanar waveguide that is configured to transmit the signals at the frequencies of 10 GHz to 300 GHz between the transceiver circuitry and the second antenna resonating element; and a third coplanar waveguide that is configured to transmit the signals at the frequencies of 10 GHz to 300 GHz between the transceiver circuitry and the third antenna resonating element.

According to an embodiment, the first coplanar waveguide may be interposed between the second coplanar waveguide and the transceiver circuitry, the second coplanar waveguide may be interposed between the first coplanar waveguide and the third coplanar waveguide, and the third coplanar waveguide may be interposed between the second coplanar waveguide and the third antenna resonating element. The first antenna resonating element may be disposed between the second coplanar waveguide and the transceiver circuitry, the second antenna resonating element may be disposed between the first coplanar waveguide and the second coplanar waveguide, and the third antenna resonant elements may be disposed on an opposite side of the transceiver circuitry.

According to an embodiment, the controller may measure signal strength when the signals received from the external device are received in the first, second, and third antenna resonating elements, select an antenna resonating element with the highest signal strength, and control the selected antenna resonating element to receive the signal.

The above-mentioned multi-layered circuit type antenna package presents a structure that can wirelessly transmit broadband signals by minimizing the number of stacks.

The above-described multi-layered circuit type antenna package has low loss during signal transmission and is economical in process cost.

The above-described multi-layered circuit type antenna package can minimize interference between a plurality of array antennas of different structures through a disposition structure of an antenna module in which coplanar waveguides are stacked to be separated from each other by a plurality of ground layers.

Further scope of applicability of the present disclosure will become apparent from the following detailed description. It should be understood, however, that the detailed description and specific examples, such as the preferred embodiments of the present disclosure, are given by way of illustration only, since various modifications and alterations within the spirit and scope of the disclosure will be apparent to those skilled in the art.

DETAILED DESCRIPTION OF THE EMBODIMENTS

A description will now be given in detail of specific embodiments of the present disclosure, together with drawings.

Hereinafter, a description will be given in more detail of embodiments related to the present disclosure, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

A video/audio (hereinafter referred to as A/V) transmitting device according to an embodiment of the present disclosure, which is, for example, an intelligent device in which a computer support function is added to a broadcast receiving function, may have an easier-to-use interface such as a handwriting input device, a touchscreen, or a spatial remote controller as an Internet function is added thereto while thoroughly performing the broadcast receiving function.

Furthermore, the A/V transmitting device may be connected to the Internet and a computer with the support of a wired or wireless Internet function to perform functions such as e-mailing, web browsing, banking, or gaming. A standard general-purpose OS may be used to perform these various functions.

Accordingly, various applications may be freely added to or deleted from a general-purpose OS kernel, for example, thereby allowing the A/V transmitting device described therein to perform various user-friendly functions.

Figure 1:
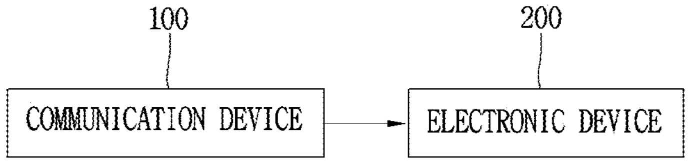
FIG. 1 is a diagram explaining a configuration of a wireless display system according to an embodiment of the present disclosure.

FIG. 1 is a diagram explaining a configuration of a wireless display system according to the present embodiment.

Referring to FIG. 1, a wireless display system according to an embodiment of the present disclosure includes a communication device 100 and an electronic device 200.

The wireless display system may be a system in which the communication device 100 wirelessly transmits A/V data to the electronic device 200 and the electronic device 200 outputs the A/V data.

The communication device 100 may be a device capable of encoding video and audio and wirelessly transmitting the encoded video and audio content.

An example of the communication device 100 may be an all-in-one (AIO) box capable of transmitting data, and may be, for example, a set-top box.

Another example of the communication device 100 may be connected to an external device such as a set-top box or a USB memory. The communication device 100 may transmit a video signal or an audio signal received from an external device connected thereto to the electronic device 200.

The electronic device 200 may be a display device capable of wirelessly receiving the encoded video and audio, and decoding the received video and audio.

The communication device 100 and the electronic device 200 may constitute a video wall display system.

In a video wall, a display having a thin bezel plays an important role in the visualization of video content. In order to efficiently implement a thin bezel, it is efficient to provide only components that can play a minimal role in the display, and to perform circuits or components for major functions in a separate device.

The communication device 100 may determine a type of video content and determine a compression rate of the video content based on the determined type. The compression rate of the video content may be defined as a ratio between a size of video data before encoding and a size of video data after encoding.

The type of video content may include a still image type, a general video type, and a game video type.

The communication device 100 may compress the video content according to the determined compression rate, and wirelessly transmit the compressed video content to the electronic device 200.

The electronic device 200, which may be, for example, a display device, may restore the compressed video content received from the communication device 100, and display the restored video content on a display.

Figure 2:
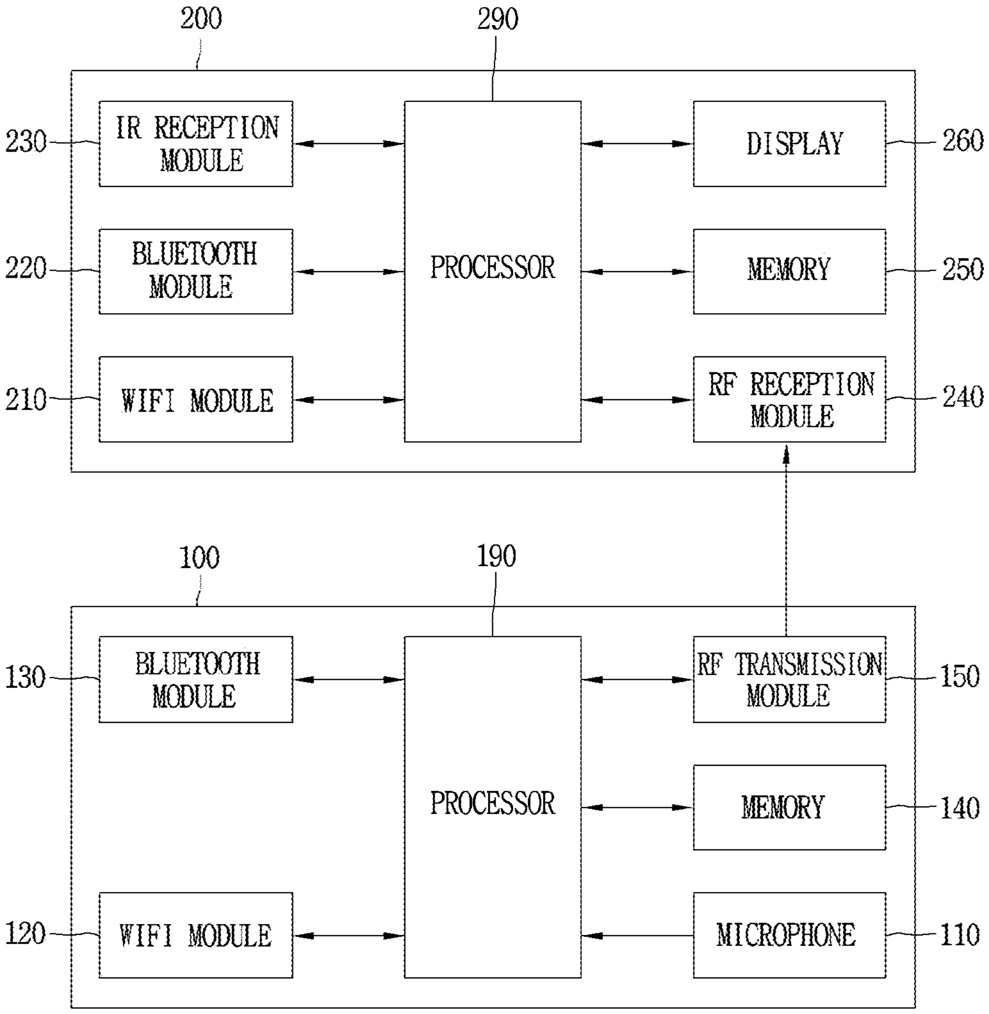
FIG. 2 is a block diagram illustrating detailed configurations of a communication device and an electronic device.

FIG. 2 is a block diagram illustrating detailed configurations of a communication device and an electronic device. Referring to FIG. 2, the communication device 100 may include a microphone 110, a Wi-Fi module 120, a Bluetooth module 130, a memory 140, an RF transmitting module 150, and a processor 190.

The microphone 110 may receive an audio signal and transfer the audio signal to the processor 190.

The microphone 110 may receive a voice uttered by a user.

The Wi-Fi module 120 may perform wireless communication through the Wi-Fi standard.

The Wi-Fi module 120 may perform wireless communication with an external device or the electronic device 200 through the Wi-Fi standard.

The Bluetooth module 130 may perform wireless communication through the Bluetooth Low Energy (BLE) standard.

The Bluetooth module 130 may perform wireless communication with an external device such as a remote controller or the electronic device 200 through the Bluetooth Low Energy (BLE) standard.

The memory 140 may store a program for signal processing and control, and may store signal-processed video, audio, or data signals.

The memory 140 may perform a function for temporarily storing video, audio, or data signals received from the outside, and may store information on a predetermined image through a channel storage function.

The RF transmitting module 150 may transmit an A/V signal to the RF receiving module 240 of the electronic device 200 through Radio Frequency (RF) communication.

The RF transmitting module 150 may transmit an A/V signal compressed in a digital form to the RF receiving module 240.

The RF transmitting module 150 may transmit the A/V signal to the RF receiving module 240 through one or more channels.

The processor 190 may control an overall operation of the communication device 100.

The processor 190 may be configured in the form of a system-on-chip (SoC).

The processors 190 may be provided in plurality.

The processor 190 may compress a video signal or an audio signal received from the outside, and transfer the compressed signal to the RF transmitting module 150.

The processor 190 may include an encoder for compressing a video signal or an audio signal.

The processor 190 may be referred to as a main SoC.

The processor 190 may have one or more interfaces for connection with external devices. For example, the processor 190 may have one or more HDMI ports, and one or more USB ports.

The processor 190 may include a tuner that receives broadcast signals.

The electronic device 200 may include a Wi-Fi module 210, a Bluetooth module 220, an IR module 230, an RF receiving module 240, a memory 250, a display panel 260, and a processor 290.

The Wi-Fi module 210 may perform wireless communication through the Wi-Fi standard.

The Wi-Fi module 120 may perform wireless communication with an external device or the communication device 100 through the Wi-Fi standard.

The Bluetooth module 220 may perform wireless communication through the Bluetooth Low Energy (BLE) standard.

The Bluetooth module 220 may perform wireless communication with an external device such as a remote controller or the A/V transmitting device 200 through the Bluetooth Low Energy (BLE) standard.

The IR module 230 may receive a signal from a remote controller (not shown) through infrared (IR) communication.

The RF receiving module 240 may receive an A/V signal from the RF transmitting module 150.

The RF receiving module 240 may include a plurality of antennas. The RF receiving module 240 may be disposed below the display panel 260.

An example of the RF receiving module 240 may include a first antenna module and a second antenna module. Each of the first antenna module and the second antenna module may include a plurality of antennas.

Another example of the RF receiving module 240 may include one antenna module, and the antenna module may include a plurality of antennas.

The RF receiving module 240 may receive an A/V signal compressed in a digital form from the RF transmitting module 150, and transfer the received A/V signal to the processor 290.

The memory 250 may store a program for signal processing and control, and may store signal-processed video, audio, or data signals.

The display panel 260 may be a display panel 260 capable of displaying a video signal received from the processor 290. An example of the display panel 260 may be an LED panel.

The display panel 260 may display a video signal according to the driving of a timing controller (not shown).

The processor 290 may control an overall operation of the electronic device 200.

The processor 290 may restore the compressed A/V signal received by the RF receiving module 240. To this end, the processor 290 may include a decoder.

Hereinafter, an antenna module disposed in an electronic device according to the present disclosure will be described. In this regard, FIG. 3 shows a structural view in which an electronic device provided with a display performs wireless communication with other communication devices that may be disposed in various locations.

Figure 3:
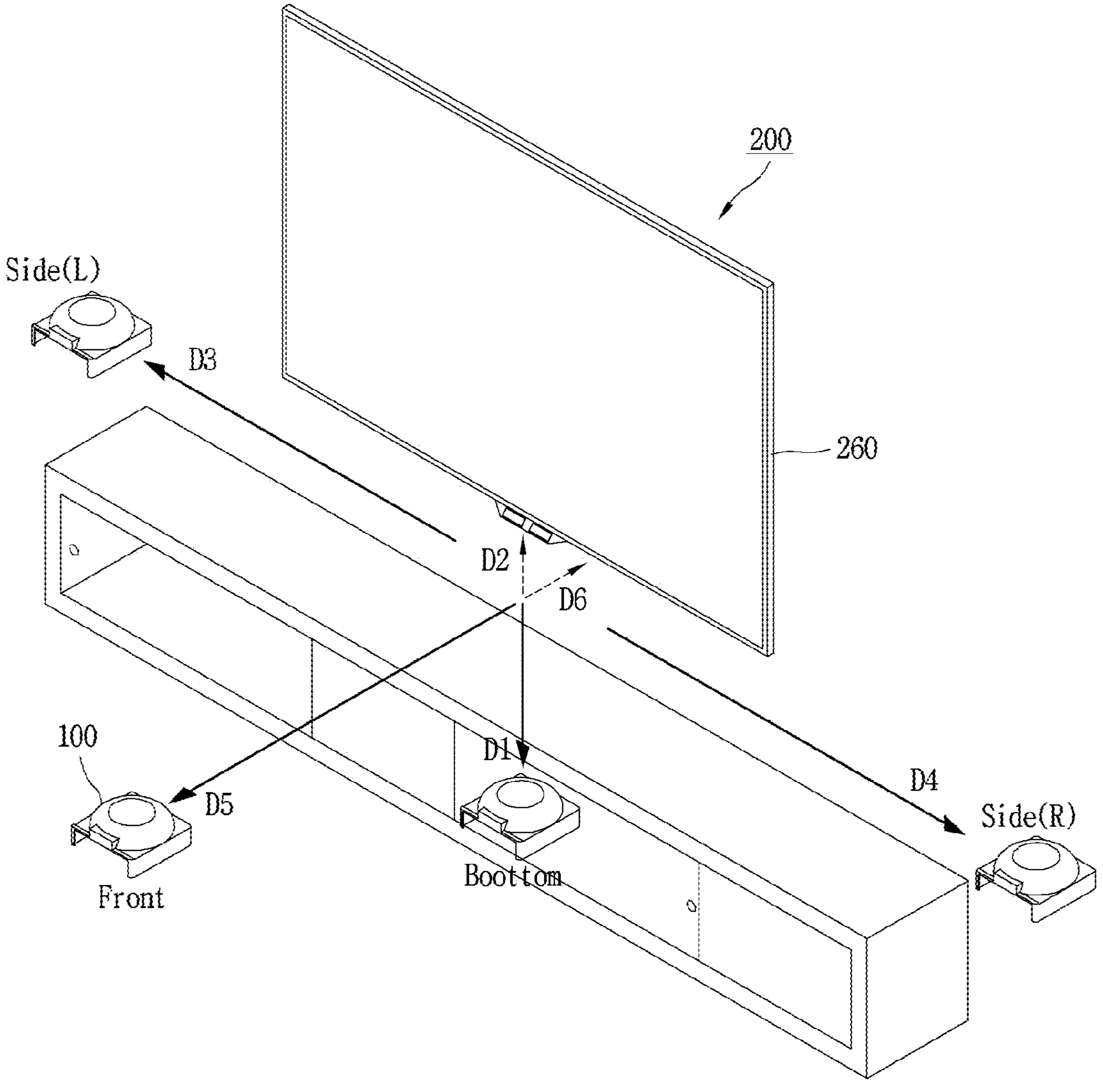
FIG. 3 is a structural view illustrating that an electronic device having a display performs wireless communication with other communication devices that may be disposed in various locations.

Referring to FIG. 3, the communication device 100 may be disposed in a front direction, a bottom direction, one side direction, or the other side direction of the electronic device 200. The communication device 100 may be an AV transmitting device that transmits AV content to the electronic device 200. The communication device 100 may be a set-top box, but is not limited thereto. The electronic device 200 may be an AV receiving device that receives AV content from the communication device 100. The electronic device 200 may be a display device, but is not limited thereto. The electronic device 200 receives data from the communication device 100, but may also transmit data to the communication device 100.

The communication device 100 may be disposed in a first direction D1 that is the bottom direction of the electronic device 200. In this regard, the electronic device 200 may transmit or receive a radio signal in the first direction D1, which is the bottom direction. The top direction of the electronic device 200 may be defined as a second direction D2.

The communication device 100 may be disposed in the third direction D3, which is the left direction of the electronic device 200, or in the fourth direction D4, which is the right direction thereof. In this regard, the electronic device 200 may transmit or receive a wireless signal in a third direction D3 or a fourth direction D4, which is the left direction.

The communication device 100 may be disposed in a fifth direction D5 that is the front direction of the electronic device 200. In this regard, the electronic device 200 may transmit or receive a wireless signal in the fifth direction D5, which is the front direction. A rear direction of the electronic device 200 may be defined as a sixth direction D6.

Meanwhile, a wireless link on a line-of-sight (LOS) path may not be formed due to an obstacle between the communication device 100 and the electronic device 200. In this regard, the electronic device 200 may transmit and receive a wireless signal through a wireless link on a non-LOS path such as a reflection path. The communication device 100 may transmit or receive a wireless signal in a ceiling direction, which is an upper front direction. Communication is enabled between the communication device 100 and the electronic device 200 through a wireless signal reflected from a ceiling or wall surface.

Meanwhile, an electronic device according to the present disclosure may include a plurality of antenna modules (structures) to perform wireless communication with a communication device through the plurality of antenna modules (structures). In this regard, FIG. 4 shows a structure of an antenna module below an electronic device.

Figure 4:
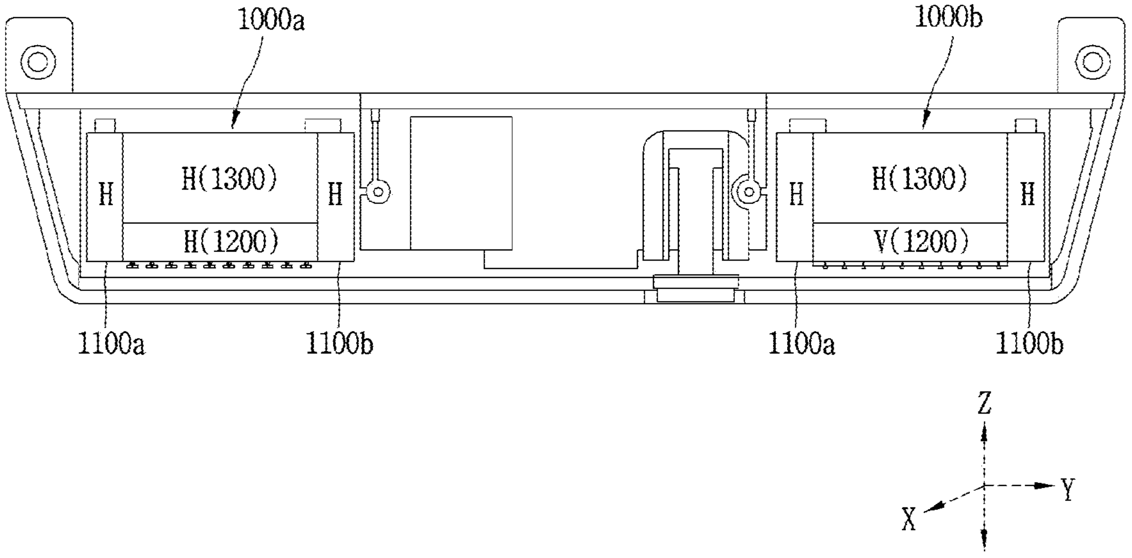
FIG. 4 is a view illustrating a structure of an antenna module disposed on a bottom of an electronic device.

Referring to FIGS. 3 and 4, the electronic device 200 may include a display panel 260 and antenna modules **1000*a* and 1000*b*. The first and second antenna modules 1000*a* and 1000*b* may be disposed adjacent to the display panel 260. The first and second antenna modules 1000*a* and 1000*b* of FIG. 4 may correspond to an antenna module 1000 of FIG. 7 and an antenna module 1000 of FIG. 15**, respectively.

The first antenna module **1000*a* may be disposed in one side region of the electronic device 200. The second antenna module 1000*b* may be disposed in another side region of the electronic device 200**.

The first antenna module **1000*a* may include first and fourth array antennas 100*a* and 1100*b*, a second array antenna 1300, and a third array antenna 1200**.

The first array antenna 100*a* operates as a horizontally polarized antenna that receives or transmits a signal in a left direction. The fourth array antenna 1100*b* operates as a horizontally polarized antenna that receives or transmits a signal in a right direction. The first array antenna 1100*a* may radiate a polarized signal that is polarized in the X-axis direction to travel in a left Y-axis direction. The fourth array antenna 1100*b* may radiate a polarized signal that is polarized in the X-axis direction to travel in a right Y-axis direction.

The third array antenna 1200 operates as a vertically polarized antenna that receives or transmits a signal in a lower direction. The second array antenna 1300 operates as a horizontally polarized antenna that receives or transmit a signal in a front direction. The third array antenna 1300*c* may radiate a polarized signal that is polarized in the X-axis direction to travel in a lower Z-axis direction. The second array antenna 1300 may radiate a polarized signal that is polarized in the Y-axis direction to travel in the X-axis direction.

The second antenna module 1000*b* may include first and fourth array antennas 1100*a* and 1100*b*, a second array antenna 1300, and a third array antenna 1200.

The first array antenna 1100*a* operates as a horizontally polarized antenna that receives or transmits a signal in a left direction. The fourth array antenna 1100*b* operates as a horizontally polarized antenna that receives or transmits a signal in a right direction. The first array antenna 1100*a* may radiate a polarized signal that is polarized in the X-axis direction to travel in a left Y-axis direction. The fourth array antenna 1100*b* may radiate a polarized signal that is polarized in the X-axis direction to travel in a right Y-axis direction.

The third array antenna 1200 operates as a horizontally polarized antenna that receives or transmits a signal in a lower direction. The second array antenna 1300 operates as a horizontally polarized antenna that receives or transmit a signal in a front direction. The third array antenna 1300*c* may radiate a polarized signal that is polarized in the Y-axis direction to travel in a lower Z-axis direction. The second array antenna 1300 may radiate a polarized signal that is polarized in the Y-axis direction to travel in the X-axis direction.

Figure 5:
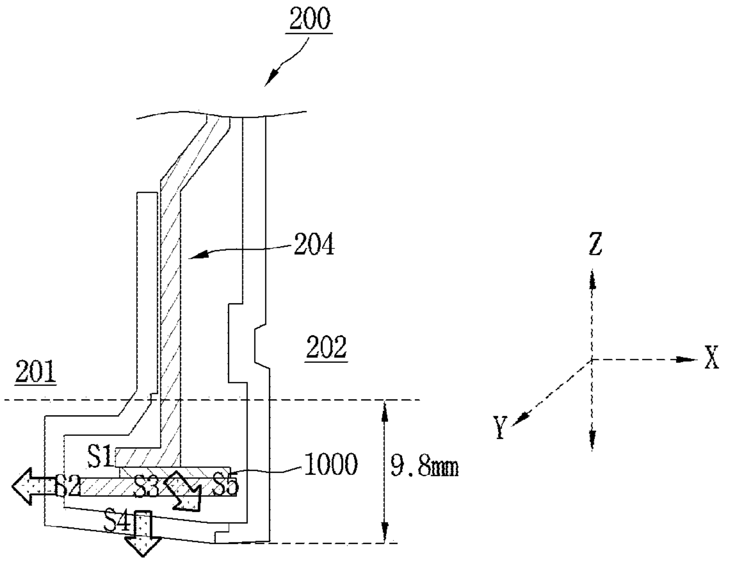
FIG. 5 is a view illustrating a structure that an antenna module according to an embodiment is disposed on an electronic device and a structure that the antenna module is coupled to the electronic device.
Figure 5:
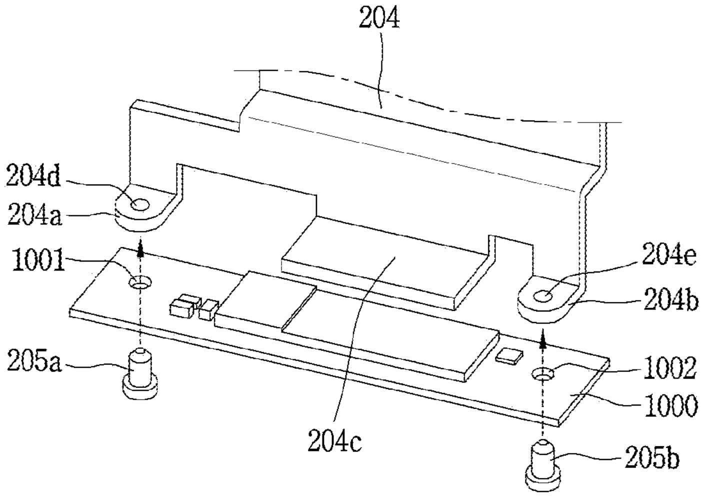

Meanwhile, the antenna module according to the present disclosure may be disposed in a horizontal disposition structure. In this regard, FIG. 5 is a view illustrating a structure that an antenna module according to an embodiment is disposed on an electronic device and a structure that the antenna module is coupled to the electronic device. (a) of FIG. 5 illustrates a structure that the antenna module 1000 is disposed in a bottom region of the electronic device 200. (b) of FIG. 5 illustrates a structure that the antenna module 1000 is coupled to a support structure such as a heat sink 204.

Referring to (a) of FIG. 5, the antenna module 1000 may be coupled to an end portion of the heat sink 204 disposed in a space between a first cover 201 and a second cover 202. The antenna module 1000 may include a plurality of surfaces. A first surface S1 of the plurality of surfaces may face an upward direction of the electronic device 200, and a second surface S2 may face a front direction of the electronic device 200. A third surface S3 of the plurality of surfaces may face a right direction of the electronic device 200, and a fourth surface S4 may face a downward direction of the electronic device 200. A fifth surface S5 of the plurality of surfaces may face a rear direction of the electronic device 200, and a sixth surface (not illustrated) may face the rear direction of the electronic device 200.

A length of a lower end portion of the first cover 201 to which the antenna module 1000 is coupled may be implemented as a predetermined length (e.g., 9.8 mm) or less. One end portion and a rear surface of the antenna module 1000 may be coupled to a side region and a rear surface of the first cover 201, such that the antenna module 1000 is disposed parallel to a horizontal plane. A structure to be assembled or pressed may be assembled or pressed in a downward or upward direction.

Referring to (b) of FIG. 5, a support structure, such as the heat sink 204, includes a first end portion 204*a*, a second end portion 204*b*, and a third end portion 204*c* that are coupled to the antenna module 1000. A first hole 204*d* and a second hole 204*e* may be formed through the first end portion 204*a* and the second end portion 204*b* of the heat sink 204, respectively. In the antenna module 1000, a region where an electronic component such as an RFIC chip is disposed may be coupled to the third end portion 204*c* of the heat sink 204. Accordingly, heat generated from the electronic component such as the RFIC chip may be discharged to an external region through the heat sink 204.

A plurality of holes may be formed in a specific region where the radiator of the antenna module 1000 is not disposed. A first through hole 1001 and a second through hole 1002 may be formed through one side and another side of the antenna module 1000. A first screw 205*a* may be coupled to the first hole 204*d* of the heat sink 204 and the first through hole 1001 of the antenna module 1000. A second screw 205*b* may be coupled to the second hole 204*e* of the heat sink 204 and the second through hole 1002 of the antenna module 1000. Referring to FIG. 5, the antenna module 1000 may be coupled to the support structure such as the heat sink 204 through the coupling structure of the screws and holes.

Figure 6:
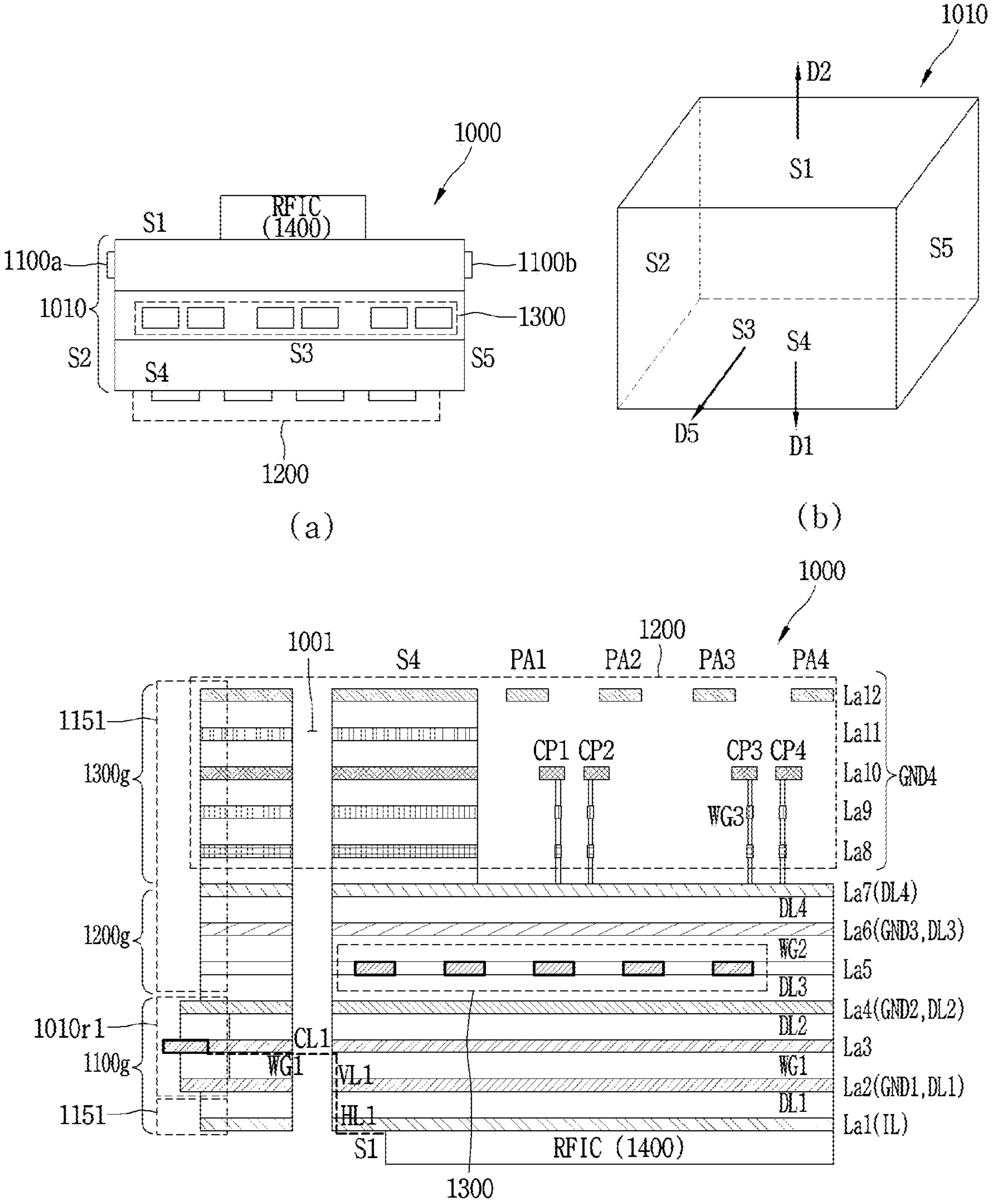
FIG. 6 illustrates a cross-sectional view and a three-dimensional structure of a substrate on which the antenna module is disposed.
Figure 7:
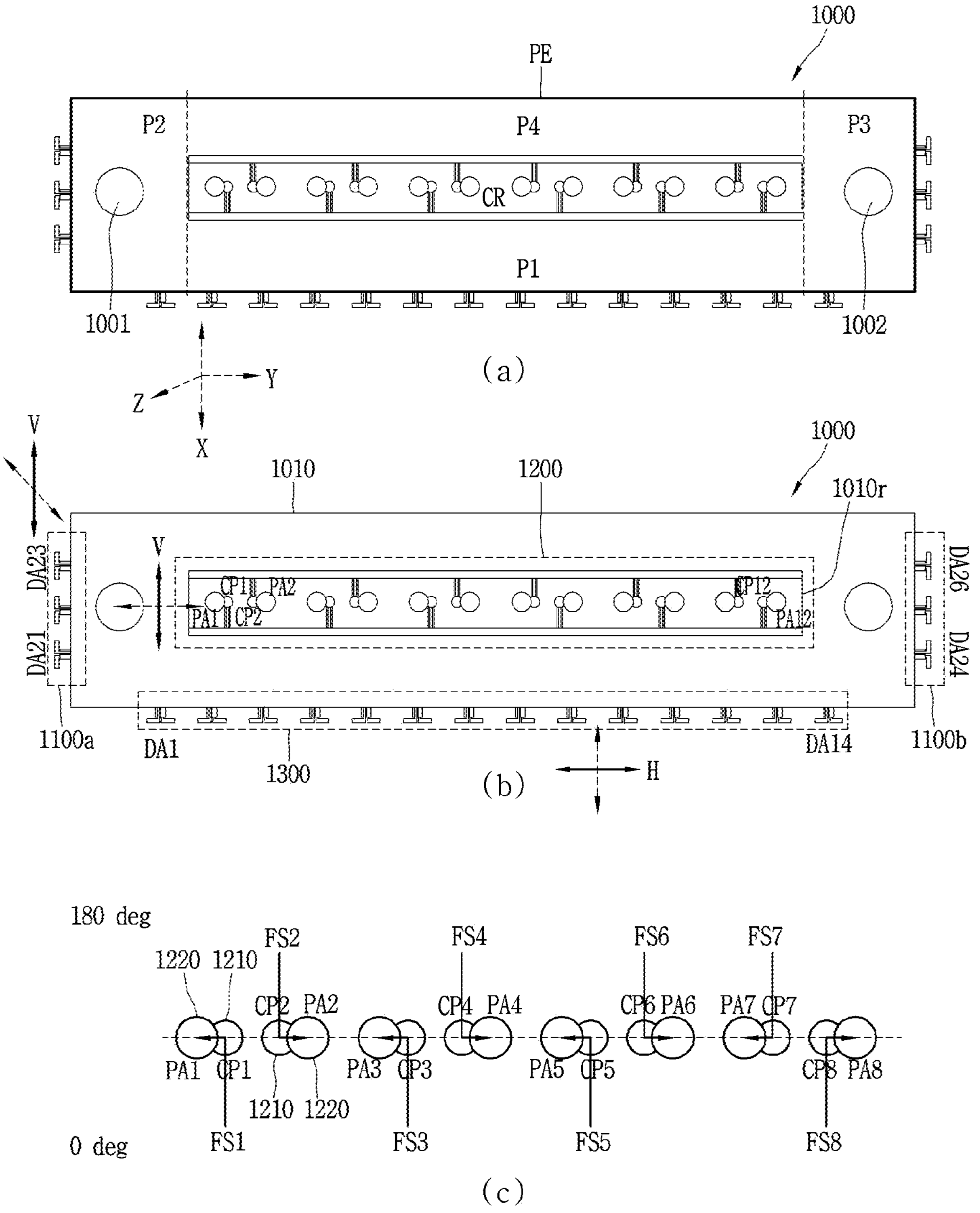
FIG. 7 is a front view of the substrate on which the antenna module is disposed.
Figure 8:
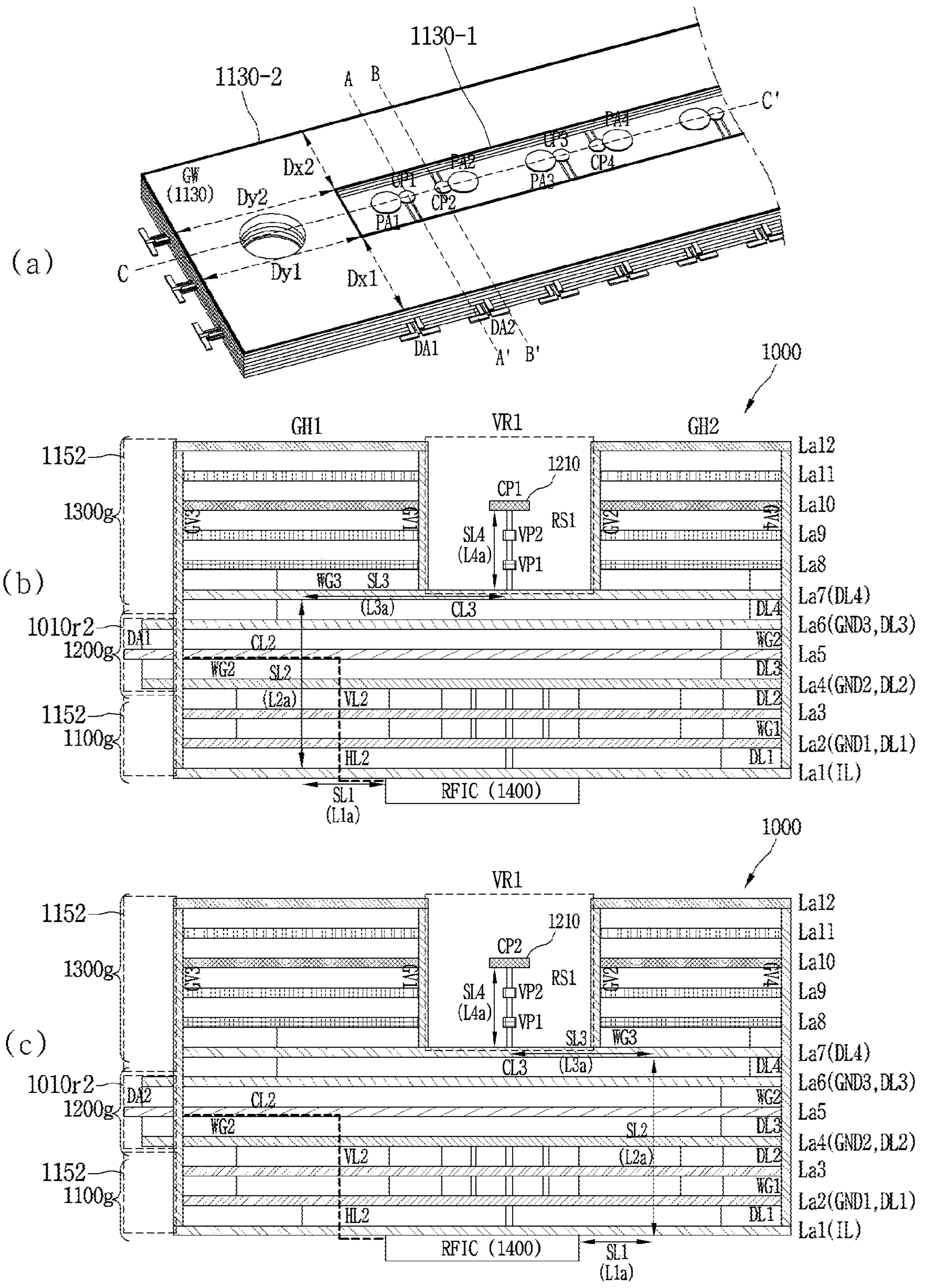
FIG. 8 illustrates a partial perspective view of the antenna module of FIG. 7 and a cross-sectional view of the antenna module on a specific line.

Hereinafter, an antenna module disposed in an electronic device according to the present disclosure will be described. In this regard, FIG. 6 illustrates a cross-sectional view and a three-dimensional structure of a substrate on which the antenna module is disposed. FIG. 7 is a front view of the substrate on which the antenna module is disposed. FIG. 8 illustrates a partial perspective view of the antenna module of FIG. 7 and a cross-sectional view of the antenna module on a specific line.

(a) of FIG. 6 is a cross-sectional view of the antenna module 1000 illustrating a structure in which a plurality of array antennas are disposed on a substrate 1010. (b) of FIG. 6 is a diagram illustrating a three-dimensional structure of the substrate 1010 having a plurality of surfaces. (c) of FIG. 6 is a cross-sectional view of the antenna module 1000 formed of a plurality of layers of (a) of FIG. 6.

Referring to FIG. 6, the substrate 1010 may include a first surface S1 through a sixth surface S6. The RFIC chip 1400 may be disposed on the first surface S1 of the substrate 1010. The first array antenna 1100*a* may be disposed on the second surface S2 of the substrate 1010. The second array antenna 1300 may be disposed on the third surface S3 of the substrate 1010. The third array antenna 1200 may be disposed on the fourth surface S4 of the substrate 1010. The fourth array antenna 1100*b* may be disposed on the fifth surface S5 of the substrate 1010.

(a) of FIG. 7 illustrates a substrate with the antenna module 1000, which is divided for each region. (b) of FIG. 7 is a diagram illustrating array antennas disposed in each region of the antenna module 1000. (c) of FIG.

7 is a diagram illustrating a structure in which a feed signal is applied to some antenna elements disposed in an array antenna disposition region.

Referring to FIG. 7, the substrate 1010 may include a central region CR and a periphery PE surrounding the central region CR. The periphery PE of the substrate 1010 may include a first part P1 through a fourth part P4. The first part P1 constitutes a bottom region of the substrate 1010, and the second part P2 constitutes one side region of the substrate 1010. The third part P3 constitutes another side region of the substrate 1010, and the fourth part P4 constitutes a top region of the substrate 1010. The antenna module 1000 may be configured to include the substrate 1010, and a third array antenna 1200 disposed in an array antenna disposition region 1010*r*.

(a) of FIG. 8 is a perspective view illustrating one side region based on the center of the antenna module 1000. (b) of FIG. 8 is a cross-sectional view according to the line AA' of the antenna module 1000. (c) of FIG. 8 is a cross-sectional view according to the line BB' of the antenna module 1000.

Referring to FIGS. 6 to 8, the first array antenna 1100*a* is disposed on the second surface S2 of the substrate 1010. The third array antenna 1200 may be disposed on the third surface S3 and an inner space of the substrate 1010. The second array antenna 1300 may be disposed on the fourth surface S4 of the substrate 1010. A region where the second array antenna 1300 is disposed may form a first ground layer 1100*g* having a first coplanar waveguide structure.

The fourth array antenna 1100*b* may further be disposed on the fifth surface S5 of the substrate 1010. A region where the first and fourth array antennas 1100*a* and 1100*b* are disposed may form a second ground layer 1200*g* having a second coplanar waveguide structure. A region where the third array antenna 1200 is disposed may form a third ground layer 1300*g* having a third coplanar waveguide structure.

An inner ground wall (GW) 1130-1 formed inside the PCB 1010 may operate as a ground for radiation of the patch antennas PA1 to PA12 and CP1 to CP12. A ground wall (GW) 1130 functions as a reflector that suppresses side surface radiation of the patch antennas PA1 to PA12 and CP1 to CP12. In addition, an outer ground wall 1130-2 formed on an outer surface of the PCB, namely, the substrate 1010 suppresses radiation to an opposing side surface of the dipole antennas DA21 to DA23 having a side surface radiation structure, and functions as a reflector toward the corresponding side surface. The ground wall (GW) 1130 suppresses rear surface radiation of the dipole antennas DA1 to DA14 having a front surface radiation structure, and functions as a reflector toward the front surface.

The ground wall (GW) 1130 is formed on side surface portions of the antenna module 1000 by a plurality of vias connecting the ground layers formed on the plurality of layers. The ground wall (GW) 1130 may include horizontal ground walls GH1 and GH2 and vertical ground walls GV1 to GV4. The first and second patch antennas may be disposed inside spaces defined by the horizontal ground walls GH1 and GH2, the vertical ground walls GV1 and GV2, and the ground layer inside the PCB.

Referring to FIGS. 5 to 8, the antenna module 1000 according to the present disclosure will be described. The antenna module 1000 may be configured to include a substrate 1010, first to fourth array antennas 1100*a*, 1300, 1200, and 1100*b*, and an RFIC 1400, which is a millimeter wave transceiver circuitry.

The substrate 1010 may include a first surface S1, a fourth surface S4, and a periphery PE. The periphery PE may be formed between the first surface S1 and the fourth surface S4. The first surface S1 may be opposite to the fourth surface S4. A ground region and an array antenna disposition region 1010*r* may be formed on the fourth surface S4. The substrate 1010 may be implemented as a multi-layer substrate. For example, the substrate 1010 may be implemented as a substrate with twelve layers, but is not limited thereto, and may vary depending on applications.

The fourth surface S4 of the substrate 1010 is divided into a central region CR, a first part P1, a second part P2, a third part P3, and a fourth part P4. The second part P1 may be defined on the left side of the first part P1 and the third part P3 is defined on the right side. The array antenna disposition region 1010*r* may be formed in the central region CR, which is inside the ground region of the first part P1 and the fourth part P4. A ground region is disposed in the second part P2 and a first through hole 1001 is disposed inside the ground region. A ground region is disposed in the third part P3 and a second through hole 1002 is disposed inside the ground region. Screws may be inserted into the first through hole 1001 of the second part P2 and the second through hole 1002 of the third part P3, so that the antenna module 1000 is coupled to the support structure such as the heat sink inside the electronic device.

The first array antenna 1100*a* is disposed in an outer peripheral surface (PE) region of the second part P2. The fourth array antenna 1100*b* is disposed in an outer peripheral surface region of the third part P3. The first array antenna 1100*a* and the fourth array antenna 1100*b* may form beam patterns to side regions of the electronic device. The first array antenna 1100*a* and the fourth array antenna 1100*b* may radiate horizontally polarized signals to the side regions of the electronic device.

The first array antenna 1100*b* may include a plurality of dipole antennas DA21 to DA23. The fourth array antenna 1100*b* may include a plurality of patch antennas DA24 to DA26. The first array antenna 1100*a* and the fourth array antenna 1100*b* may be implemented to have three antenna elements on one side and another side of the periphery PE of the substrate 1010*a*, respectively. The first array antenna 1100*a* may be implemented as a 1×3 array antenna on the one side of the substrate 1010, but is not limited thereto. The fourth array antenna 1100*b* may be implemented as a 1×3 array antenna on the another side of the substrate 1010, but is not limited thereto.

The third array antenna 1200 may be disposed on the fourth surface S4 of the substrate 1010. The third array antenna 1200 may form a beam pattern toward the bottom region of the electronic device. The third array antenna 1200 may radiate a horizontally polarized signal to the bottom region of the electronic device. The third array antenna 1200 may be implemented to have twelve antenna elements on the central region CR of the substrate 1010.

The third array antenna 1200 may include a plurality of patch antennas PA1 to PA12 disposed on the fourth surface S4 of the substrate 1010. The third array antenna 1300*b* may be implemented as a 1×12 array antenna on the center region CR of the substrate 1010, but is not limited thereto.

Each patch antenna of the third array antenna 1200 may include first patch elements 1220 and second patch elements 1210. The second patch elements 1210 may be stacked in a Z-axis direction, which is a height direction, on the first patch elements 1220 such that signals of the first patch elements 1220 are coupled. The center of the second patch element 1210 may be offset from the center of the first patch antenna 1220 in a Y-axis direction that is a horizontal direction.

In this regard, the second patch antennas 1210 in the first, third, fifth, seventh, ninth, and eleventh rows may be disposed to be offset with respect to the first patch antennas 1220 to a right region based on the Y-axis. The second patch antennas 1210 in the second, fourth, sixth, eighth, tenth, and twelfth rows may be disposed to be offset with respect to the first patch antennas 1220 to a left region based on the Y-axis. Accordingly, the second patch antennas 1220 may alternately be offset in different directions with respect to the first patch antennas 1220.

A current direction of a signal applied to the second patch antenna 1210 in the first region is from right to left. A current direction of signals applied to the second patch antennas 1210 in the first, third, fifth, seventh, ninth, and eleventh rows is from right to left. A current direction of a signal applied to the second patch antenna 1210 in the second region is from left to right. A current direction of signal applied to the second patch antennas 1210 in the second, fourth, sixth, eighth, tenth, and twelfth rows is from left to right. Accordingly, the current directions of the signals applied to the second patch antennas 1210, which are alternately offset from each other in the different directions, are opposite to each other. Therefore, a phase difference between the signals applied to the second patch elements 1210, which are alternately disposed to be offset, is supposed to be 180 degrees so that the current flows in the same direction. To this end, the RFIC 1400 may control a phase shifter such that the phase difference between the signals applied to the second patch elements 1210 is 180 degrees.

In this regard, a first feed signal FS1 may be applied to a coupling patch CP1, which is the second patch antenna 1210 in the first row. A second feed signal FS2 may be applied to a coupling patch CP2, which is the second patch antenna 1210 in the second row. If the first and second feed signals FS1 and FS2 are in-phase signals, electric fields are formed in opposite directions in the coupling patches CP1 and CP2. A directional beam may be formed only when the electric field directions of the coupling patches CP1 and CP2 are the same. For this purpose, a phase difference between the first feed signal FS1 and the second feed signal FS2 needs to be 180 degrees.

Likewise, a seventh feed signal FS7 may be applied to a coupling patch CP7, which is the second patch antenna 1210 in the seventh row. An eighth feed signal FS8 may be applied to a coupling patch CP8, which is the second patch antenna 1210 in the eighth row. If the seventh and eighth feed signals FS7 and FS8 are in-phase signals, the electric fields may be formed in opposite directions in the coupling patches CP7 and CP8. A directional beam may be formed only when the electric field directions of the coupling patches CP7 and CP8 are the same. To this end, the phase difference between the seventh feed signal FS7 and the eighth feed signal FS8 needs to be 180 degrees.

Accordingly, the first, third, fifth, and seventh feed signals FS1, FS3, FS5, and FS7, which are applied to the coupling patches CP1, CP3, CP5, and CP7, which are the second patch antennas 1210 in the first, third, fifth, and seventh rows, have a first phase value. On the other hand, the second, fourth, sixth, and eighth feed signals FS2, FS4, FS6, and FS8, which are applied to the coupling patches CP2, CP4, CP6, and CP8, which are the second patch antennas 1210 in the second, fourth, sixth, and eighth rows, have a second phase value which has a phase difference of 180 degrees from the first phase value.

The second array antenna 1300 may be disposed on the first part P1 of the periphery PE of the substrate 1010. The second array antenna 1300 may form a beam pattern toward the front region of the electronic device. The second array antenna 1200 may radiate a horizontally polarized signal to the front region of the electronic device.

The second array antenna 1300 may include a plurality of dipole antennas DA1 to DA14 disposed on the first part P1 of the periphery PE of the substrate 1010. The second array antenna 1300 may be implemented to have 14 antenna elements on the lower side of the periphery PE of the substrate 1010. The second array antenna 1300 may be implemented as a 1×14 array antenna on the lower side of the periphery PE of the substrate 1010, but is not limited thereto.

The RFIC 1400 may be configured to transmit and receive signals at frequencies between 10 GHz and 400 GHz using at least one of the first and fourth array antennas 1100*a* and 1100*b*, the third array antenna 1200, and the second array antenna 1300. The RFIC 1400 may be configured to transmit and receive signals at frequencies between 10 GHz and 400 GHz using at least one of the plurality of dipole antennas DA21 to DA26, the plurality of patch antennas PA1 to PA12, and the plurality of dipole antennas DA1 to DA14. The RFIC 1400 may be referred to as a radio frequency integrated chip.

The number of elements of the first array antenna 1200*a* forming the beam pattern toward the front region may be set to be greater than the number of elements of the second array antenna 1200 forming the beam pattern toward the bottom region. The number of elements of the third array antenna 1200 forming the beam pattern toward the bottom region may be set to be greater than the number of elements of the third and fourth array antennas 1100*a* and 1100*b* forming the beam patterns toward the side regions.

In this regard, 12 pins among 32 pins of the RFIC 1400 may be connected to the third array antenna 1200 forming the beam pattern toward the bottom region. 14 pins of the 32 pins of the RFIC 1400 may be connected to the second array antenna 1300 forming the beam pattern toward the front region. 6 pins of the 32 pins of the RFIC 1400 may be connected to the first and fourth array antennas 1100*a* and 1100*b* forming the beam patterns toward the side regions.

In this regard, since the second array antenna 1300 has the largest number of elements, it can transmit signals over a long distance to the front region of the electronic device, but has a narrow beam coverage. The narrow beam coverage can be supplemented by changing a direction of beams to a horizontal direction of the front region through beamforming. The number of elements of the second array antenna 1300 may be plural in the Y-axis direction and one in the Z-axis direction. For example, the second array antenna 1300 may be implemented as a 1×14 array antenna.

The electronic device needs to perform wireless communication with another electronic device disposed in the bottom region thereof. For wireless communication, beamforming may be implemented in units of narrow beam coverage in a horizontal direction, which is the Y-axis direction, in the bottom region of the electronic device. Meanwhile, it is not necessary to transmit a signal to the bottom region of the electronic device over a longer distance than the front region. The number of elements of the third array antenna 1200 may be plural in one axial direction and one in another axial direction. For example, the third array antenna 1200 may be implemented as a 1×8, 1×10, or 1×12 array antenna.

Signals may be transferred to the side regions of the electronic device in an indoor radio wave environment where the electronic device is disposed. It is more important to implement a wide beam coverage for the side regions of the electronic device even without beamforming, than to implement a signal transmission over a long distance. In this regard, since the number of elements of the first and fourth array antennas 1100*a* and 1100*b* is the smallest, a wide beam coverage to the side regions of the electronic device can be achieved. Accordingly, the number of elements of the first and fourth array antennas 1100*a* and 1100*b* may be plural in the one axial direction and one in the another axial direction. For example, the first and fourth array antennas 1100*a* and 1100*b* may be implemented as a 1×3 array antenna on one side and another side.

Figure 9A:
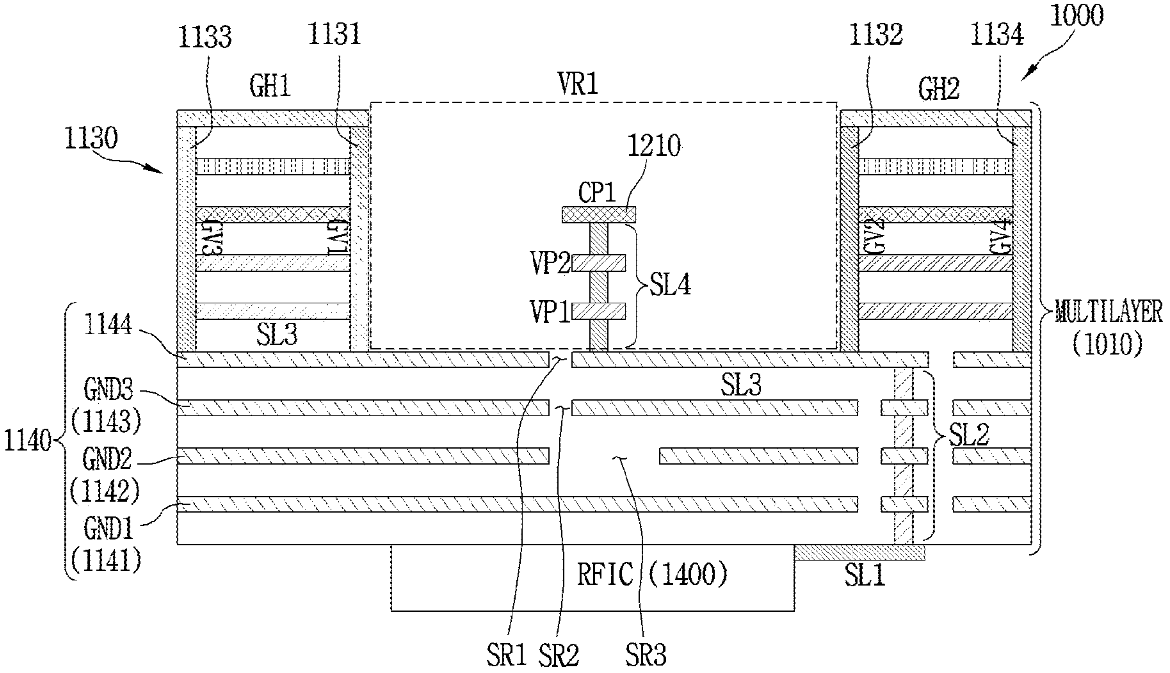
FIG. 9A is a lateral view illustrating a partial region of the antenna module with patch antennas having an overlap structure, illustrated in FIG. 8.
Figure 9B:
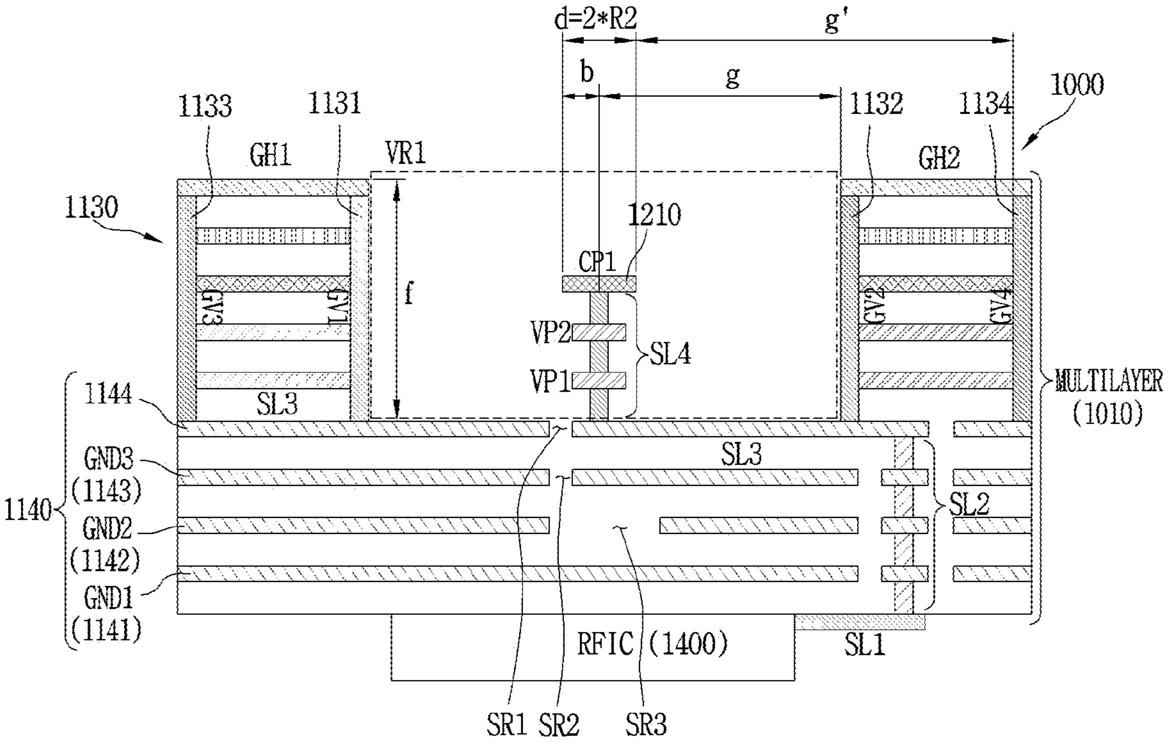
FIG. 9B illustrates size and spacing of radiators disposed on different layers and a spacing between the radiator and a ground wall in the lateral view of the antenna module of FIG. 9A.

Meanwhile, the patch antennas of the third array antenna 1300 according to the present disclosure may be stacked so that partial regions overlap. In this regard, FIG. 9A is a lateral view illustrating a partial region of the antenna module with patch antennas having an overlap structure, illustrated in FIG. 8. FIG. 9B illustrates size and spacing of radiators disposed on different layers and a spacing between the radiator and a ground wall in the lateral view of the antenna module of FIG. 9A.

Referring to FIGS. 7 to 9A, the array antenna disposition region 1010*r* forms a first vertical region VR1 including a plurality of layers. The first patch antenna 1220 and the second patch antenna 1210 may be disposed in the first vertical region VR1. The second patch antenna 1210 is connected to a fourth part SL4 of signal connection lines SL1 to SL4. The second patch antenna 1210 may be disposed to be offset toward one side or another side in the Y-axis direction of the first patch antenna 1220, such that a signal transmitted to the second patch antenna 1210 is coupled to the first patch antenna 1220.

Referring to FIGS. 7 to 9B, the second patch antenna 1210 may be formed to have a length of d=2*R2 in one axis direction. A distance b from one end portion of the second patch antenna 1210 to a point connected to the fourth part SL4 among the plurality of signal connection lines may be set to a value of b=R2. In this regard, a feed connection region of the second patch antenna 1210 may be offset from the center of the second patch antenna 1210 in one axial direction and may be formed at a center point in another axial direction. A distance g from the feed connection region of the second patch antenna 1210 to the horizontal ground wall GH2 may be equal to and greater than a predetermined spacing such that the characteristic change for each operating frequency is below a threshold. A distance g' from another end portion of the second patch antenna 1210 to the vertical ground wall GV3 may be equal to and greater than a predetermined spacing such that the characteristic change for each operating frequency is below a threshold.

Hereinafter, the antenna module 1000 including the plurality of layers according to the present disclosure will be described, with reference to FIGS. 7 to 9B. In the antenna module 1000 disclosed herein, the fourth part SL4 connected to the second patch antenna 1210 may be disposed in a dielectric region. In this case, a signal via corresponding to the fourth part SL4 may be disposed in the dielectric region so as not to be electrically connected to a ground region of a fourth lower conductive layer 1144. In relation to this, a slot region SR1 may be formed in the ground region of the fourth lower conductive layer 1144.

The antenna module 1000 may include at least one lower conductive layer below the fourth lower conductive layer 1144. In this regard, the antenna module 1000 may include a fourth lower conductive layer 1144 and a third lower conductive layer 1143 disposed below the fourth lower conductive layer 1144. The third lower conductive layer 1143 may be disposed on the same layer as a third part SL3 with being spaced apart from one end portion and another end portion of the third part SL3. Therefore, the plurality of lower conductive layers 1140 may include the third lower conductive layer 1143 and the fourth lower conductive layer 1144.

Meanwhile, one end portion of the third part SL3 and one end portion of the lower conductive layer 1143 may be points inside the bottom region of the second patch antenna 1210. In this regard, a region from which a conductive layer has been removed between the one end portion of the third part SL3 and the one end portion of the third lower conductive layer 1143 may also be referred to as a second slot region SR2. The third lower conductive layer 1143 may be electrically connected to the ground region of the fourth lower conductive layer 1144 to be implemented as a ground layer. Or, the third lower conductive layer 1143 may be electrically disconnected from the ground region of the fourth lower conductive layer 1144 to be implemented as a signal line.

On the other hand, the antenna module 1000 may further include a second lower conductive layer 1142 that is disposed below the third part SL3. The third lower conductive layer 1143 and the upper fourth lower conductive layer 1144 may be connected and thus the ground region of the fourth lower conductive layer 1144 may also be referred to as a third lower conductive layer. Therefore, the plurality of lower conductive layers 1140 may include the first lower conductive layer 1141, the second lower conductive layer 1142, and the third lower conductive layer 1143.

The second lower conductive layer 1142 may include a third slot region SR3, from which a conductive layer has been removed, in a region corresponding to the lower region of the second patch antenna 1210. A length of the third slot region SR3 on one axis may be longer than lengths of a plurality of pads of the fourth part SL4 as the signal via on the one axis. Therefore, the third slot region SR3, from which the conductive layer has been removed, is formed in a second ground layer GND2 which is located below a point where the fourth part SL4 connected to the second patch antenna 1210 is connected to the third part SL3.

Regions, such as the slot regions SR1 to SR3, from which the conductive layer has been removed, may be referred to as open spaces. The open spaces such as the slot regions SR1 to SR3 may lower a resonating frequency of an antenna to a low frequency band without increasing a size of the patch antenna. Therefore, as the ground region is partially removed, an entire height of the antenna can increase and thus the antenna can operate as a broadband antenna.

Also, the plurality of lower conductive layers 1140 may include a first lower conductive layer 1141, a second lower conductive layer 1142, a third lower conductive layer 1143, and a fourth lower conductive layer 1144. The first lower conductive layer 1141 may be disposed adjacent to a pad of the second part SL2 to cover a lower region of a region where the second patch antenna 1210 is disposed. The first lower conductive layer 1141 may be implemented as a ground layer. Alternatively, depending on an application, the first lower conductive layer 1141 may be implemented as a conductive layer which floats without being electrically connected to a ground layer. The first lower conductive layer 1141 may be implemented as a plurality of conductive layers that are separated from one another. Some of those conductive layers may operate as ground layers and the others may operate as conductive layers in a floating state.

Meanwhile, the antenna module 1000 may further include vertical ground walls 1131 to 1134 each having a plurality of pads on top of the ground region of the fourth lower conductive layer 1144. The first patch antenna 1220 and the second patch antenna 1210, as illustrated in FIG. 7, may be stacked to partially overlap each other in the space between the vertical ground walls 1131 and 1132.

Patch antennas stacked to have overlap regions on different layers of the antenna module 1000 according to the present disclosure may be placed in a space formed by the ground wall 1130. Referring to FIGS. 7 to 9B, the ground wall 1130 may be formed along side regions of the substrate 1010 having the plurality of layers. In this regard, the ground wall 1130 may include conductive pads disposed on the plurality of layers, and vias connecting the conductive pads. The ground wall 1130 including the conductive pads and vias may be referred to as a ground via wall.

The ground wall 1130 may include a first ground wall 1131 formed along one side region of the first vertical region VR1, and a second ground wall 1132 formed along another side region. The ground wall 1130 may further include a third ground wall 1133 formed along one side region of the second vertical region VR2, and a fourth ground wall 1134 formed along one side surface of the third vertical region VR3.

The ground wall 1130 may be disposed on an edge of the substrate 1010 and an edge of the array antenna disposition region 1010*r* with respect to the first patch antenna 1220. The ground wall 1150 may be disposed on at least one of top, bottom, left, and right regions based on the first patch antenna 1220. The ground wall 1130 may be connected to the ground layer G1 to improve an antenna gain. Alternatively, the ground wall 1130 may be configured as a floating conductive wall merely formed of via pads without a vertical connection portion.

Figure 10:
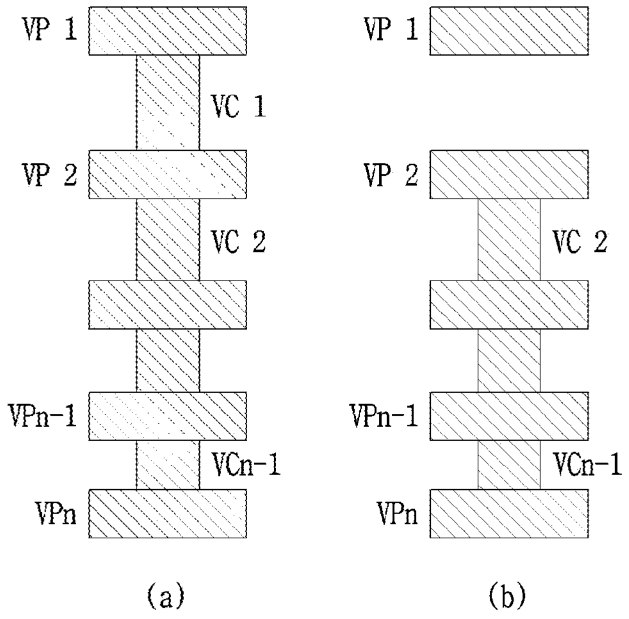
FIG. 10 illustrates via wall formation structures according to various embodiments.

In this regard, FIG. 10 illustrates via wall formation structures according to various embodiments. Referring to FIG. 10, the via wall may configure signal connection lines or connect a ground plane. Via pads VP1 to VPn in the form of thin film may be disposed on all the layers of the substrate 1010, but alternatively may be disposed only on several layers.

Referring to (a) and (b) of FIG. 10, the ground wall may include vertical connection portions VC1, VC2, . . . , VCn−1, and a plurality of pads VP1, VP2, . . . , VPn−1. Referring to (a) of FIG. 6, adjacent pads of the plurality of pads VP1, VP2, . . . , VPn−1 may be interconnected by one of the vertical connection portions VC1, VC2, . . . , VCn−1. On the other hand, referring to (b) FIG. 10, at least one adjacent pad of the plurality of pads VP1, VP2, . . . , VPn−1 of the ground wall 1130 may not be connected by the vertical connection portion.

As one example, the first pad VP1 and the second pad VP2 may be coupled without a vertical connection portion and the other pads may be connected by the vertical connection portions VP2 to VPn−1. However, with no limit thereto, the pads may be connected or may not be connected for each layer. In this regard, when signal lines are disposed in a region adjacent to via walls, the via walls may alternatively be coupled without a vertical connection portion. Upon the coupling without the vertical connection portion, a plurality of conductive layers may configure an electronic band gap (EBG) structure without being electrically connected to the ground layer. This can reduce interference due to an adjacent radiator or signal line or suppress deformation due to pressure or heat applied to the substrate 1010.

On the other hand, referring to (c) of FIG. 10, the plurality of pads VP1, VP2, . . . , VPn−1 of the ground wall 1130 may be coupled without vertical connection portions. Accordingly, the vertical ground walls GV1 to GV5 of FIGS. 7 to 9B may be implemented as any one structure of the ground walls of FIGS. (a) to (c) of FIG. 10.

Figure 11A:
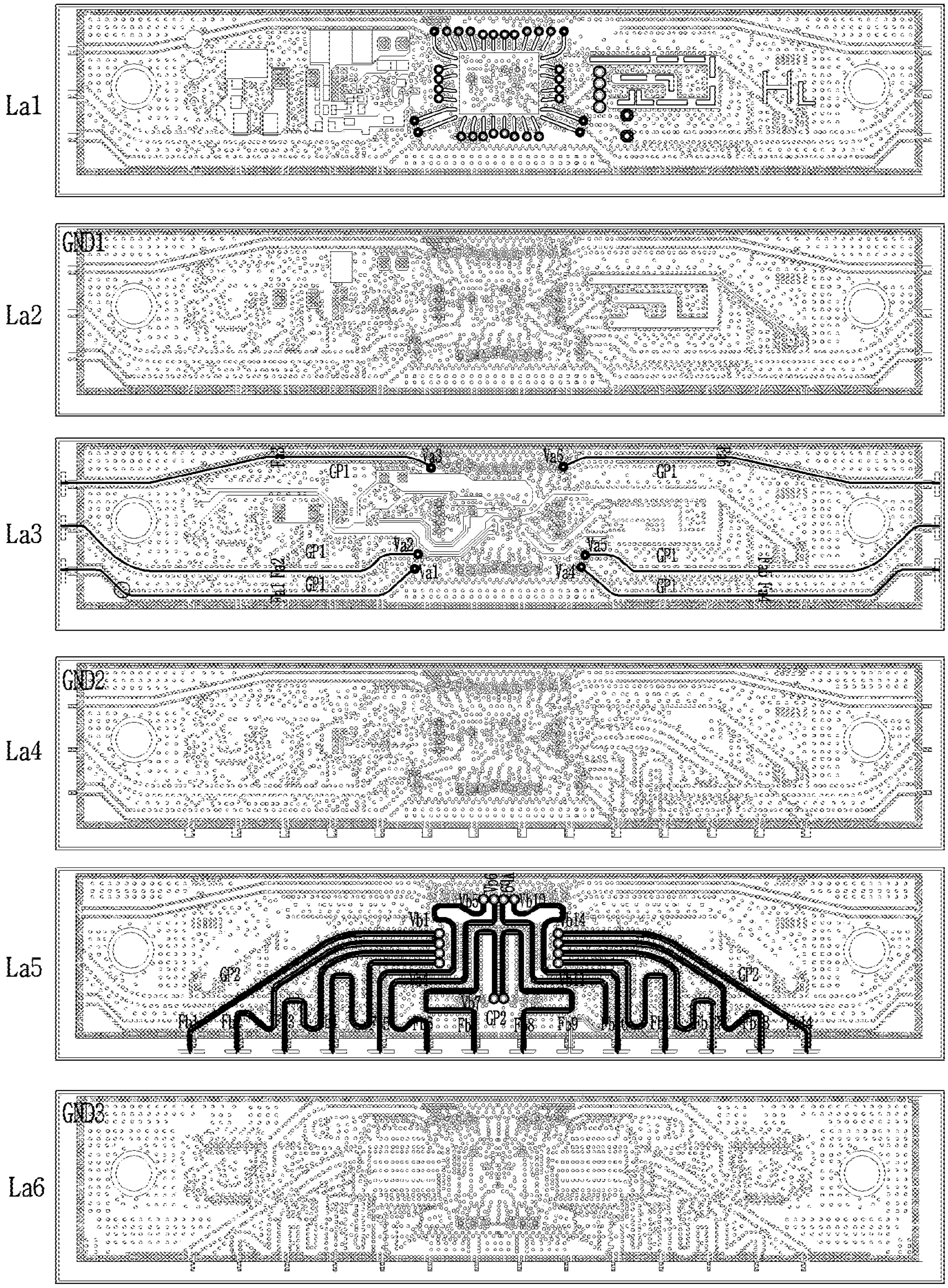
FIGS. 11A and 11B are front views illustrating the antenna module of FIG. 8 for each layer.
Figure 11B:
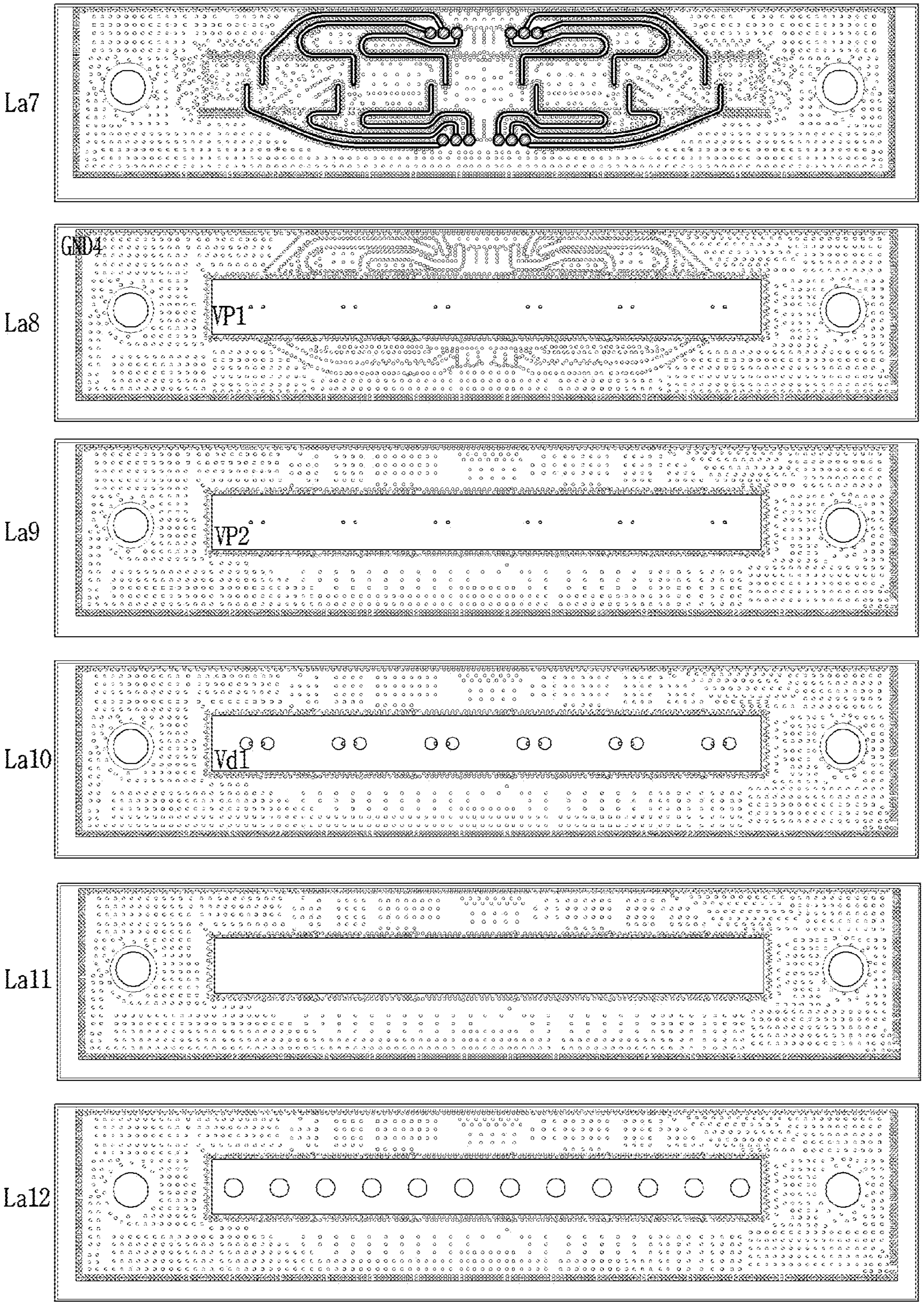
Figure 12A:
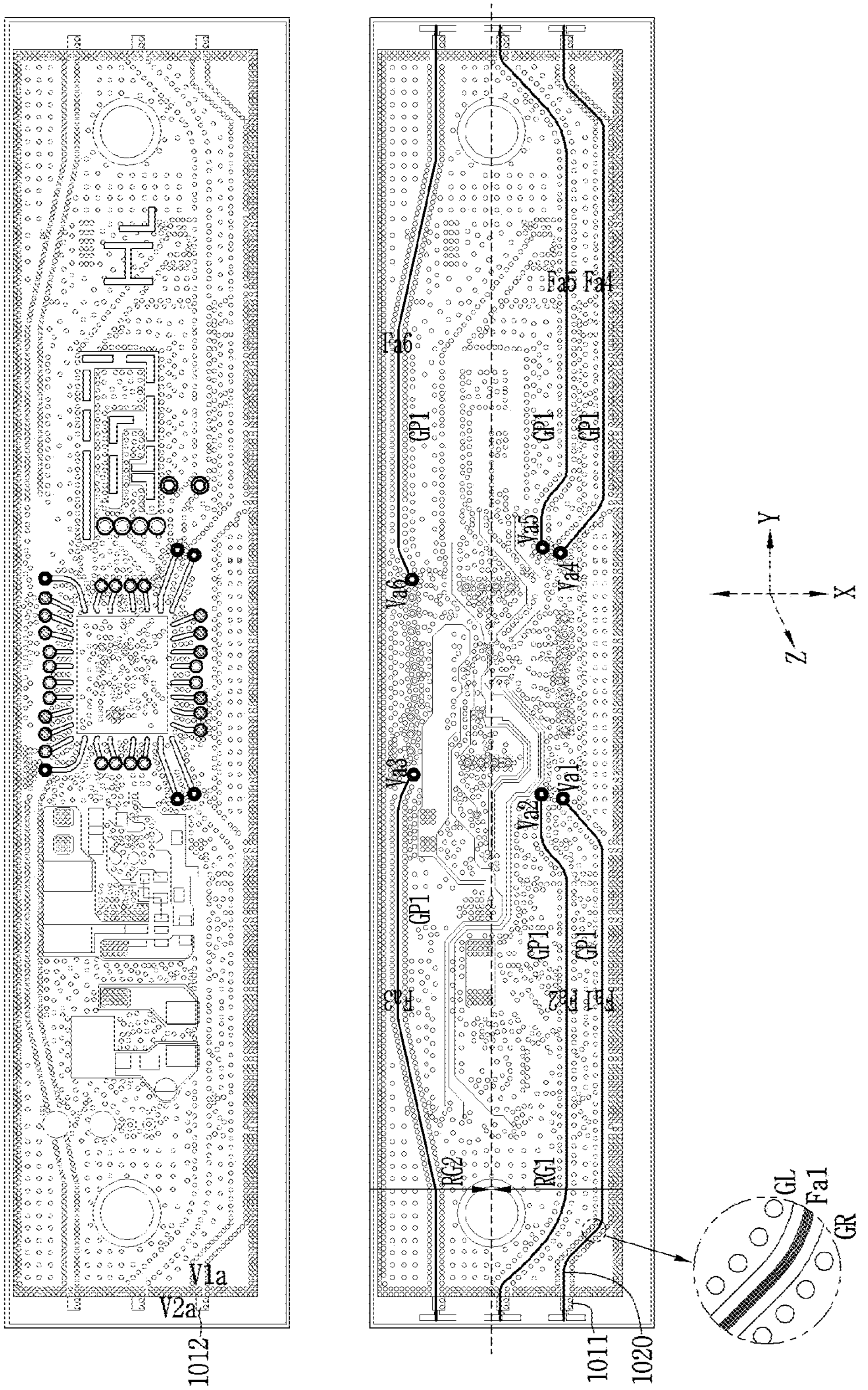
FIG. 12A is a diagram illustrating first and third layers of the antenna module of FIG. 8.
Figure 12B:
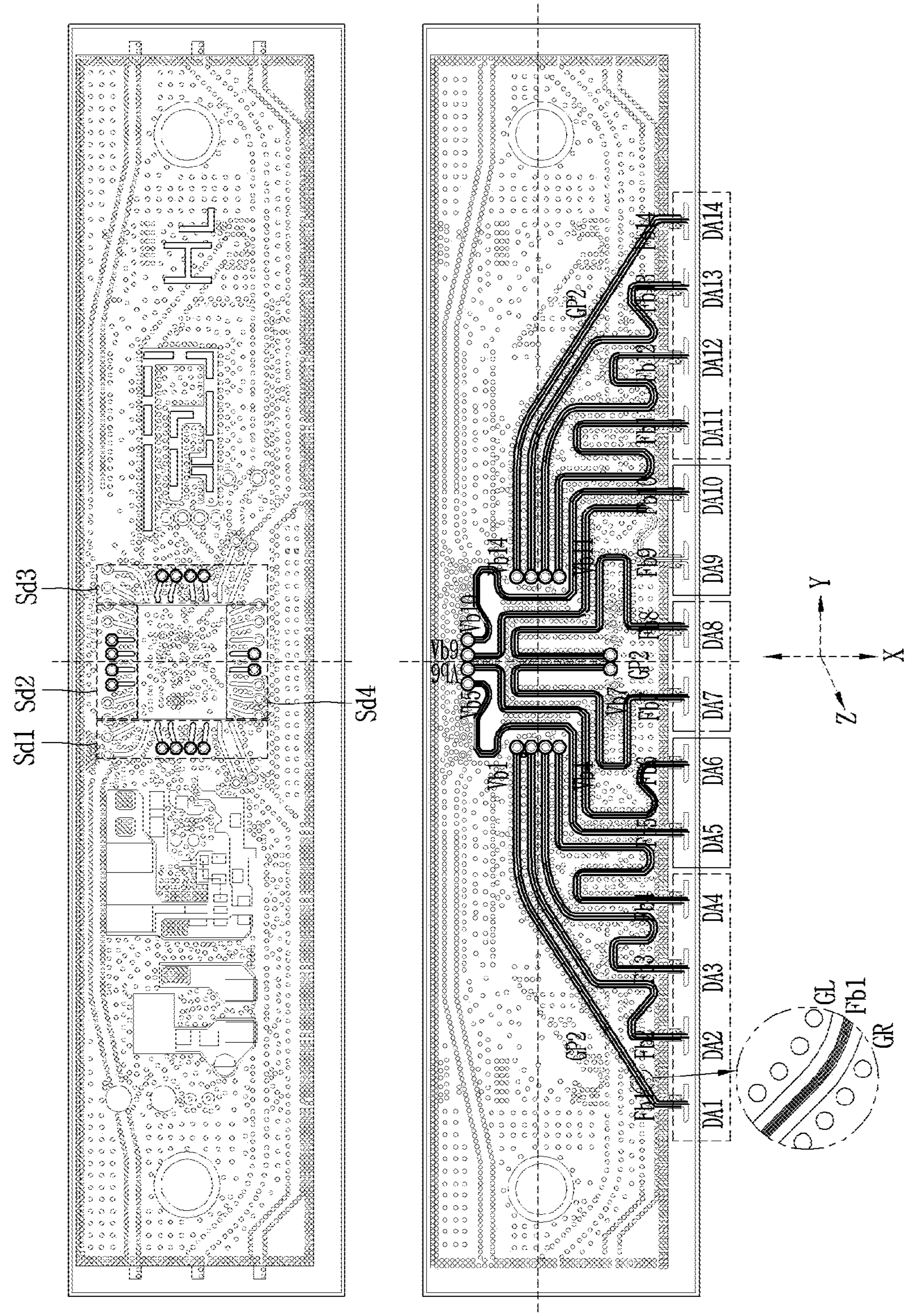
FIG. 12B is a diagram illustrating first and fifth layers of the antenna module of FIG. 8.
Figure 12C:
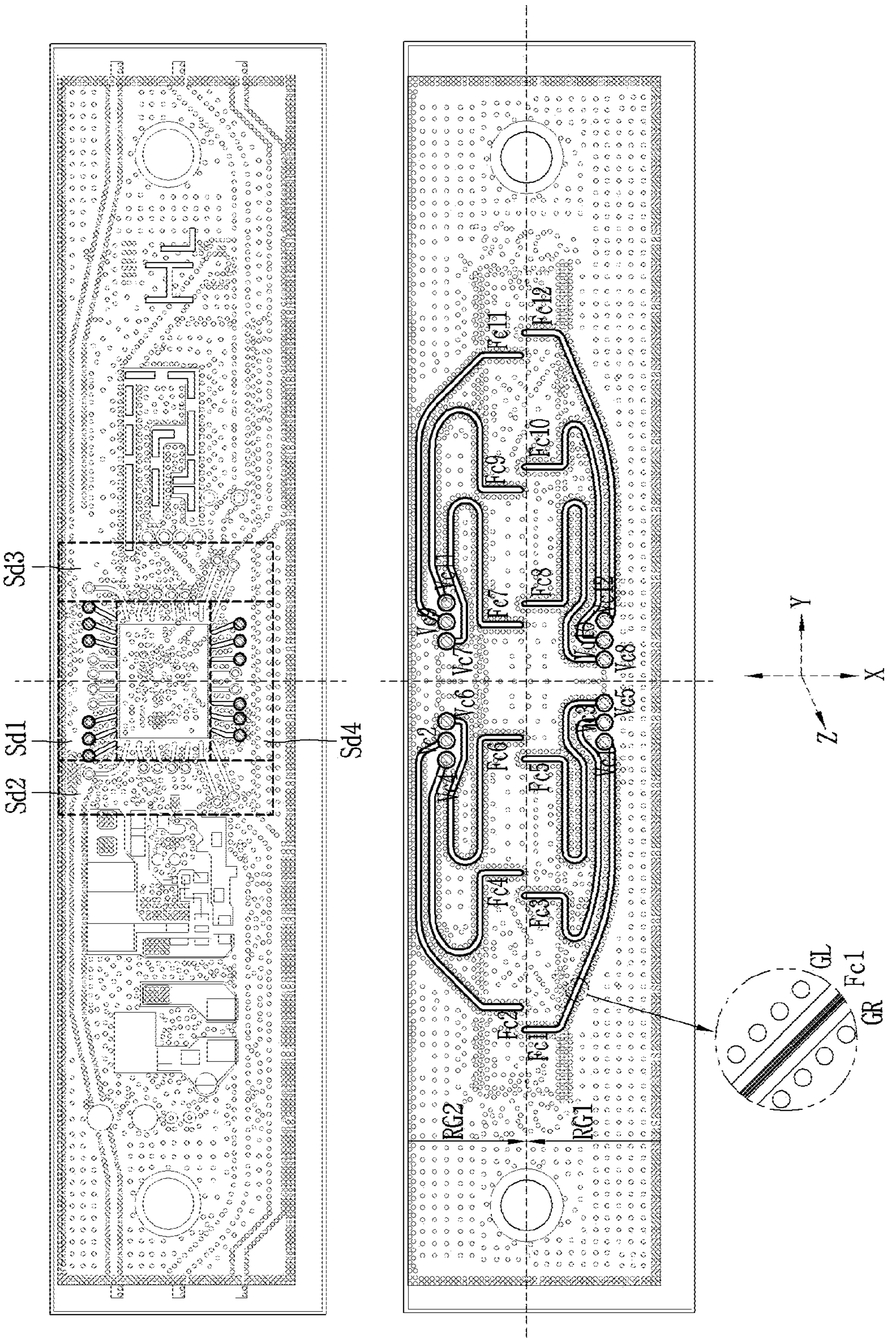
FIG. 12C is a diagram illustrating first and seventh layers of the antenna module of FIG. 8.

Hereinafter, a disposition structure for each layer of the antenna module according to the present disclosure will be described. In this regard, FIGS. 11A and 11B are front views illustrating the antenna module of FIG. 8 for each layer. On the other hand, FIG. 12A is a diagram illustrating first and third layers of the antenna module of FIG. 8. FIG. 12B is a diagram illustrating first and fifth layers of the antenna module of FIG. 8. FIG. 12C is a diagram illustrating first and seventh layers of the antenna module of FIG. 8.

Hereinafter, each layer of the antenna module 1000 will be described in detail with reference to FIGS. 6 to 12C. The antenna module 1000 may be configured by stacking layers from a first layer La1, on which the transceiver circuitry 1400 is disposed, to a fifth layer La5 and a sixth layer La6, on which the feed lines for the second array antenna 1300 are located. In addition, the antenna module 1000 may further include layers from a seventh layer La7, on which the feed lines for the third array antenna 1200 are disposed, to a twelfth layer La12, on which antenna elements of the third array antenna 1200 are disposed.

The transceiver circuitry 1400 may be disposed on the first layer La1. The transceiver circuitry 1400 may have a plurality of pins, and connection lines may be connected to the plurality of pins. The transceiver circuitry 1400 may be disposed based on a center line of the first layer La1 in one axial direction.

The second layer La2 may include a metal layer, so as to be configured as a first ground layer GND1 for the first layer La1. The dipole antennas DA21 to DA26 of the first and fourth array antennas 1100*a* and 1100*b* may be disposed on one side region and another side region of the third layer La3. End portions of first feed lines Fa1 to Fa6 of the dipole antennas DA21 to DA26 may be connected to signal connection lines of the first layer La1 by first vias Va1 to Va6. Ground patterns GL and GR with vias may be formed on one side and another side of each of the first feed lines Fa1 to Fa6, to form a first ground part GP1. Accordingly, the first feed lines Fa1 to Fa6 may be formed in a coplanar waveguide structure.

The fourth layer La4 may include a metal layer, so as to be configured as a second ground layer GND2 for the third layer La3. The first feed lines of the third layer La3 are disposed between the ground layer of the second layer La2 and the ground layer of the fourth layer La4. Accordingly, the first feed lines of the third layer La3 constitute a first coplanar waveguide structure in which the ground layers are disposed on an upper layer and a lower layer in a heightwise direction. The metal layers of the ground layer of the second layer La2 and the ground layer of the fourth layer La4 may be partially removed so that the first vias can be vertically connected.

The dipole antennas DA1 to DA14 of the second array antenna 1300 may be disposed in a bottom region of the fifth layer La5 on an XY plane. End portions of the second feed lines of the dipole antennas DA1 to DA14 may be connected to lines of the first layer La1 through second vias Vb1 to Vb14.

The sixth layer La6 may include a metal layer, so as to be configured as a ground layer GND3 for the fifth layer La5.

The second feed lines of the fifth layer La5 are disposed between the ground layer of the fourth layer La4 and the ground layer of the sixth layer La6. Accordingly, the second feed lines of the fifth layer La5 constitute a second coplanar waveguide structure in which the ground layers are disposed on an upper layer and a lower layer in a heightwise direction. The metal layers of the ground layer of the fourth layer La4 and the ground layer of the sixth layer La6 may be partially removed so that the first and second vias can be vertically connected.

On the seventh layer La7, third feed lines for the second patch antennas CP1 to CP12 of the third array antenna 1200 may be disposed. Distances between one end portion and another end portion of the third feed lines may be the same. The third feed lines may be electrically connected to the lines of the first layer La1 by third vias Vc1 to Vc12 that are formed on one end portions of the third feed lines.

The eighth layer La8 may include a metal layer, so as to be configured as a fourth ground layer GND4. The third feed lines of the seventh layer La7 are disposed between the ground layer of the sixth layer La6 and the ground layer of the eighth layer La8. Accordingly, the third feed lines of the seventh layer La7 constitute a third coplanar waveguide structure in which the ground layers are disposed on an upper layer and a lower layer in a heightwise direction. The metal layers disposed in the ground layer of the sixth layer La6 and the ground layer of the eighth layer La8 may be partially removed so that the second and third vias can be vertically connected.

As described above, the second, fourth, sixth, and eighth layers La2, La4, La6, and La8 may configure the first to fourth ground layers GND1 to GND4, respectively. Connection vias may be disposed between the ground layers to electrically connect the ground layers. The substrate 1010 may include the first ground layer GND1 for the transceiver circuitry 1400 to the fourth ground layer GND4 for the third array antenna 1200. The first and fourth array antennas 1100*a* and 1100*b* may be configured such that an antenna and signal lines are disposed on a layer between the first ground layer GND1 and the second ground layer GND2.

The third array antenna 1200 may be configured such that an antenna and signal lines are disposed on the upper layer of the fourth ground layer GND4. The second array antenna 1300 may be configured such that an antenna and signal lines between the metal layer that is the ground layer of the fourth layer La4 and the metal layer that is the ground layer of the sixth layer La6. Accordingly, the signal lines of the first and fourth array antennas 1100*a* and 1100*b*, the third array antenna 1200, and the second array antenna 1300 may be isolated by the second to fourth ground layer GN2 to GND4. This can reduce interference between the signal lines of the array antennas which are isolated from one another by the second to fourth ground layers GND2 to GND4.

In the RFIC 1400, lengths of the feed lines of the third array antenna 1200 may be the same for all antenna elements. The lengths of the feed lines of the third array antenna 1200*a* may be determined as the sum of a first length L1*a* to a fourth length L4*a*. Lengths of the feed lines for all the second patch antennas CP1 to CP12 of the third array antenna 1200 may be the same. The first length L1*a* to the fourth length L4*a* may be the same for all the second patch antennas CP1 to CP12. Accordingly, signals applied from the RFIC 1400 to all of the second patch antennas CP1 to CP12 can be in phase, and beams can be formed toward a center point.

The third vias Vc1 to Vc12 are vertically connected from the first layer La1 to the seventh layer La7. A ground region made of a metal layer and an array antenna disposition region 1010*r*, which is a first dielectric region from which the metal layer has been removed, may be formed in each of the eighth to twelfth layers La8 to La12. Coupling patches CP1 to CP12 connected to ends of the third vias Vc9 to Vc12 may be disposed on a tenth layer La10. The coupling patches CP1 to CP12 may be referred to as feed plates.

The ground regions made of the metal layers formed on the first to twelfth layers La1 to La12 are connected by a plurality of vias. The coupling patches CP1 to CP12 of the third array antenna may be disposed on the tenth layer La10.

The first patch antennas PA1 to PA12 of the third array antenna 1200 may be disposed on the twelfth layer La12. Adjacent antennas among the first patch antennas PA1 to PA12 may be disposed at equal distances. The centers of the second patch antennas CP1 to CP12 may be offset from the centers of the first patch antennas PA1 to PA12 in the Y-axis direction, which is the horizontal direction.

Hereinafter, a description will be given of a dipole antenna disposition structure of an antenna module 1000 implemented as a multi-layered antenna package according to the present disclosure. In this regard, FIGS. 13A and 13B are a front perspective view and a lateral view of an antenna module implemented as a multi-layered antenna package.

Figure 13A:
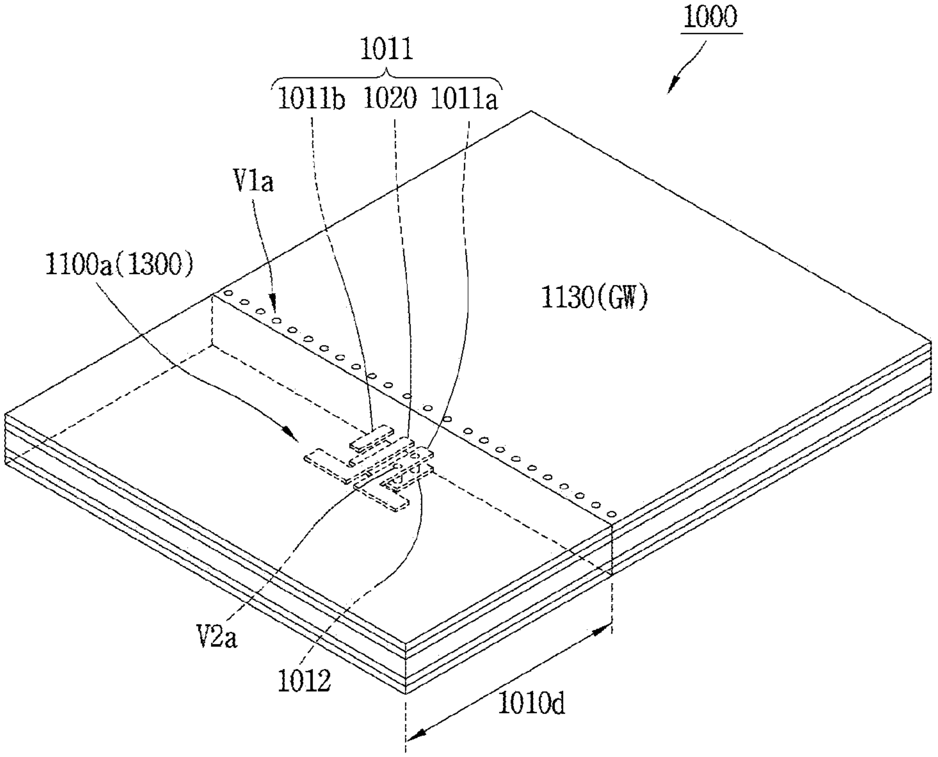
FIGS. 13A and 13B are a front perspective view and a lateral view of an antenna module implemented as a multi-layer antenna package.
Figure 13B:
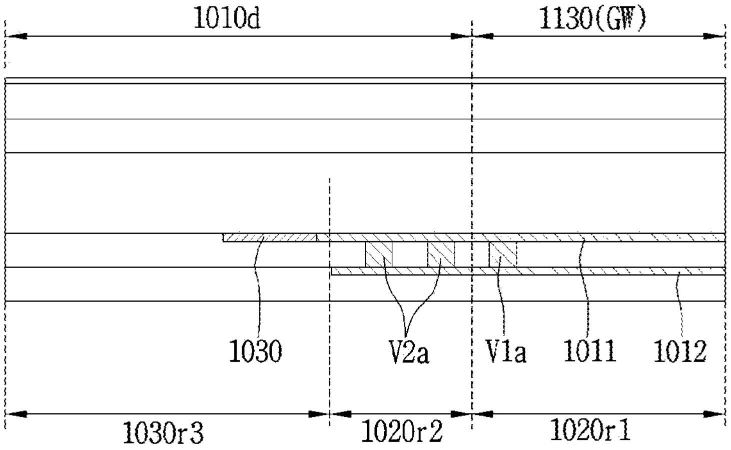

Referring to FIGS. 13A and 13B, the antenna module 1000 may be configured to include first and second ground planes 1011 and 1012, a signal line 1020, and a dipole antenna. The dipole antenna may constitute the first array antenna 1100*a* or the fourth array antenna 1100*b* including the dipole antennas DA21 to DA23 of FIGS. 7 and 12A. The dipole antenna may constitute the second array antenna 1300 including the dipole antennas DA1 to DA14 of FIGS. 7 and 12B.

Hereinafter, the antenna module 1000 which is implemented as a dipole antenna and disposed on a plurality of layers will be described, with reference to FIGS. 7, 11A, 12A, and 13B. As described above, the antenna module 1000 may be configured to include first and second ground planes 1011 and 1012, a signal line 1020, and a dipole antenna. The first ground plane 1011 is disposed on the same plane as the signal line 1020. The second ground plane 1012 is disposed on a different plane from the signal line 1020. In the dipole antenna constituting the first array antenna 1100*a*, the second ground plane 1012 may be disposed on the first layer La1. In the dipole antenna constituting the first array antenna 1100*a*, the first ground plane 1011 and the signal line 1120 may be disposed on the third layer La3.

The antenna module 1000 may include a ground wall (GW) 1130 and a dielectric region 1010*d*. First vias V1*a* may be disposed adjacent to the end portion of the ground wall 1130 which is adjacent to the dielectric region 1010*d*. The interior of the ground wall 1130 may form a transmission line section 1020*r*1. Vias may be disposed in ground regions on both sides of the signal line 1020 inside the ground wall (GW) 1130. Accordingly, the signal line 1020 inside the ground wall (GW) 1130 forms a coplanar waveguide structure with a symmetrical structure.

Meanwhile, second vias V2*a* may be disposed only in a ground region 1011*a* on one side of the signal line 1020 in a first region of the dielectric region 1010*d*. Accordingly, the signal line 1020 in the first region of the dielectric region 1010*d* forms a coplanar waveguide structure with an asymmetrical structure. The first region of the dielectric region adjacent to the ground wall 1130 may form an E-field transition section 1020*r*2.

A second region of the dielectric region 1010*d* may form a radiator section 1030*r*3. The first array antenna 1100*a* or the second array antenna 1300 implemented as a dipole antenna may be disposed in the radiator section 1030_r_3.

Electric field formed in the radiator section 1030_r_3 has the strongest intensity in a horizontal direction, which is parallel to the substrate. The dipole antenna of the radiator section 1030_r_3 may be configured to have horizontal polarization characteristics. In the coplanar waveguide structure inside the ground wall (GW) 1130, electric field is formed with the strongest intensity in a vertical direction, which is perpendicular to the substrate. Therefore, it is necessary to partially change the transmission line configuration in the electric field transition section 1020_r_2 so that a transition occurs between a vertical electric field component of a transmission line and a horizontal electric field component of an antenna. To this end, the second vias V2_a_ may be disposed only in the ground region 1011_a_ on the one side of the signal line 1020 in the first region of the dielectric region 1010_d_.

Figure 14A:
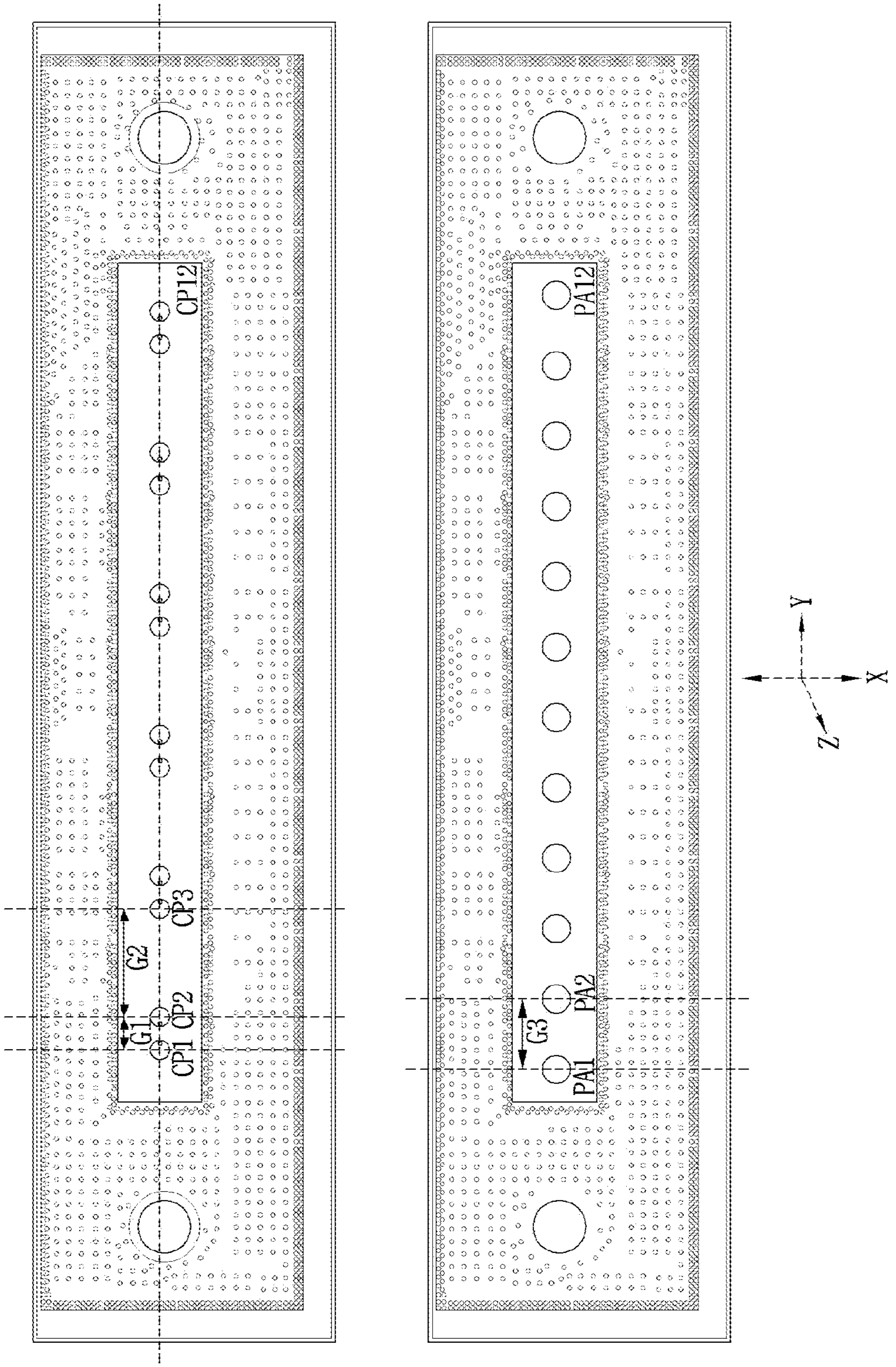
FIG. 14A is a diagram illustrating tenth and twelfth layers on which patch antennas of the antenna module of FIG. 8 are stacked.
Figure 14B:
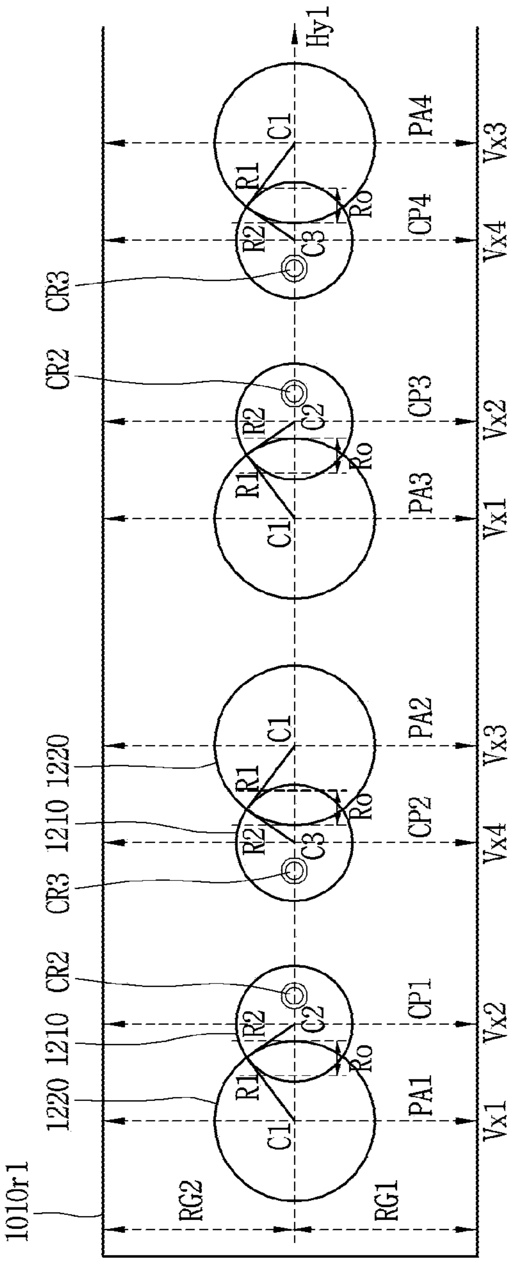
FIG. 14B is a diagram illustrating an overlap disposition structure of patch antennas disposed in an array antenna disposition region of the antenna module of FIG. 8.

Hereinafter, a description will be given of a patch antenna disposition structure of an antenna module 1000 implemented as a multi-layered antenna package according to the present disclosure. In this regard, FIG. 14A is a diagram illustrating tenth and twelfth layers on which patch antennas of the antenna module of FIG. 8 are stacked. FIG. 14B is a diagram illustrating an overlap disposition structure of patch antennas disposed in an array antenna disposition region of the antenna module of FIG. 8.

Referring to FIG. 14A, the first patch antennas PA1 to PA12 may be disposed equally at a third gap G3. A distance between the first patch antennas PA1 to PA12 may be equal to the third gap G3 on the Y axis. On the other hand, the second patch antennas CP1 to CP12 may be disposed at a first gap G1 or a second gap G2 on the Y axis. The first gap G1 may be shorter (narrower) than the third gap G3. The second gap G2 may be longer (wider) than the third gap G3.

Referring to FIG. 14B, the first patch antennas 1220 and the second patch antennas 1210 may be disposed on a first horizontal axis Hy1 corresponding to the center of the array antenna disposition region 1010_r_.

Among the first patch antennas 1220, the centers of patch antennas of a first group may be aligned and disposed in a first vertical axis Vx1. Among the second patch antennas 1210, the centers of patch antennas of a first group may be aligned and disposed in a second vertical axis Vx2. The second vertical axis Vx2 may be disposed to be spaced apart from the first vertical axis Vx1 in parallel in a positive Y-axis direction.

Among the first patch antennas 1220, the centers of patch antennas of a second group may be aligned and disposed in a third vertical axis Vx3. Among the second patch antennas 1210, the centers of patch antennas of a second group may be aligned and disposed in a fourth vertical axis Vx4. The fourth vertical axis Vx4 may be disposed to be spaced apart from the third vertical axis Vx3 in parallel in a negative Y-axis direction.

The first patch antenna 1220 may be configured as a circular patch antenna having a first diameter R1. The second patch antenna 1210 may be configured as a circular patch antenna having a second diameter R2 smaller than the first diameter R1. The first patch antenna 1220 and the second patch antenna 1210 may be disposed to have an overlap region Ro in an arcuate shape (i.e., arcuate region) in a horizontal axial direction. The length of the overlap region Ro between the first and second patch antennas 1210 and 1220 may be smaller than a radius R2 of the second patch antenna 1210.

When the third signal lines Fc1 to Fc12 are connected to connection regions CR2 and CR3 through feed vias at offset points, for example, right and left points of the second patch antenna 1210, a polarization of electronic waves radiated from the second patch antenna 1210 is formed only in right and left directions. The connection regions CR2 and CR3 are formed at offset points by predetermined distances from the center point of the second patch antenna 1210.

A current distribution in regions adjacent to the connection regions CR2 and CR3 appears higher than that in surrounding regions. A mode formed on the second patch antenna on which the current distribution is made in the left and right directions is a TE11 mode.

The connection regions CR2 and CR3 may be formed on the second patch antenna 1210 in a direction away from the center of the second patch antenna 1210 in the Y-axis direction. Therefore, the current generated on the second patch antenna 1210 in the left and right directions produces a dominant current distribution. Accordingly, the antenna elements including the first and second patch antennas 1210 and 1220 operate in the TE11 mode. This increases left and right co-polarization radiation performance, other than top and bottom cross-polarization, thereby improving antenna gain performance.

Top and bottom current components are attenuated by the TE 11 mode, so as to substantially disappear. Therefore, the co-polarization radiation performance corresponding to horizontal polarization increases and the antenna gain is improved. Also, the cross-polarization component can be reduced, and thus data throughput performance improvement can be expected by virtue of MIMO performance improvement.

Figure 15:
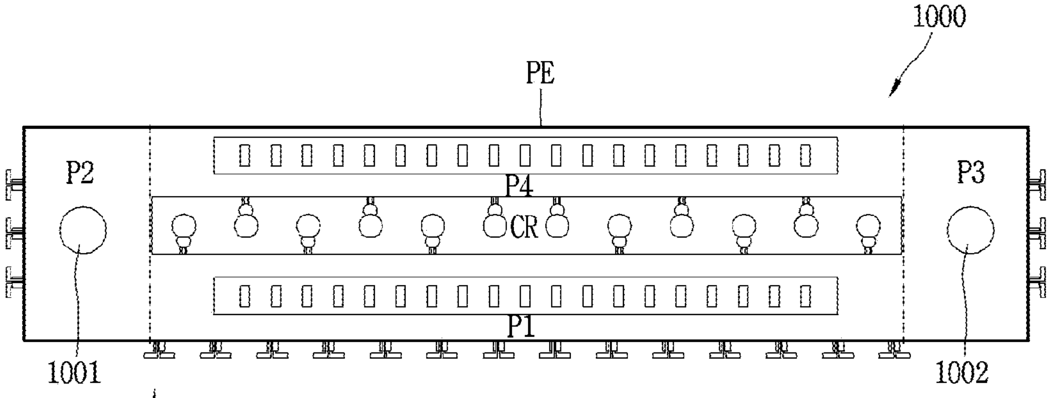
FIG. 15 illustrates a cross-sectional view and a three-dimensional structure of a substrate on which the antenna module is disposed.
Figure 15:
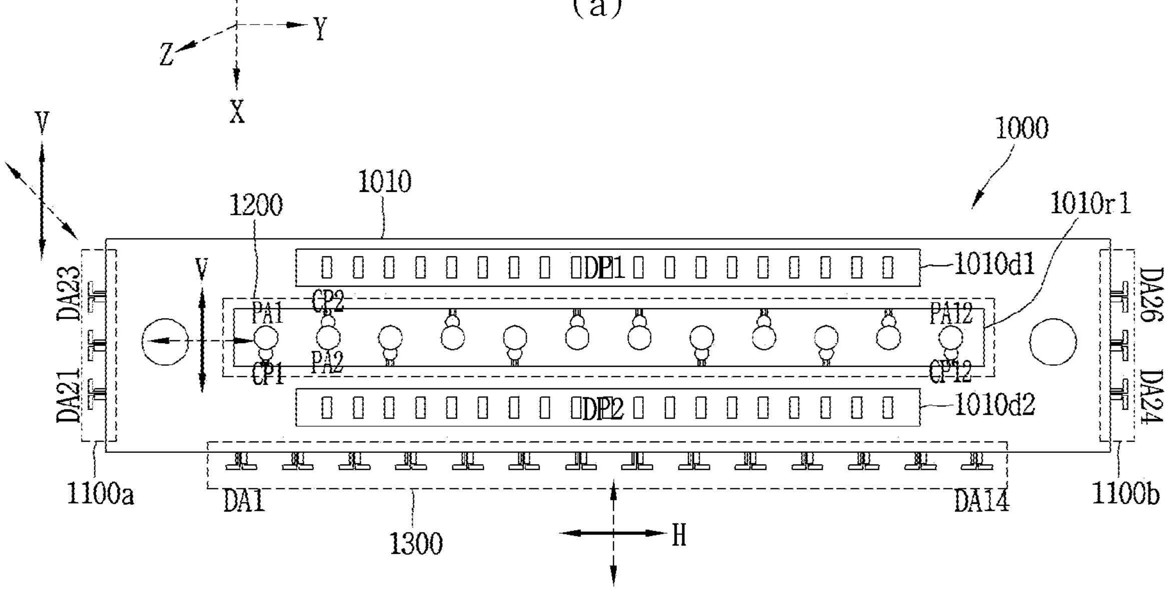
Figure 15:
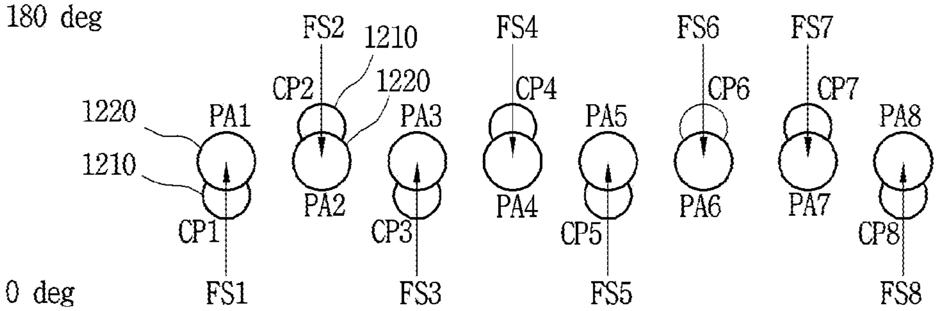

Meanwhile, in the antenna module implemented as a multi-layered package according to the present disclosure, the third array antenna disposed at the center of the PCB may be implemented with vertical polarization in addition to horizontal polarization. In this regard, FIG. 15 illustrates a cross-sectional view and a three-dimensional structure of a substrate on which the antenna module is disposed. Meanwhile, FIG. 16 illustrates a partial perspective view of the antenna module of FIG. 15 and a cross-sectional view of the antenna module on a specific line.

(a) of FIG. 15 illustrates a substrate with the antenna module 1000 for each region. (b) of FIG. 15 is a diagram illustrating array antennas disposed in each region of the antenna module 1000. (c) of FIG. 15 is a diagram illustrating a structure in which a feed signal is applied to some antenna elements disposed in the array antenna disposition region.

Referring to FIG. 15, the substrate 1010 may include a central region CR and a periphery PE surrounding the central region CR. The periphery PE of the substrate 1010 may include a first part P1 through a fourth part P4. The first part P1 constitutes a bottom region of the substrate 1010, and the second part P2 constitutes one side region of the substrate 1010. The third part P3 constitutes another side region of the substrate 1010, and the fourth part P4 constitutes a top region of the substrate 1010. The antenna module 1000 may be configured to include the substrate 1010, and a third array antenna 1200 disposed in an array antenna disposition region 1010_r_.

Figure 16:
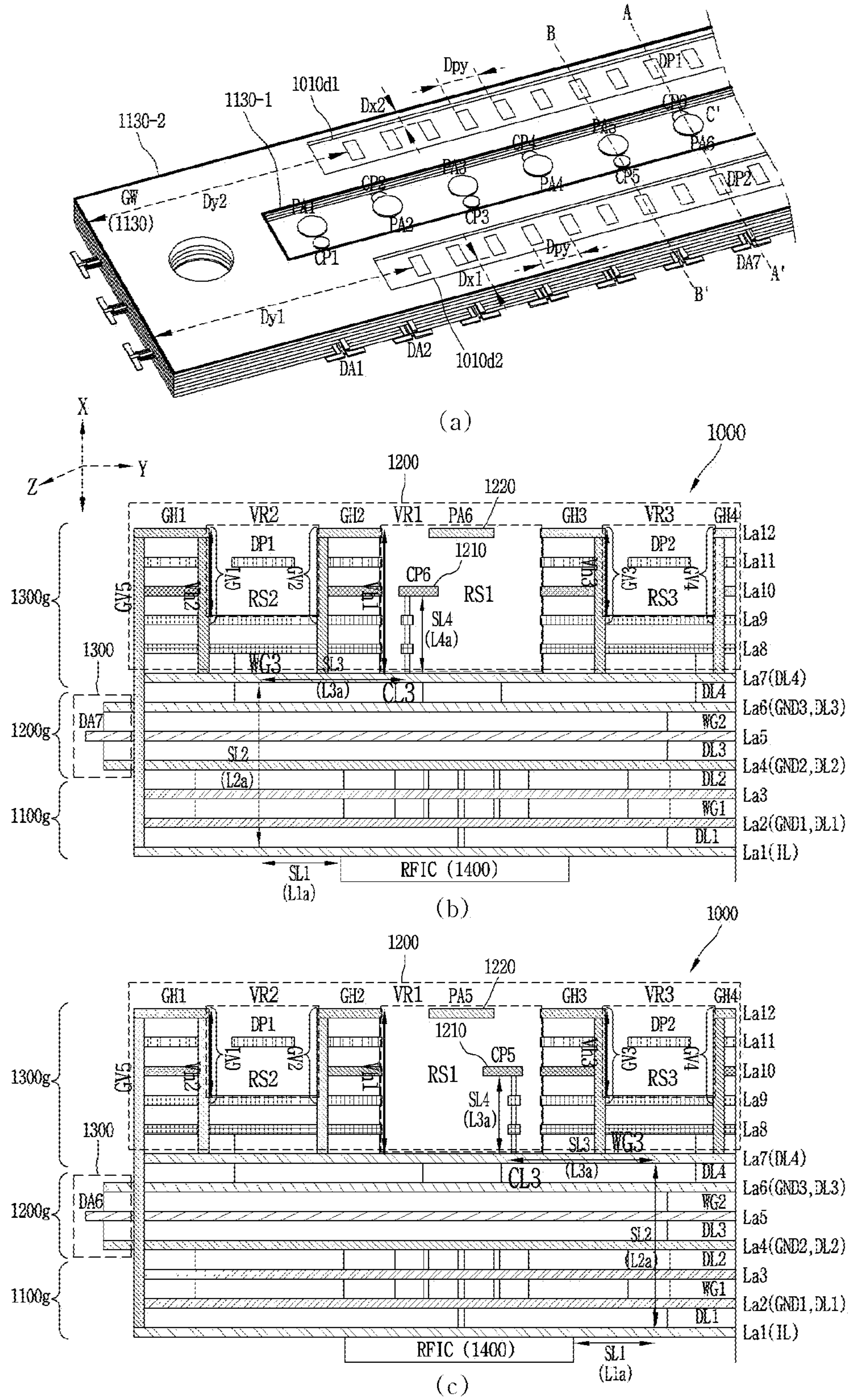
FIG. 16 illustrates a partial perspective view of the antenna module of FIG. 15 and a cross-sectional view of the antenna module on a specific line.

(a) of FIG. 16 is a perspective view illustrating one side region based on the center of the antenna module 1000. (b) of FIG. 16 is a cross-sectional view according to the line AA' of the antenna module 1000. (c) of FIG. 16 is a cross-sectional view according to the line BB' of the antenna module 1000.

Referring to FIGS. 6, 15, and 16, the first array antenna 1100_a_ is disposed on the second surface S2 of the substrate 1010. The third array antenna 1200 may be disposed on the third surface S3 and an inner space of the substrate 1010. The second array antenna 1300 may be disposed on the fourth surface S4 of the substrate 1010. A region where the second array antenna 1300 is disposed may form a first ground layer 1100*g* having a first coplanar waveguide structure.

The fourth array antenna 1100*b* may further be disposed on the fifth surface S5 of the substrate 1010. A region where the first and fourth array antennas 1100*a* and 1100*b* are disposed may form a second ground layer 1200*g* having a second coplanar waveguide structure. A region where the third array antenna 1200 is disposed may form a third ground layer 1300*g* having a third coplanar waveguide structure.

The inner ground wall (GW) 1130-1 formed inside the PCB 1010 may operate as a ground for radiation of the patch antennas PA1 to PA12 and CP1 to CP12. The ground wall (GW) 1130 functions as a reflector that suppresses side surface radiation of the patch antennas PA1 to PA12 and CP1 to CP12. In addition, an outer ground wall 1130-2 formed on an outer surface of the PCB, namely, the substrate 1010 suppresses radiation to an opposing side surface of the dipole antennas DA21 to DA23 having a side surface radiation structure, and functions as a reflector toward the corresponding side surface. The ground wall (GW) 1130 suppresses rear surface radiation of the dipole antennas DA1 to DA14 having a front surface radiation structure, and functions as a reflector toward the front surface.

The ground wall (GW) 1130 is formed on side surface portions of the antenna module 1000 by a plurality of vias connecting the ground layers formed on the plurality of layers. The ground wall (GW) 1130 may include horizontal ground walls GH1 and GH2 and vertical ground walls GV1 to GV4. The first and second patch antennas may be disposed inside spaces defined by the horizontal ground walls GH1 and GH2, the vertical ground walls GV1 and GV2, and the ground layer inside the PCB.

Distances between the ground wall (GW) 1130 and the dummy patches DP1 to DP2, respective sizes thereof, and the like may be implemented within predetermined ranges based on a half-wavelength period of an operating frequency of 60 GHz. Here, the distance Dy1, Dx1 between the ground wall (GW) 1130 and the dummy pattern DP1 is defined as a distance from the dummy pattern DP1 to the top of the ground wall (GW) 1130 on the horizontal and vertical axes. The distance Dy2, Dx2 between the ground wall (GW) 1130 and the dummy pattern DP2 is defined as a distance from the dummy pattern DP2 to the bottom of the ground wall (GW) 1130 on the horizontal and vertical axes. A distance Dpy between the dummy patterns DP1 and DP2 adjacent to each other in the horizontal axial direction may be implemented within a predetermined range based on a half-wavelength of 60 GHz. The layer location and size of the second patch antennas 1210, which are coupling patches, and the overlap region with the first patch antennas 1220 may be designed in consideration of radiation characteristics and array characteristics.

Hereinafter, the antenna module 1000 according to the present disclosure will be described with reference to FIGS. 6, 15, and 16. The antenna module 1000 may be configured to include a substrate 1010, first to fourth array antennas 1100*a*, 1300, 1200, and 1100*b*, and an RFIC 1400, which is a millimeter wave transceiver circuitry.

The substrate 1010 may include a first surface S1, a fourth surface S4, and a periphery PE. The periphery PE may be formed between the first surface S1 and the fourth surface S4. The first surface S1 may be opposite to the fourth surface S4. A ground region and an array antenna disposition region 1010*r* may be formed on the fourth surface S4. The substrate 1010 may be implemented as a multi-layer substrate. For example, the substrate 1010 may be implemented as a substrate with twelve layers, but is not limited thereto, and may vary depending on applications.

The fourth surface S4 of the substrate 1010 is divided into a central region CR, a first part P1, a second part P2, a third part P3, and a fourth part P4. The second part P1 may be defined on the left side of the first part P1 and the third part P3 is defined on the right side. The array antenna disposition region 1010*r* may be formed in the central region CR, which is inside the ground region of the first part P1 and the fourth part P4. A ground region is disposed in the second part P2 and a first through hole 1001 is disposed inside the ground region. A ground region is disposed in the third part P3 and a second through hole 1002 is disposed inside the ground region. Screws may be inserted into the first through hole 1001 of the second part P2 and the second through hole 1002 of the third part P3, so that the antenna module 1000 is coupled to the support structure such as the heat sink inside the electronic device.

The fourth surface S4 may be an outermost surface of the PCB 1010. The fourth surface S4 may be formed of a metal layer connected to the ground. On the inner surface of the metal layer may be disposed a first region RS1 where the first patch antenna 1220 is disposed, and a second region RS2 and a third region RS3 which are located on both sides of the first region RS1 and do not operate as a ground.

A first vertical region VR1 which is the same region as the first region RS may be formed from the outermost surface of the PCB 1010 to an upper ground layer of an antenna direction of an inner layer, on which the signal connection lines of the third part SL3 are disposed inside the PCB. The patch antennas 1210 and 1220 and a dielectric material may be disposed in the first vertical region VR1. The outer peripheral surface of the first vertical region VR1 may form ground walls.

A second vertical region VR2 which is the same region as the second region RS2 may be formed from the outermost surface of the PCB 1010 to the ground layer inside the PCB. First parasitic metals DP1 and a dielectric material may be disposed in the second vertical region VR2. The outer peripheral surface of the second vertical region VR2 may form ground walls. A third vertical region VR3 which is the same region as the third region RS3 may be formed from the outermost surface of the PCB 1010 to the ground layer inside the PCB. Second parasitic metals DP2 and a dielectric material may be disposed in the third vertical region VR3. The outer peripheral surface of the third vertical region VR3 may form ground walls. The first parasitic metals DP1 and the second parasitic metals DP2 may correspond to first dummy patterns and second dummy patterns.

A first vertical height Vh1 of the first vertical region VR1 may be higher than a second vertical height Vh2 of the second vertical region VR2. The first vertical height Vh1 of the first vertical region VR1 may be higher than a third vertical height Vh3 of the third vertical region VR3. The second vertical height Vh2 of the second vertical region VR2 may be the same as the third vertical height Vh3 of the third vertical region VR3.

The first surface S1 of the substrate 1010 is divided into a central region CR, a first part P1, a second part P2, a third part P3, and a fourth part P4. The second part P1 may be defined on the left side of the first part P1 and the third part P3 is defined on the right side. A ground region is disposed in the first part P1 and a second dummy array pattern region 1010*d*2 is formed therein. An array antenna disposition region 1010*r* is formed in the central region CR. A ground region is disposed in the fourth part P4 and a first dummy array pattern region 1010*d*1 is formed therein. A ground region is disposed in the second part P2 and a first through hole 1001 is disposed inside the ground region. A ground region is disposed in the third part P3 and a second through hole 1002 is disposed inside the ground region. Screws may be inserted into the first through hole 1001 of the second part P2 and the second through hole 1002 of the third part P3, so that the antenna module 1000 is coupled to the support structure such as the heat sink inside the electronic device.

The first array antenna 1100*a* is disposed in an outer peripheral surface PE region of the second part P2. The fourth array antenna 1100*b* is disposed in an outer peripheral surface PE region of the third part P3. The first array antenna 1100*a* and the fourth array antenna 1100*b* may form beam patterns to side regions of the electronic device. The third array antenna 1100*a* and the fourth array antenna 1100*b* may radiate vertically polarized signals to the side regions of the electronic device.

The first array antenna 1100*b* may include a plurality of dipole antennas DA21 to DA23. The fourth array antenna 1100*b* may include a plurality of patch antennas DA24 to DA26. The first array antenna 1100*a* and the fourth array antenna 1100*b* may be implemented to have three antenna elements on one side and another side of the periphery PE of the substrate 1010*a*, respectively. The first array antenna 1100*a* may be implemented as a 1×3 array antenna on the one side of the substrate 1010, but is not limited thereto. The fourth array antenna 1100*b* may be implemented as a 1×3 array antenna on the another side of the substrate 1010, but is not limited thereto.

The third array antenna 1200 may be disposed on the first surface S1 of the substrate 1010. The third array antenna 1200 may form a beam pattern toward the bottom region of the electronic device. The second array antenna 1300*b* may radiate a vertically polarized signal to the bottom region of the electronic device. The third array antenna 1200 may be implemented to have 12 antenna elements on the central region CR of the substrate 1010.

The third array antenna 1200 may include a plurality of patch antennas PA1 to PA12 disposed on the first surface S1 of the substrate 1010. The dummy patterns DP1 and DP2 may be disposed on top and bottom regions of the patch antennas PA1 to PA12 on the XY plane, thereby suppressing side surface radiation. The third array antenna 1300*b* may be implemented as a 1×12 array antenna on the center region CR of the substrate 1010, but is not limited thereto.

Each patch antenna of the third array antenna 1200 may include a first patch antenna 1220 and a second patch element 1210. The second patch antennas 1210 may be stacked in a Z-axis direction, which is a height direction, on the first patch antennas 1220 such that signals of the first patch antennas 1220 are coupled. The center of the second patch antenna 1210 may be offset from the center of the first patch antenna 1220 in a Y-axis direction that is a horizontal axial direction.

In this regard, the second patch antennas 1210 in the first, third, fifth, eighth, tenth, and twelfth rows may be disposed to be offset with respect to the first patch antennas 1220 to a bottom region based on the Y-axis. The second patch antennas 1210 in the second, fourth, sixth, seventh, ninth, and eleventh rows may be disposed to be offset with respect to the first patch antennas 1220 to a top region based on the X-axis. Accordingly, the second patch antennas 1220 may alternately be offset in different directions with respect to the first patch antennas 1220.

A current direction of signals applied to the second patch antennas 1210 in the first, third, fifth, eighth, tenth, and twelfth rows is from bottom to top. A current direction of signals applied to the second patch antennas 1210 in the second, fourth, sixth, seventh, ninth, and eleventh rows is from top to bottom. Accordingly, the current direction of the signals applied to the second patch antennas 1210, which are alternately offset in different directions, and that of the corresponding first patch antennas 1220 are opposite to each other. Accordingly, a phase difference between the signals applied to the second patch elements 1210, which are alternately disposed to be offset, is supposed to be 180 degrees so that the currents flow in the same direction. To this end, the RFIC 1400 may control a phase shifter such that the phase difference between the signals applied to the second patch elements 1210 is 180 degrees.

In this regard, a first feed signal FS1 may be applied to a coupling patch CP1, which is the second patch antenna 1210 in the first row. A second feed signal FS2 may be applied to a coupling patch CP2, which is the second patch antenna 1210 in the second row. If the first and second feed signals FS1 and FS2 are in-phase signals, electric fields are formed in opposite directions in the coupling patches CP1 and CP2. A directional beam may be formed only when the electric field directions of the coupling patches CP1 and CP2 are the same. For this purpose, a phase difference between the first feed signal FS1 and the second feed signal FS2 needs to be 180 degrees.

Similarly, a seventh feed signal FS7 may be applied to a coupling patch CP7, which is the second patch antenna 1210 in the seventh row. An eighth feed signal FS8 may be applied to a coupling patch CP8, which is the second patch antenna 1210 in the eighth row. If the seventh and eighth feed signals FS7 and FS8 are in-phase signals, the electric fields may be formed in opposite directions in the coupling patches CP7 and CP8. A directional beam may be formed only when the electric field directions of the coupling patches CP7 and CP8 are the same. To this end, the phase difference between the seventh feed signal FS7 and the eighth feed signal FS8 needs to be 180 degrees.

Accordingly, the first, third, fifth, and eighth feed signals FS1, FS3, FS5, and FS8 applied to the coupling patches CP1, CP3, CP5, and CP8, which are the second patch antennas 1210 in the first, third, fifth, and eighth rows, have a first phase value. On the other hand, the second, fourth, sixth, and seventh feed signals FS2, FS4, FS6, and FS7, which are applied to the coupling patches CP2, CP4, CP6, and CP7, which are the second patch antennas 1210 in the second, fourth, sixth, and seventh rows, have a second phase value which has a phase difference of 180 degrees from the first phase value.

The second array antenna 1300 may be disposed on the first part P1 of the periphery PE of the substrate 1010. The second array antenna 1300 may form a beam pattern toward the front region of the electronic device. The second array antenna 1200 may radiate a horizontally polarized signal to the front region of the electronic device.

The second array antenna 1300 may include a plurality of dipole antennas DA1 to DA14 disposed on the first part P1 of the periphery PE of the substrate 1010. The second array antenna 1300 may be implemented to have 14 antenna elements on the lower side of the periphery PE of the substrate 1010. The second array antenna 1300 may be implemented as a 1×14 array antenna on the lower side of the periphery PE of the substrate 1010, but is not limited thereto.

The RFIC 1400 may be configured to transmit and receive signals at frequencies between 10 GHz and 400 GHz using at least one of the first and fourth array antennas 1100*a* and 1100*b*, the third array antenna 1200, and the second array antenna 1300. The RFIC 1400 may be configured to transmit and receive signals at frequencies between 10 GHz and 400 GHz using at least one of the plurality of dipole antennas DA21 to DA26, the plurality of patch antennas PA1 to PA12, and the plurality of dipole antennas DA1 to DA14. The RFIC 1400 may be referred to as a radio frequency integrated chip.

The number of elements of the second array antenna 1300 forming the beam pattern toward the front region may be set to be greater than the number of elements of the third array antenna 1200 forming the beam pattern toward the bottom region. The number of elements of the third array antenna 1200 forming the beam pattern toward the bottom region may be set to be greater than the number of elements of the first and fourth array antennas 1100*a* and 1100*b* forming the beam patterns toward the side regions.

In this regard, 12 pins of 32 pins of the RFIC 1400 may be connected to the third array antenna 1200 forming the beam pattern toward the bottom region. 14 pins of the 32 pins of the RFIC 1400 may be connected to the second array antenna 1300 forming the beam pattern toward the front region. 6 pins of the 32 pins of the RFIC 1400 may be connected to the first and fourth array antennas 1100*a* and 1100*b* forming the beam patterns toward the side regions.

In this regard, since the second array antenna 1300 has the largest number of elements, it can transmit signals over a long distance to the front region of the electronic device, but has a narrow beam coverage. The narrow beam coverage can be supplemented by changing a direction of beam to a horizontal direction of the front region through beamforiming. The number of elements of the second array antenna 1300 may be plural in the Y-axis direction and one in the Z-axis direction. For example, the second array antenna 1300 may be implemented as a 1×14 array antenna.

The electronic device needs to perform wireless communication with another electronic device disposed in the bottom region thereof. For wireless communication, beamforming may be implemented in units of narrow beam coverage in a horizontal direction, which is the Y-axis direction, in the bottom region of the electronic device. Meanwhile, it is not necessary to transmit a signal to the bottom region of the electronic device over a longer distance than the front region. The number of elements of the third array antenna 1200 may be plural in one axial direction and one in another axial direction. For example, the third array antenna 1200 may be implemented as a 1×8, 1×10, or 1×12 array antenna.

Signals may be transferred to the side regions of the electronic device in an indoor radio wave environment where the electronic device is disposed. It is more important to implement a wide beam coverage for the side regions of the electronic device even without beamforming, than to implement a signal transmission over a long distance. In this regard, since the number of elements of the first and fourth array antennas 1100*a* and 1100*b* is the smallest, a wide beam coverage to the side regions of the electronic device can be achieved. Accordingly, the number of elements of the first and fourth array antennas 1100*a* and 1100*b* may be plural in the one axial direction and one in the another axial direction. For example, the first and fourth array antennas 1100*a* and 1100*b* may be implemented as a 1×3 array antenna on one side and another side.

Figure 17A:
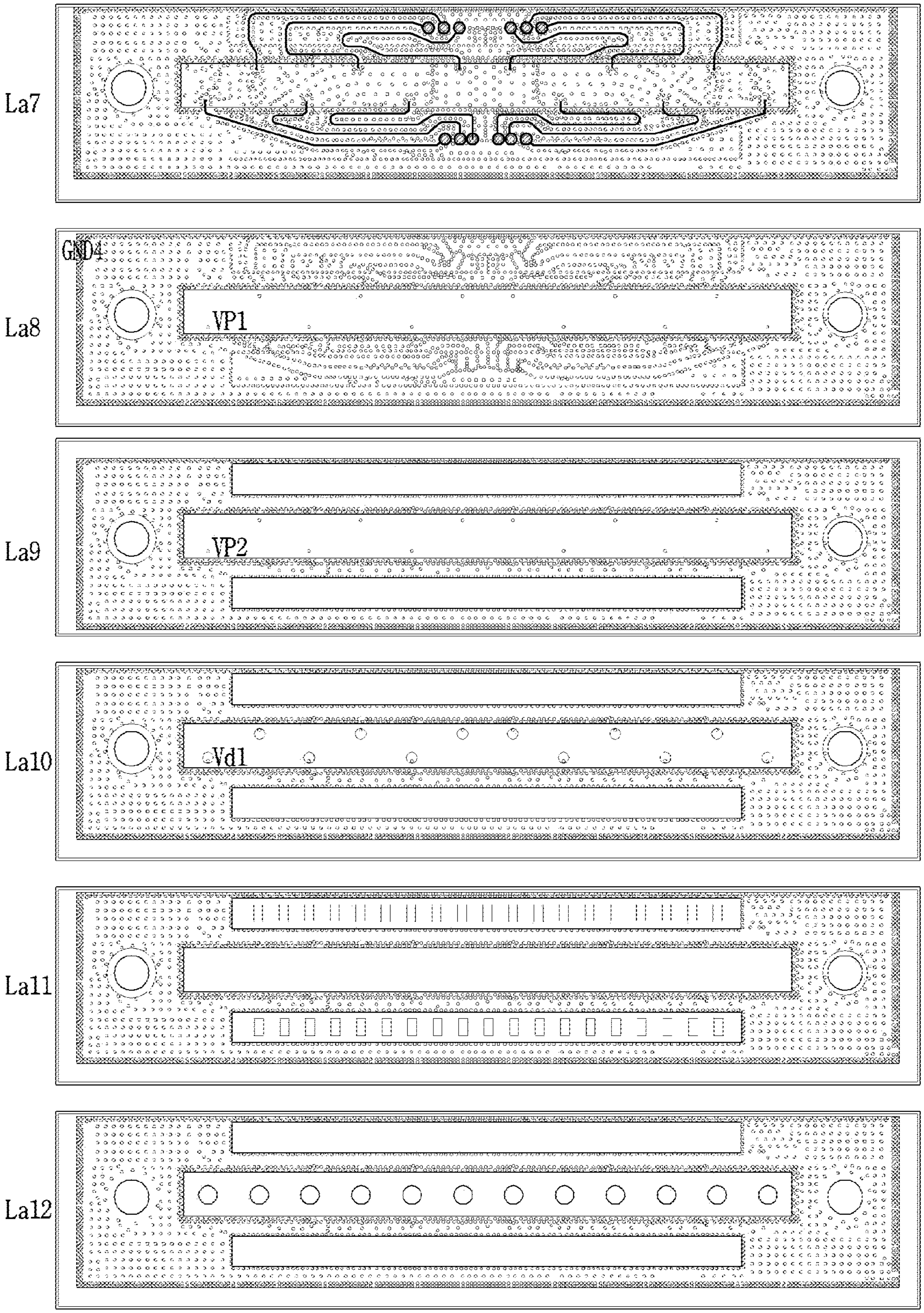
FIG. 17A is a front view illustrating a third array antenna of the antenna module of FIG. 16 for each layer.
Figure 17B:
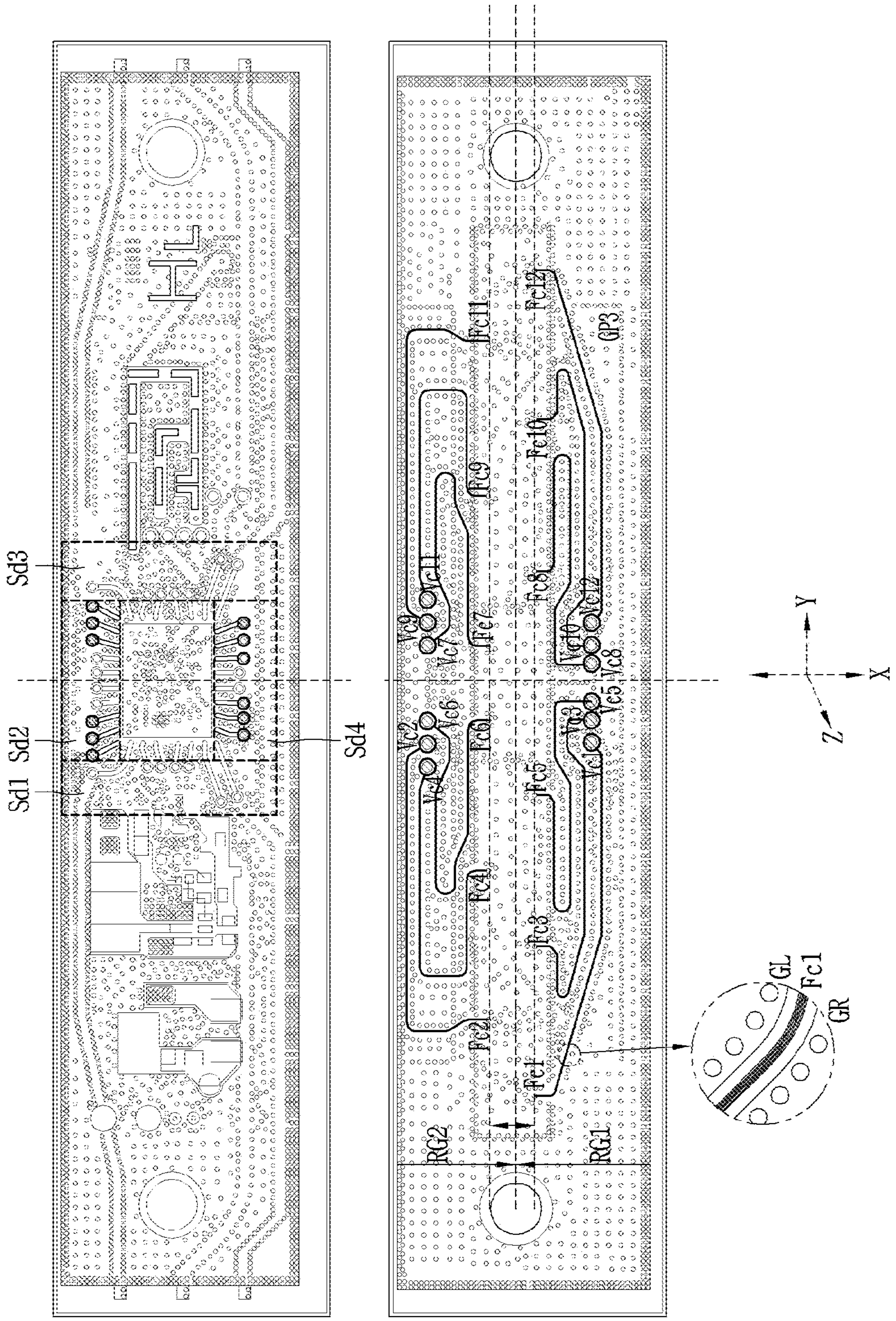
FIG. 17B is a diagram illustrating first and seventh layers of the antenna module of FIG. 16.

Hereinafter, a disposition structure for each layer of the antenna module according to the present disclosure will be described. FIG. 17A is a front view illustrating a third array antenna of the antenna module of FIG. 16 for each layer. In this regard, FIGS. 11A and 17A are front views illustrating the antenna module of FIG. 16 for each layer. On the other hand, FIG. 17B is a diagram illustrating first and seventh layers of the antenna module of FIG. 16.

Hereinafter, each layer of the antenna module 1000 will be described in detail with reference to FIGS. 15 to 17B. In relation to this, the detailed description of the first to seventh layers La1 to La7 of the antenna module has been given in FIG. 11A, so redundant description will be omitted.

Hereinafter, the third array antenna 1200 of the antenna module 1000 will be described for each layer, with reference to FIGS. 15 to 17B. The eighth layer La8 may include a metal layer, so as to be configured as a fourth ground layer GND4. The third feed lines of the seventh layer La7 are disposed between the ground layer of the sixth layer La6 and the ground layer of the eighth layer La8. Accordingly, the third feed lines of the seventh layer La7 constitute a third coplanar waveguide structure in which the ground layers are disposed on an upper layer and a lower layer in a heightwise direction. The metal layers disposed in the ground layer of the sixth layer La6 and the ground layer of the eighth layer La8 may be partially removed so that the second and third vias can be vertically connected.

As described above, the second, fourth, sixth, and eighth layers La2, La4, La6, and La8 may configure the first to fourth ground layers GND1 to GND4, respectively. Connection vias may be disposed between the ground layers to electrically connect the ground layers. The substrate 1010 may include the first ground layer GND1 for the transceiver circuitry 1400 to the fourth ground layer GND4 for the third array antenna 1200. The first and second array antennas 1100*a* and 1100*b* may be configured such that an antenna and signal lines are disposed on a layer between the first ground layer GND1 and the second ground layer GND2.

The third array antenna 1200 may be configured such that an antenna and signal lines are disposed on the upper layer of the fourth ground layer GND4. The second array antenna 1300 may be configured such that an antenna and signal lines are disposed between the metal layer that is the ground layer of the fourth layer La4 and the metal layer that is the ground layer of the sixth layer La6. Accordingly, the signal lines of the first and fourth array antennas 1100*a* and 1100*b*, the third array antenna 1200, and the second array antenna 1300 may be isolated by the second to fourth ground layer GN2 to GND4. This can reduce interference between the signal lines of the array antennas which are isolated from one another by the second to fourth ground layers GND2 to GND4.

In the RFIC 1400, lengths of the feed lines of the third array antenna 1200 may be the same for all antenna elements. The lengths of the feed lines of the third array antenna 1200*a* may be determined as the sum of a first length L1*a* to a fourth length L4*a*. Lengths of the feed lines for all the second patch antennas CP1 to CP12 of the third array antenna 1200 may be the same. The first length L1*a* to the fourth length L4*a* may be the same for all the second patch antennas CP1 to CP12. Accordingly, signals applied from the RFIC 1400 to all the second patch antennas CP1 to CP12 can be in phase, and beams can be formed toward a center point.

The third vias Vc1 to Vc12 are vertically connected from the first layer La1 to the seventh layer La7. A ground region made of a metal layer and an array antenna disposition region 1010*r*, which is a first dielectric region from which the metal layer has been removed, may be formed in each of the eighth to twelfth layers La8 to La12. The coupling patches CP1 to CP12 connected to ends of the third vias Vc9 to Vc12 may be disposed on a tenth layer La10. The coupling patches CP1 to CP12 may be referred to as feed plates.

The ground regions made of the metal layers formed on the first to twelfth layers La1 to La12 are connected by a plurality of vias. Coupling patches CP1 to CP12 of the third array antenna may be disposed on the tenth layer La10.

A metal layer forming a ground wall GW may be partially disposed on the eleventh layer La11. Second and third dielectric regions 1010*d*1 and 1010*d*2, from which the metal layer operating as the ground has been removed, may be formed in the top and bottom regions of the eleventh layer La11. The dummy patterns DP1 and DP2 may be disposed inside the second and third dielectric regions 1010*d*1 and 1010*d*2.

The ground region made of the metal layer and the second dielectric region 1010*d*1 and the third dielectric region 1010*d*2, from which metal layers have been removed, may be additionally formed on the tenth layer La10 to twelfth layer La12. The second and third dielectric regions 1010*d*1 and 1010*d*2 may correspond to the first and second dummy array pattern regions 1010*d*1 and 1010*d*2.

The first patch antennas PA1 to PA12 of the third array antenna 1200 may be disposed on the twelfth layer La12. Adjacent antennas among the first patch antennas PA1 to PA12 may be disposed at equal distances. The centers of the second patch antennas CP1 to CP12 may be offset from the centers of the first patch antennas PA1 to PA12 in the X-axis direction, which is the vertical axial direction.

Figure 18A:
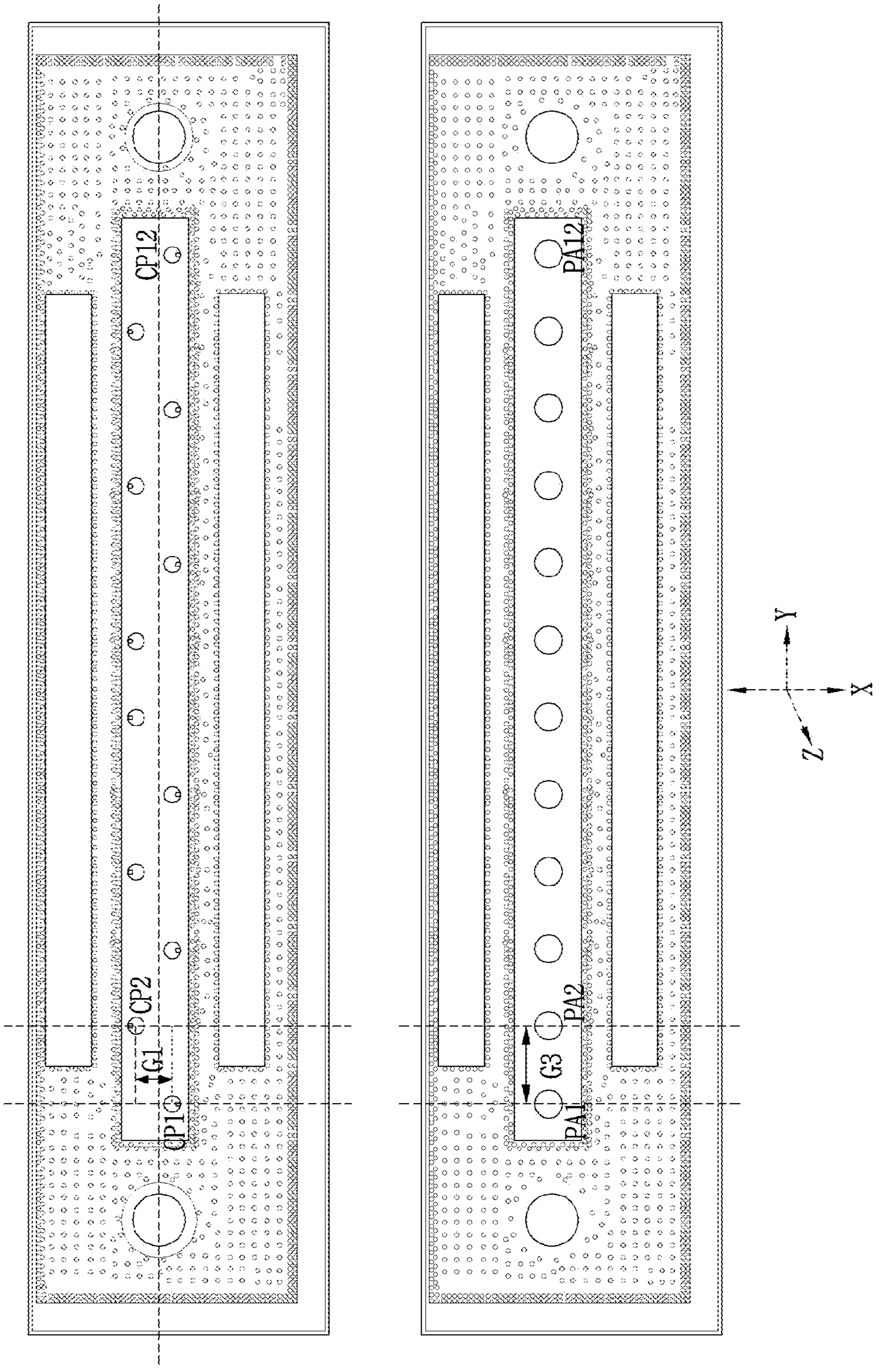
FIG. 18A is a diagram illustrating tenth and twelfth layers on which patch antennas of the antenna module of FIG. 16 are stacked.
Figure 18B:
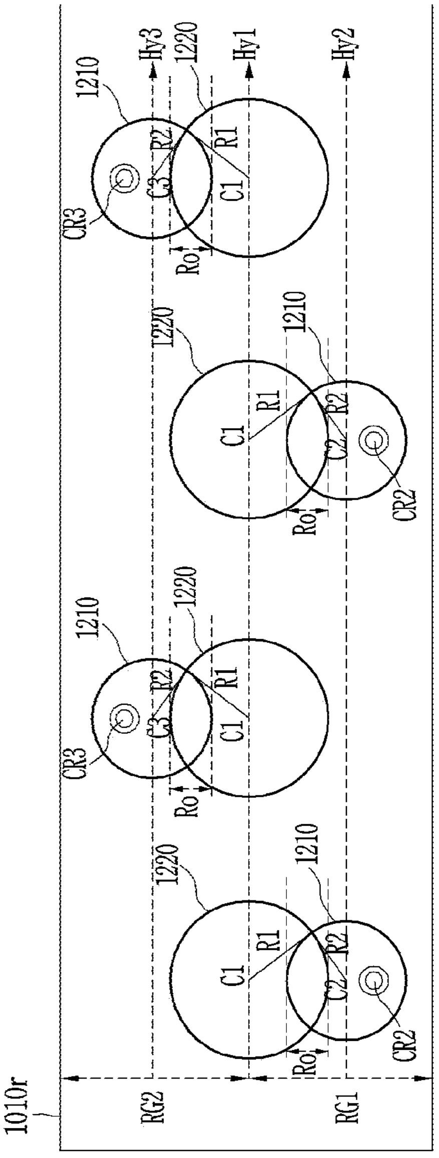
FIG. 18B is a diagram illustrating an overlap disposition structure of patch antennas disposed in an array antenna disposition region of the antenna module of FIG. 16.

Hereinafter, a description will be given of a patch antenna disposition structure of an antenna module 1000 implemented as a multi-layered antenna package according to the present disclosure. In this regard, FIG. 18A is a diagram illustrating tenth and twelfth layers on which patch antennas of the antenna module of FIG. 16 are stacked. FIG. 18B is a diagram illustrating an overlap disposition structure of patch antennas disposed in an array antenna disposition region of the antenna module of FIG. 16.

Referring to FIG. 18A, the first patch antennas PA1 PA12 may be disposed equally at a third gap G3. Distances between the second patch antennas CP1 to CP12 may be equal to the third gap G3 on the X axis. On the other hand, the second patch antennas CP1 to CP12 may be disposed at a first gap G1 on the X axis. The first gap G1 may be shorter (narrower) than the third gap G3.

Referring to FIG. 18B, the first patch antennas 1220 may be disposed on a first horizontal axis Hy1 corresponding to the center of the array antenna disposition region 1010*r*. Among the second patch antennas 1210, the centers of patch antennas of a first group may be aligned in a second vertical axis Hy2 and disposed in the first region RG1. The second horizontal axis Hy2 may be disposed in the first region RG1 at a predetermined distance from the first horizontal axis Hy1. Among the second patch antennas 1210, the centers of patch antennas of a second group may be aligned in a third vertical axis Hy3 and disposed in the second region RG2. The third horizontal axis Hy3 may be disposed in the second region RG2 at a predetermined distance from the first horizontal axis Hy1.

The first patch antenna 1220 may be configured as a circular patch antenna having a first diameter R1. The second patch antenna 1210 may be configured as a circular patch antenna having a second diameter R2 smaller than the first diameter R1. The first patch antenna 1220 and the second patch antenna 1210 may be disposed to have an overlap region Ro in an arcuate shape (i.e., arcuate region) in a vertical axial direction. The overlap region Ro between the first patch antenna 1220 and the second patch antenna 1210 belonging to the first group may be disposed in the first region RG1. The overlap region Ro between the first patch antenna 1220 and the second patch antenna 1210 belonging to the second group may be disposed in the second region RG2. The length of the overlap region Ro between the first and second patch antennas 1210 and 1220 may be shorter than a radius R2 of the second patch antenna 1210.

Upon connecting to the connection region CR2, CR3 through the feed via at an offset point, for example, a top/bottom point of the second patch antenna 1210, a polarization of electronic waves radiated from the second patch antenna 1210 is formed only in top and bottom directions. The connection region CR2, CR3 is formed at an offset point by a predetermined distance from the center point of the second patch antenna 1210.

A current distribution in a region adjacent to the connection region CR2, CR3 appears higher than that in the surrounding region. A mode formed on the second patch antenna on which the current distribution is made in the top and bottom directions is a TE11 mode.

The connection region CR2, CR3 may be formed on the second patch antenna 1210 in a direction away from the center of the second patch antenna 1210 in the X-axis direction. Therefore, the current generated on the second patch antenna 1210 in the top and bottom directions produces a dominant current distribution. Accordingly, the antenna elements including the first and second patch antennas 1210 and 1220 operate in the TE11 mode. This increases top and bottom co-polarization radiation performance, other than left and right cross-polarization, thereby improving antenna gain performance.

Left and right current components are attenuated by the TE 11 mode, so as to substantially disappear. Therefore, the co-polarization radiation performance corresponding to vertical polarization increases and the antenna gain is improved. Also, the cross-polarization component can be reduced, and thus data throughput performance improvement can be expected by virtue of MIMO performance improvement.

Hereinafter, an antenna module implemented as a multi-layered package according to one aspect of the present disclosure will be described. The multi-layered package includes a plurality of array antennas having a plurality of coplanar waveguide structures. In this regard, a description will be given of an antenna module implemented as a multi-layered antenna package including a plurality of array antennas with a plurality of coplanar waveguide structures, with reference to FIGS. 4 to 18B.

The antenna module 1000 may include a PCB 1010, an RFIC 1400, a first array antenna 1100*a*, a second array antenna 1300, and a third array antenna 1200. The antenna module 1000 may further include a first coplanar waveguide WG1, a second coplanar waveguide WG2, and a third coplanar waveguide WG3.

The PCB 1010 may include a plurality of layers. The RFIC 1400 is disposed on the first surface S1 of the outermost surfaces of the PCB 1010. The first array antenna 1100*a* is disposed on the second surface S2 perpendicular to the first surface S1 among the outermost surfaces of the PCB 1010. The second array antenna 1300 is disposed on the third surface S3 perpendicular to the first surface S1 and the second surface S2 among the outermost surfaces of the PCB 1010. The third array antenna 1200 is disposed on the fourth surface S4 perpendicular to the second surface S2 and the third surface S3 among the outermost surfaces of the PCB 1010.

The first surface S1 and the fourth surface S4 form opposing surfaces. The second surface S2 and the third surface S3 are formed between the first surface S1 and the fourth surface S4. The plurality of layers include a plurality of ground layers and layers on which a plurality of coplanar waveguides are formed. The plurality of layers may be stacked from the first layer La1 to the twelfth layer La12. The first surface S1 forms one surface of the first layer La1 among the plurality of layers. The second layer La2 forming the first ground layer GND1 among the plurality of ground layers is formed on a surface opposite to the first surface S1 of the first layer La1.

The third layer La3 stacked on the second layer La2 includes a first coplanar waveguide WG1. The first coplanar waveguide WG1 may include first signal lines Fa1 to Fa3 and a first ground region GP1. The first signal lines Fa1 to Fa3 and the first ground region GP1 may be electrically connected to the first array antenna 1100*a*.

The fourth layer La4 stacked on the third layer La3 forms the second ground layer GND2. The fifth layer La5 stacked on the fourth layer La4 includes a second coplanar waveguide WG2. The second coplanar waveguide WG2 may include second signal lines Fb1 to Fb3 and a second ground region GP2. The second signal lines Fb1 to Fb14 and the second ground region GP2 may be electrically connected to the second array antenna 1300.

The sixth layer La6 stacked on the fifth layer La5 forms the third ground layer GDN3. The seventh layer La7 stacked on the sixth layer La6 includes a third coplanar waveguide WG3. The third coplanar waveguide WG3 includes third signal lines Fc1 to Fc12 and a third ground region GP3. The third signal lines Fc1 to Fc12 and the third ground region GP3 are electrically connected to the third array antenna 1200. Therefore, the first coplanar waveguide WG1, the second coplanar waveguide WG2, and the third coplanar waveguide WG3 may be isolated by the ground layers GND1, GND2, and GND3 to thus minimize mutual interference.

A plurality of fourth ground layers GND4 and a plurality of non-metal regions defined in inner regions of the plurality of fourth ground layers GND4 are disposed on the eighth layer La8 to the twelfth layer La12 stacked on the seventh layer La7. The third array antenna 1200 is formed in the non-metal region of the twelfth layer La12.

Meanwhile, the second surface S2 of the outermost surfaces of the PCB 1010 may include a first array antenna disposition region 1010*r*1 and a region forming a first ground wall 1151 by the respective ground layers disposed on the plurality of layer. Accordingly, the first ground wall 1151 may operate as a reflector for the first array antenna 1100*a*. Accordingly, interference between the first array antenna 1100*a* and other array antennas can be reduced.

First connection lines CL1 may be formed to electrically connect the first array antenna 1100*a* and the RFIC 1400. The first connection lines CL1 may include first horizontal lines HL1 formed on the first layer La1, first vertical lines VL1 vertically connecting the first layer La1 to the third layer La3, and first coplanar waveguides WG1 formed on the third layer La3. The first horizontal lines HL1 may have a first equal length, the first coplanar waveguides WG1 may have a second equal length, and the first connection lines CL1 may have the same length. Accordingly, lengths from the RFIC 1400 to the elements of the first array antenna 1100*a* may be the same. Accordingly, phases of wireless signals applied to the first array antenna 1100*a* can be controlled equally.

Meanwhile, the antenna module 1000 implemented as the multi-layered package according to the present disclosure may be configured to further include a fourth array antenna 1100*b*. The fourth array antenna 1100*b* may be disposed on the fifth surface S5 perpendicular to the third surface S3 and the fourth surface S4 among the outermost surfaces of the PCB 1010. The second surface S2 and the fifth surface S5 form opposing surfaces.

Ground walls may be formed in the antenna module 1000 implemented as the multi-layered package according to the present disclosure to reduce interference between array antennas. In this regard, the third surface S3 of the outermost surfaces of the PCB 1010 may include a second array antenna disposition region 1010*r*2 and a region forming a second ground wall 1152 by the respective ground layers disposed on the plurality of layers. Accordingly, the second ground wall 1152 may operate as a reflector for the second array antenna 1300. Accordingly, interference between the second array antenna 1300 and other array antennas can be reduced.

Second connection lines CL2 may be formed to electrically connect the second array antenna 1300 and the RFIC 1400. The second connection lines CL2 may include second horizontal lines HL2 formed on the first layer La1, second vertical lines VL2 vertically connecting the first layer La1 to the fifth layer La5, and second coplanar waveguides WG2 formed on the fifth layer La5. The second vertical lines VL2 have a third equal length, and the second coplanar waveguides WG2 have a fourth equal length. Accordingly, the second connection lines CL2 may have the same length. Accordingly, lengths from the RFIC 1400 to the elements of the second array antenna 1300 may be the same. Accordingly, phases of wireless signals applied to the second array antenna 1300 can be controlled equally.

The second coplanar waveguides WG2 may be provided by an even number and form a left-right symmetrical structure with respect to the X-axis. In order to form the same length from the RFIC 1400 to each element of the second array antenna 1300, the second coplanar waveguides WG2 may be provided by an even number and form a left-right symmetrical structure with respect to the X-axis.

The second array antenna 1300 may include 14 antenna elements. The second coplanar waveguides WG2 may include first to fourteenth waveguides. The first waveguide may include a first line Fb1 among the second signal lines and ground patterns GL and GR disposed on both sides. The fourteenth waveguide may include a fourteenth line Fb14 among the second signal lines and ground patterns disposed on both sides.

Four pins disposed in the first region Sd1 of the RFIC 1400 may be electrically connected to the first to fourth antenna elements DA1 to DA4 of the second array antenna 1300 by the first to fourth waveguides among the second coplanar waveguides WG2. Four pins disposed in the second region Sd2 of the RFIC 1400 may be electrically connected to the fifth, sixth, ninth, and tenth antenna elements DA5, DA6, DA9, and DA10 of the second array antenna 1300 by the fifth, sixth, ninth, and tenth waveguides among the second coplanar waveguides WG2. Four pins disposed in the third region Sd3 of the RFIC 1400 may be electrically connected to the eleventh to fourteenth antenna elements DA11 to DA14 of the second array antenna 1300 by the eleventh to fourteenth waveguides among the second coplanar waveguides WG2. Two pins disposed in the fourth region Sd4 of the RFIC 1400 may be electrically connected to the seventh and eighth antenna elements DA7 and DA8 of the second array antenna 1300 by the seventh and eighth waveguides among the second coplanar waveguides WG2.

The first region Sd1 and the third region Sd3 of the RFIC 1400 may be disposed opposite to each other. The second region Sd2 and the fourth region Sd4 of the RFIC 1400 may be disposed opposite to each other. Two pins in the fourth region Sd4 of the RFIC 1400 may form the shortest distance from the seventh and eighth antenna elements of the second array antenna 1300. The second coplanar waveguides WG2 may form a left-right symmetrical structure with respect to the central axis of the seventh and eighth antenna elements of the second array antenna 1300. The second coplanar waveguides WG2 may be formed in the X-axis direction, and the first coplanar waveguides may be formed in the Y-axis direction. Therefore, the first and second coplanar waveguides WG2 can be disposed at positions perpendicular to each other while being isolated by the ground layers. Accordingly, end portions of the first and second signal lines constituting the first and second coplanar waveguides WG1 and WG2 may be disposed perpendicular to each other, so that mutual interference between orthogonal signals can be minimized.

The third array antenna 1200 disposed on the fourth surface S4 of the outermost surfaces of the PCB 1010 may include a plurality of antenna elements. Each of the plurality of antenna elements may have a structure with two patch antennas. The first patch antenna 1220 of the two patch antennas may be disposed on the fourth surface S1 of the PCB 1010. The second patch antenna 1210 of the two patch antennas may be spaced apart from the first patch antenna 1220 and may be disposed on any one of the plurality of layers inside the PCB 1010. A portion of the first patch antenna 1220 and a portion of the second patch antenna 1210 may be stacked to overlap each other.

The fourth surface S4 of the outermost surfaces of the PCB 1010 may be formed of a metal layer connected to the ground. An inner region of the metal layer may be formed as a non-metal region where the first patch antenna 1220 is disposed. The non-metal region of the PCB 1010 may form a first inner space VR1. The first inner space VR1 may be the same region as the non-metal region of the PCB 1010. The first vertical region which is defined from the outermost surface of the PCB 1010 to the ground layer formed on the top of the inner layer where the third coplanar waveguides WG3 are disposed inside the PCB 1010 may form the first inner space VR1 formed of a dielectric material.

The second patch antenna 1210 may be disposed on the tenth layer of the first inner space VR1. The outer peripheral surface of the first inner space VR1 may form third ground walls GV1 and GV2 where the grounds of each layer are connected through vias. Therefore, the third ground walls GV1 and GV2 may operate as a reflector for the third array antenna 1200. Accordingly, interference between the third array antenna 1200 and other array antennas can be reduced.

Meanwhile, third connection lines may be formed to electrically connect the third array antenna 1200 and the RFIC 1400. The third connection lines CL3 may include third horizontal lines SL1, third vertical lines SL2, third coplanar waveguides WG3, and fourth vertical lines SL4. The third horizontal lines SL1 may be formed on the first layer La1. The third vertical lines SL2 may vertically connect from the first layer La1 to the seventh layer La7. The third coplanar waveguides WG3 may be formed on the seventh layer La7. The fourth vertical lines SL4 may vertically connect the third coplanar waveguides WG3 and the second patch antennas 1210.

A first length R1, which is the radius of the first patch antenna 1220, may be longer than a second length R2, which is the radius of the second patch antenna. The center of the second patch antenna 1210, the center of the first patch antenna 1220, and a feed region CR2, CR3 of the second patch antenna, to which the fourth vertical line is connected may be disposed on a straight line.

The third vertical lines SL2 may have a fifth equal length, the second coplanar waveguides WG2 may have a sixth equal length, and the fourth vertical lines SL4 may have a seventh equal length. Thus, the third connection lines CL3 may have the same length. Therefore, lengths from the RFIC 1400 to the elements of the third array antenna 1200 may be the same. Accordingly, phases of wireless signals applied to the third array antenna 1200 can be controlled equally.

The third horizontal lines SL1 formed on the first layer La1 may form a plurality of signal connection lines. Among the plurality of signal connection lines, a first group of third horizontal lines SL1 electrically connected to the second patch antennas 1210 may be disposed in the first region RG1 with respect to the first horizontal axis. Among the plurality of signal connection lines, a second group of third horizontal lines SL1 electrically connected to the second patch antennas 1210 may be disposed in the second region RG2 with respect to the first horizontal axis.

The third coplanar waveguides WG3 formed on the seventh layer La7 may form a plurality of signal connection lines. Among the plurality of signal connection lines, a first group of third coplanar waveguides WG3 electrically connected to the second patch antennas 1210 may be disposed in the first region RG1 with respect to the first horizontal axis. Among the plurality of signal connection lines, a second group of third coplanar waveguides WG3 electrically connected to the second patch antennas 1210 may be disposed in the second region RG2 with respect to the first horizontal axis.

The third coplanar waveguides WG3 may be provided by an even number and form a left-right symmetrical structure with respect to the X-axis. In order to form the same length from the RFIC 1400 to each element of the third array antenna 1200, the third coplanar waveguides WG3 may be provided by an even number and form a left-right symmetrical structure with respect to the X-axis.

The third array antenna 1200 may include twelve antenna elements. The third coplanar waveguides WG3 may include first to twelfth waveguides. The first waveguide may include a first line Fc1 among the third signal lines and ground patterns GL and GR disposed on both sides. The twelfth waveguide may include a twelfth line Fc12 among the third signal lines and ground patterns disposed on both sides.

Six pins disposed in the second region Sd2 of the RFIC 1400 may be electrically connected to the second, fourth, sixth, seventh, ninth, and eleventh antenna elements of the third array antenna 1200 by the second, fourth, sixth, seventh, ninth, and eleventh waveguides disposed in the first region RG1 among the third coplanar waveguides WG3. Six pins disposed in the fourth region Sd4 of the RFIC 1400 may be electrically connected to the first, third, fifth, eighth, tenth, and twelfth antenna elements of the third array antenna 1200 by the first, third, fifth, eighth, tenth, and twelfth waveguides disposed in the second region RG2 among the third coplanar waveguides WG3.

The third coplanar waveguides WG3 disposed in the first region RG1 and the third coplanar waveguides WG3 disposed in the second region RG2 may form a vertically asymmetric structure with respect to the Y axis. The third coplanar waveguides WG3 disposed in the first region RG1 may form a left-right symmetrical structure with respect to the X-axis. The third coplanar waveguides WG3 disposed in the second region RG1 may form a left-right symmetrical structure with respect to the X-axis.

The foregoing description has been given of an antenna module implemented as a multi-layered package having a structure with a plurality of coplanar waveguides according to one aspect of the present disclosure. Hereinafter, a description will be given of an electronic device having a communication module implemented as a multi-layered package having a structure with a plurality of coplanar waveguides according to another aspect of the present disclosure.

In this regard, a description will be given of an electronic device having a communication module implemented as a multi-layered package having a structure with a plurality of coplanar waveguides, with reference to FIGS. 1 to 18B. The electronic device 200 may be configured to include a display panel 260, a communication module, and a controller. An RF reception module 240 and a processor 290 of the electronic device 200 may correspond to a communication module 240 and a controller 290, respectively.

The communication module 240 may be configured to wirelessly receive signals for images and information from an external device. The controller 290 may be configured to convert the signal received from the communication module 240 and provide the converted signal to the display panel 260. The communication module 240 may be configured to include a transceiver circuitry 1400, and first, second, and third antenna resonating elements 1100*a*, 1300, and 1200.

The communication module 240 may correspond to the antenna module 1000. The communication module 240 of the electronic device 200 (or antenna module 1000) may further include a first coplanar waveguide WG1, a second coplanar waveguide WG2, and a third coplanar waveguide WG3.

The first coplanar waveguide WG1 may be configured to transmit signals at frequencies between 10 GHz and 300 GHz between the transceiver circuitry 1400 and the first antenna resonating elements 1100*a*. The second coplanar waveguide WG2 may be configured to transmit signals at frequencies between 10 GHz and 300 GHz between the transceiver circuitry 1400 and the second antenna resonating elements 1300. The third coplanar waveguide WG3 may be configured to transmit signals at frequencies between 10 GHz and 300 GHz between the transceiver circuitry 1400 and the third antenna resonating elements 1200.

The first coplanar waveguide WG1 may be interposed between the second coplanar waveguide WG2 and the transceiver circuitry 1400. The second coplanar waveguide WG2 may be interposed between the first coplanar waveguide WG1 and the third coplanar waveguide WG3. The third coplanar waveguide WG3 may be interposed between the second coplanar waveguide WG2 and the third antenna resonating element 1200. The third antenna resonating element 1200 may be disposed on an opposite side of the transceiver circuitry 1400.

Meanwhile, the controller 290 may select specific antenna resonating elements based on signal strength measurement received from an external device. In this regard, the controller 290 may measure signal strength when signals received from an external device are received in the first, second, and third antenna resonating elements 1100*a*, 1300, and 1200. The controller 290 may select antenna resonant elements with the highest signal strength and control them to receive signals.

Figure 19:
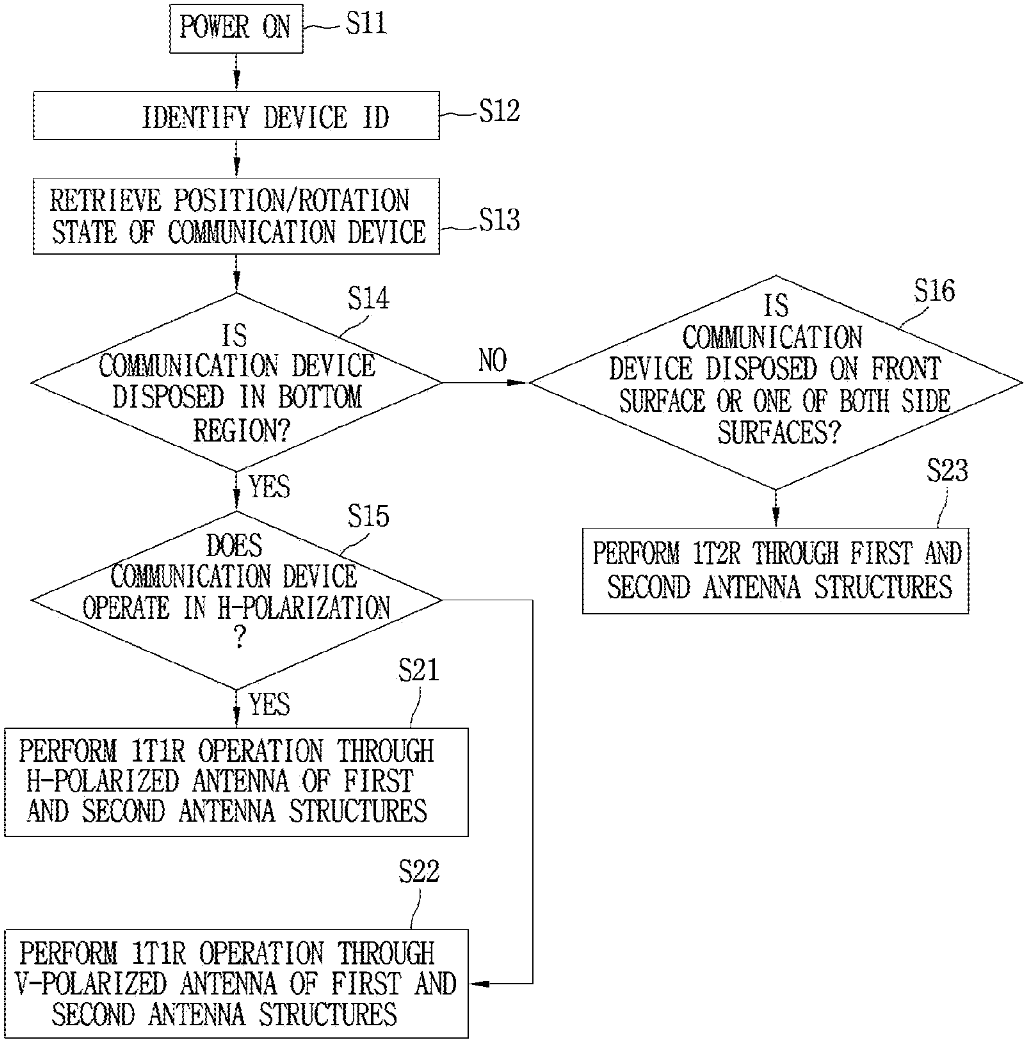
FIG. 19 is a flowchart illustrating an operation of an electronic device of transmitting and receiving wireless signals to and from a communication device according to the present disclosure.

Meanwhile, the controller 290 may select specific antenna resonating elements by using two or more antenna structures (modules). In this regard, FIG. 19 is a flowchart illustrating an operation of an electronic device of transmitting and receiving wireless signals to and from a communication device according to the present disclosure. A method in which the electronic device 200 according to the present disclosure receives or transmits wireless signals through a plurality of array antennas having first and second antenna structures will be described with referring to FIG. 19.

A method of changing or restoring an A/V signal transmission/reception beam according to the present disclosure will be described with reference to FIGS. 1 to 19. When the communication device 100 and the electronic device 200 are powered on (S11), the electronic device 200 may identify a device ID of the communication device 100 (S12). Based on the device ID, the electronic device 200 may perform settings for wireless communication with the communication device 100. The electronic device 200 may retrieve a location where the identified communication device 100 is located and its rotation state (S13).

The electronic device 100 may retrieve in which region the communication device 100 is located among a front region, a bottom region, one side region, and another side region of the electronic device 200. In this regard, the electronic device 200 may determine whether the communication device 100 is disposed in a bottom region of the electronic device 200 (S14). The electronic device 200 may determine whether the communication device 100 is disposed on a front surface or one of both side surfaces of the electronic device 200 (S16).

When the communication device 100 is disposed in the lower region of the electronic device 200, the electronic device 200 may determine whether the communication device 100 operates in horizontal polarization according to the rotation state of the communication device 100 (S15). In this regard, when the communication device 100 is disposed within a predetermined angle range based on 0 (zero) degree, the electronic device 200 may determine that the communication device 100 operates in the horizontal polarization. When the communication device 100 is disposed within a predetermined angle range based on 90 degrees, the electronic device 200 may determine that the communication device 100 operates in a vertical polarization.

When the communication device 100 is disposed in the predetermined range based on zero degree and operates in the horizontal polarization, the electronic device 200 may perform 1T1R operation through a horizontally polarized antenna of the first and second antenna structures 1000*a* and 1000*b* (S21). In this regard, the electronic device 200 may perform the 1T1R operation through the third array antenna 1200 of the first antenna structure 1000*a* which operates as the horizontal polarized antenna (S21).

When the communication device 100 is disposed in the predetermined range based on 90 degrees and operates in the vertical polarization, the electronic device 200 may perform 1T1R operation through a vertically polarized antenna of the first and second antenna structures 1000*a* and 1000*b* (S22). In this regard, the electronic device 200 may perform the 1T1R operation through the third array antenna 1200 of the second antenna structure 1000*b* which operates as the vertically polarized antenna (S22). Accordingly, the communication device 100 and the electronic device 200 may perform the 1T1R operation through either one of the first and second antenna structures 1000*a*, 1000*b*. On the other hand, when the communication device 100 operates in an oblique polarization within a predetermined range based on 45 degrees, the electronic device 200 may perform 1T2R operation through the first and second antenna structures 1000*a* and 1000*b* (S23).

When the communication device 100 is disposed on the front surface or one of both side surfaces of the electronic device 200, the electronic device 200 may operate a diversity operation through the first and second antenna structures 1000*a* and 1000*b* (S23). Accordingly, a diversity operation of transmitting or receiving co-polarization signals may be performed through the first and second antenna structures 1000*a* and 1000*b*.

In summary, when the communication device 100 is not disposed on the front surface or one of both side surfaces of the electronic device 200, the electronic device 200 may perform the 1T1R operation through any one of the first and second antenna structures 1000*a* and 1000*b* (S21, S22). When the communication device 100 is disposed on the front surface or one of both side surfaces of the electronic device 200, the electronic device 200 may operate 1T2R operation through the first and second antenna structures 1000*a* and 1000*b* (S23). Accordingly, the communication device 100 and the electronic device 200 may perform the 1T2R operation through the first and second antenna structures 1000*a*, 1000*b*.

Figure 20:
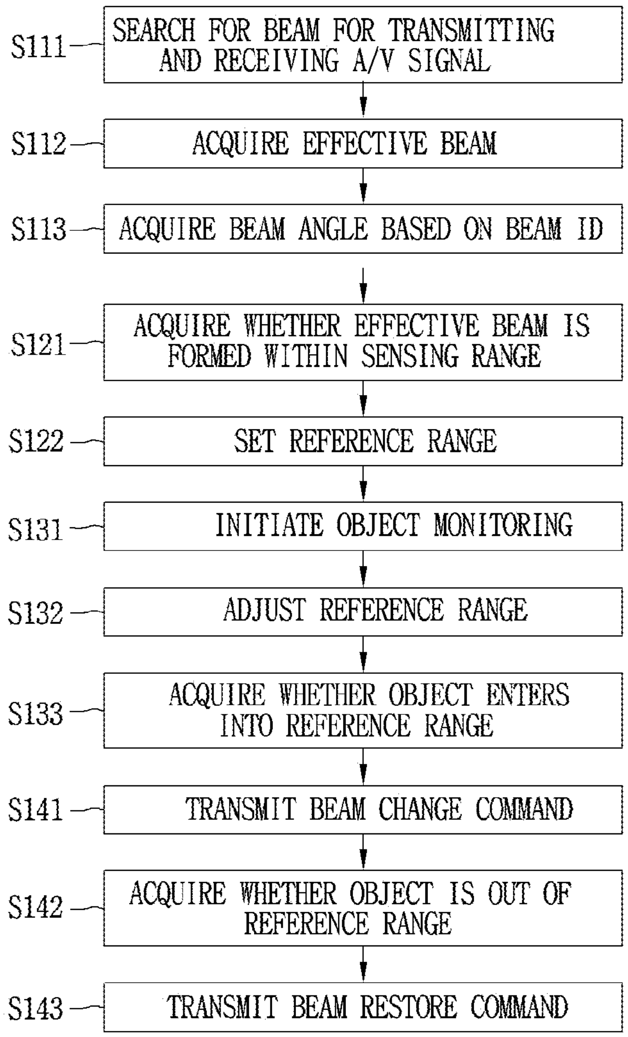
FIG. 20 is a flowchart illustrating a method of selecting, changing, or restoring a wireless beamforming signal, through which an A/V signal is transmitted and received, by an electronic device according to the present disclosure.

Meanwhile, the electronic device according to the present disclosure may appropriately select a plurality of array antennas of the first and second antenna structures based on a location of the communication device, and receive an A/V signal through optimal beamforming. In this regard, FIG. 20 is a flowchart of a method of selecting, changing, or restoring a radio beamforming signal through which an A/V signal is transmitted and received by an electronic device according to the present disclosure. Subsequent to selecting/changing an operating mode of the plurality of array antennas in FIG. 20, a process of selecting, changing, or restoring a beam in FIG. 19 may be performed, but is not limited thereto.

A method of selecting, changing, or restoring, by an electronic device, a radio beamforming signal through which an A/V signal is transmitted/received will be described with reference to FIGS. 1 to 20. The processor 290 may search for a beam that can be formed between the communication device 100 and the electronic device 200 (S111). The processor 290 may acquire all beams that can be formed between the communication device 100 and the electronic device 200 as a result of the search. Meanwhile, all beams may include a pair of beams composed of a transmission beam that transmits an A/V signal in the communication device 100 and a reception beam that receives an A/V signal from the electronic device 200.

In addition, the processor 290 may acquire an effective beam from among the beams 300 searched for that can be formed between the communication device 100 and the electronic device 200 (S112). The effective beam may be at least one beam selected for actually transmitting and receiving an A/V signal from among all beams searched for by the processor 290. Alternatively, the effective beam may be at least one beam that transmits and receives an A/V signal above a minimum transmission rate from among beams 300 that can be formed between the communication device 100 and the electronic device 200.

Furthermore, the processor 290 may acquire a beam angle based on a beam ID (S113). The beam ID may be an ID for identifying each of the beams 300 formed between the communication device 100 and the electronic device 200. The beam angle may include a beam reception angle, which is an angle at a side of the electronic device 200, and a beam transmission angle, which is an angle at a side of the communication device 100. The beam reception angle and the beam transmission angle may be angles measured with respect to an LOS path formed between the communication device 100 and the electronic device 200.

In addition, the processor 290 may acquire whether at least one effective beam is formed within a sensing range of a sensor (not shown) (S121). The sensor (not shown) may acquire at least part or both of the location and speed of an object.

In addition, the processor 290 may set a reference range when it is acquired that an effective beam is formed within a sensing range of a sensor (not shown) (S122). The reference range may be a range in which an A/V signal transmission/reception failure is expected to occur during object monitoring, which will be described later. The reference range may be a reference range for the processor 290 to transmit a beam change command or a beam restore command during object monitoring, which will be described later.

In addition, the processor 290 may initiate object monitoring (S131). Object monitoring may be an operation of monitoring at least part or both of the location and speed of an object located between the communication device 100 and the electronic device 200.

Meanwhile, the processor 290 may adjust the set reference range (S132). The processor 290 may or may not adjust the reference range according to the object. That is, step S132 may be an omissible step according to an embodiment. The processor 290 may adjust the reference range set in step S122. For example, the processor 290 may acquire a speed of an object and adjust a reference range based on the speed of the object.

The electronic device 200 according to an embodiment of the present disclosure may adjust a width of the reference range in real time in consideration of the speed of an object so as to maximize a time period during which an A/V signal is transmitted through a main beam having a fast transmission speed, thereby maximizing transmission efficiency as well as minimizing an A/V signal transmission/reception error. The processor 290 may acquire whether an object enters the reference range (S142).

When it is acquired that the object does not enter the reference range, the processor 290 may continuously acquire whether the object enters into the reference range without transmitting a beam change command.

Meanwhile, the processor 290 may transmit a beam change command to the communication device 100 when it is acquired that the object enters the reference range (S141). The beam change command may be a command for changing a beam for transmitting and receiving an A/V signal. According to the beam change command, any one of effective beams may be changed to a beam that transmits and receives an A/V signal. According to a beam change command, a beam selected as a beam that transmits and receives an A/V signal may be a sub-beam.

In this regard, when an object enters the reference range and wireless communication performance on a LOS path between the communication device 100 and the electronic device 200 deteriorates, a wireless link may be formed through another path. The electronic device 200 may form a wireless link to reflect a wireless signal transmitted from the communication device 100 through a ceiling or wall surface.

Meanwhile, the processor 290 may acquire whether the object is out of the reference range (S142). The processor 290 may acquire whether the object is out of the reference range after the object enters the reference range and the beam is changed.

When it is acquired that the object is not out of the reference range, the processor 290 may continuously acquire whether the object is out of the reference range without transmitting a beam restore command. Meanwhile, the processor 290 may transmit a beam restore command to the communication device 100 when it is acquired that the object is out of the reference range (S143).

As described above, the electronic device 200 may receive a wireless signal by selecting a specific array antenna, which has specific antenna resonating elements, within one or more antenna structures (modules). In this regard, the electronic device 200 may receive a wireless signal by selecting a specific array antenna with a specific polarization.

In this regard, a method for receiving a wireless signal by selecting a specific array antenna with a specific polarization will be described with reference to FIGS. 4 to 19. The first and second array antennas 1100*a* and 1200 are configured as horizontally polarized antennas. The first and second antenna resonating elements 1100*a* and 1300 constitute the first and second array antennas 1100*a* and 1200. Signals received through the first and second array antennas 1100*a* and 1200 are signals received in a direction parallel to the bottom surface of the display panel 260.

Meanwhile, the third array antenna 1200 may be configured as a horizontally polarized antenna or a vertically polarized antenna. The third antenna resonating elements 1200 constitute the third array antenna 1200. When the third array antenna 1200 is configured as a horizontally polarized antenna, the signal received through the third array antenna 1200 is a signal received in a direction horizontal to the rear surface of the display panel 260. When the third array antenna 1200 is configured as a vertically polarized antenna, the signal received through the third array antenna 1200 is a signal received in a direction vertical to the rear surface of the display panel 260.

Meanwhile, a beam direction may be formed on different paths through the second array antenna 1300 disposed in the forward direction of the electronic device 200. When the beam of a signal received through the second array antenna 1300 is formed on a first path, the signal may not be received during the signal reception. The electronic device 200 may control the controller 290 to change the path of the beam (forming) direction of the signal received through the second array antenna 1300 to a second path. In this regard, the beamforming direction of the second array antenna 1300 may be changed to the horizontal axis direction. Additionally, by arranging the plurality of second array antennas 1300 even in the vertical axis direction, the beamforming directions of the second array antennas 1300 may be changed even to the vertical axis direction.

Meanwhile, the communication module 240 of the electronic device 200 may be implemented as the PCB 1010 including a plurality of layers of a multi-layered package structure. The RFIC 1400, which is a transceiver circuitry, is disposed on the first surface S1 of the outermost surfaces of the PCB 1010. The first array antenna 1100*a* is disposed on the second surface S2 perpendicular to the first surface S1 among the outermost surfaces of the PCB 1010. The second array antenna 1300 is disposed on the third surface S3 perpendicular to the first surface S1 and the second surface S2 among the outermost surfaces of the PCB 1010. The third array antenna 1200 is disposed on the fourth surface S4 perpendicular to the second surface S2 and the third surface S3 among the outermost surfaces of the PCB 1010.

Meanwhile, in the present disclosure, ground walls may be disposed in the communication module 240 of the electronic device 200 to reduce interference between array antennas. The second surface S2 of the outermost surfaces of the PCB 1010 may include a first array antenna disposition region 1010*r*1 and a region forming a first ground wall 1151 by the respective ground layers disposed on the plurality of layers. Accordingly, the first ground wall 1151 may operate as a reflector for the first array antenna 1100*a*. Accordingly, interference between the first array antenna 1100*a* and other array antennas can be reduced.

In this regard, the third surface S3 of the outermost surfaces of the PCB 1010 may include a second array antenna disposition region 1010*r*2 and a region forming a second ground wall 1152 by the respective ground layers disposed on the plurality of layers. Accordingly, the second ground wall 1152 may operate as a reflector for the second array antenna 1300. Accordingly, interference between the second array antenna 1300 and other array antennas can be reduced.

Meanwhile, the communication module 240 of the electronic device 200 according to the present disclosure may be configured to further include a fourth array antenna 1100*b*. The fourth array antenna 1100*b* may be disposed on the fifth surface S5 perpendicular to the third surface S3 and the fourth surface S4 among the outermost surfaces of the PCB 1010. The second surface S2 and the fifth surface S5 form opposing surfaces.

Meanwhile, the communication module 240 of the electronic device 200 according to the present disclosure may have a plurality of connection lines connecting the plurality of array antennas and the RFIC 1400. In this regard, first connection lines CL1 may be formed to electrically connect the first array antenna 1100*a* and the RFIC 1400. The first connection lines CL1 may include first horizontal lines HL1 formed on the first layer La1, first vertical lines VL1 vertically connecting the first layer La1 to the third layer La3, and first coplanar waveguides WG1 formed on the third layer La3.

The first horizontal lines HL1 may have a first equal length, the first coplanar waveguides WG1 may have a second equal length, and thus the first connection lines CL1 may have the same length. Accordingly, lengths from the RFIC 1400 to the elements of the first array antenna 1100*a* may be the same. Accordingly, phases of wireless signals applied to the first array antenna 1100*a* can be controlled equally.

Second connection lines CL2 may be formed to electrically connect the second array antenna 1300 and the RFIC 1400. The second connection lines CL2 may include second horizontal lines HL2 formed on the first layer La1, second vertical lines VL2 vertically connecting the first layer La1 to the fifth layer La5, and second coplanar waveguides WG2 formed on the fifth layer La5. The second vertical lines VL2 have a third equal length, and the second coplanar waveguides WG2 have a fourth equal length. Thus, the second connection lines CL2 may have the same length. Therefore, lengths from the RFIC 1400 to the elements of the second array antenna 1300 may be the same. Accordingly, phases of wireless signals applied to the second array antenna 1300 can be controlled equally.

Third connection lines may be formed to electrically connect the third array antenna 1200 and the RFIC 1400. The third connection lines CL3 may include third horizontal lines SL1, third vertical lines SL2, third coplanar waveguides WG3, and fourth vertical lines SL4. The third horizontal lines SL1 may be formed on the first layer La1. The third vertical lines SL2 may vertically connect from the first layer La1 to the seventh layer La7. The third coplanar waveguides WG3 may be formed on the seventh layer La7. The fourth vertical lines SL4 may vertically connect the third coplanar waveguides WG3 and the second patch antennas 1210.

Meanwhile, the second array antenna 1300 may include fourteen antenna elements. The second coplanar waveguides WG2 may include first to fourteenth waveguides. The first waveguide may include a first line Fb1 among the second signal lines and ground patterns GL and GR disposed on both sides. The fourteenth waveguide may include a fourteenth line Fb14 among the second signal lines and ground patterns disposed on both sides.

Four pins disposed in the first region Sd1 of the RFIC 1400 may be electrically connected to the first to fourth antenna elements DA1 to DA4 of the second array antenna 1300 by the first to fourth waveguides among the second coplanar waveguides WG2. Four pins disposed in the second region Sd2 of the RFIC 1400 may be electrically connected to the fifth, sixth, ninth, and tenth antenna elements DA5, DA6, DA9, and DA10 of the second array antenna 1300 by the fifth, sixth, ninth, and tenth waveguides among the second coplanar waveguides WG2. Four pins disposed in the third region Sd3 of the RFIC 1400 may be electrically connected to the eleventh to fourteenth antenna elements DA11 to DA14 of the second array antenna 1300 by the eleventh to fourteenth waveguides among the second coplanar waveguides WG2. Two pins disposed in the fourth region Sd4 of the RFIC 1400 may be electrically connected to the seventh and eighth antenna elements DA7 and DA8 of the second array antenna 1300 by the seventh and eighth waveguides among the second coplanar waveguides WG2.

The third array antenna 1200 disposed on the fourth surface S4 of the outermost surfaces of the PCB 1010 may include a plurality of antenna elements. Each of the plurality of antenna elements may have a structure with two patch antennas. The first patch antenna 1220 of the two patch antennas may be disposed on the fourth surface S1 of the PCB 1010. The second patch antenna 1210 of the two patch antennas may be spaced apart from the first patch antenna 1220 and may be disposed on any one of the plurality of layers inside the PCB 1010. A portion of the first patch antenna 1220 and a portion of the second patch antenna 1210 may be stacked to overlap each other.

The fourth surface S4 of the outermost surfaces of the PCB 1010 may be formed of a metal layer connected to the ground. An inner region of the metal layer may be formed as a non-metal region where the first patch antenna 1220 is disposed. The non-metal region of the PCB 1010 may form a first inner space VR1. The first inner space VR1 may be the same region as the non-metal region of the PCB 1010. The first vertical region which is defined from the outermost surface of the PCB 1010 to the ground layer formed on the top of the inner layer where the third coplanar waveguides WG3 are disposed inside the PCB 1010 may form the first inner space VR1 formed of a dielectric material.

The second patch antenna 1210 may be disposed on the tenth layer of the first inner space VR1. The outer peripheral surface of the first inner space VR1 may form third ground walls GV1 and GV2 where the grounds of each layer are connected through vias. Therefore, the third ground walls GV1 and GV2 may operate as a reflector for the third array antenna 1200. Accordingly, interference between the third array antenna 1200 and other array antennas can be reduced.

Meanwhile, the plurality of signal connection lines of the third array antenna 1200 disposed in the communication module 240 of the electronic device 200 according to the present disclosure may be implemented as third coplanar waveguides WG3. In this regard, the third coplanar waveguides WG3 formed on the seventh layer La7 may form a plurality of signal connection lines. Among the plurality of signal connection lines, a first group of third coplanar waveguides WG3 electrically connected to the second patch antennas 1210 may be disposed in the first region RG1 with respect to the first horizontal axis. Among the plurality of signal connection lines, a second group of third coplanar waveguides WG3 electrically connected to the second patch antennas 1210 may be disposed in the second region RG2 with respect to the first horizontal axis Hy1.

Meanwhile, in the communication module 240 of the electronic device 200 according to the present disclosure, the third array antenna 1200 may include twelve antenna elements. Six pins disposed in the second region Sd2 of the RFIC 1400 may be electrically connected to the second, fourth, sixth, seventh, ninth, and eleventh antenna elements of the third array antenna 1200 by the second, fourth, sixth, seventh, ninth, and eleventh waveguides disposed in the first region RG1 among the third coplanar waveguides WG3. Six pins disposed in the fourth region Sd4 of the RFIC 1400 may be electrically connected to the first, third, fifth, eighth, tenth, and twelfth antenna elements of the third array antenna 1200 by the first, third, fifth, eighth, tenth, and twelfth waveguides disposed in the second region RG2 among the third coplanar waveguides WG3.

The third coplanar waveguides WG3 disposed in the first region RG1 and the third coplanar waveguides WG3 disposed in the second region RG2 may form a vertically asymmetric structure with respect to the Y axis. The third coplanar waveguides WG3 disposed in the first region RG1 may form a left-right symmetrical structure with respect to the X-axis. The third coplanar waveguides WG3 disposed in the second region RG1 may form a left-right symmetrical structure with respect to the X-axis.

The foregoing description has been given of an antenna module implemented as a multi-layered package and an electronic device having the same. The technical effects of an antenna module implemented as a multi-layered package, and an electronic device having the antenna module according to the present disclosure are as follows.

An aspect of the present disclosure is to provide a structure that minimizes the number of stacked layers as a multi-layered circuit type antenna package for millimeter wave band communication.

Another aspect of the present disclosure is to provide a structure that minimizes a signal phase difference for each patch in a patch array antenna structure for millimeter wave band communication.

Still another aspect of the present disclosure is to provide an antenna module that is capable of transmitting signals to front, bottom, and side regions while being implemented at a low height.

Another aspect of the present disclosure is to provide a structure that minimizes signal interference between a plurality of array antennas.

Further scope of applicability of the present disclosure will become apparent from the following detailed description. It should be understood, however, that the detailed description and specific examples, such as the preferred embodiments of the present disclosure, are given by way of illustration only, since various modifications and alternations within the spirit and scope of the disclosure will be apparent to those skilled in the art. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module comprising:

a printed circuit board (PCB) having a plurality of layers;

a radio frequency integrated circuit (RFIC) disposed on a first surface of a plurality of outermost surfaces of the PCB;

a first array antenna disposed on a second surface, perpendicular to the first surface, of the outermost surfaces of the PCB;

a second array antenna disposed on a third surface, perpendicular to the first surface and second surface, of the outermost surfaces of the PCB; and a third array antenna disposed on a fourth surface, perpendicular to the second surface and third surface, of the outermost surfaces of the PCB, wherein:

the first surface and the fourth surface form opposing surfaces such that the second surface and the third surface are formed between the first surface and the fourth surface, the plurality of layers comprise a plurality of ground layers and layers on which a plurality of coplanar waveguides are disposed, the plurality of layers comprise a first layer to a twelfth layer, the first surface forms one surface of the first layer among the plurality of layers, a second layer forms a first ground layer among the plurality of ground layers on a surface opposite to the first surface of the first layer, a third layer stacked on the second layer has a first coplanar waveguide having a first signal line and a first ground region, the first signal line and the first ground region are electrically connected to the first array antenna, a fourth layer stacked on the third layer forms a second ground layer, a fifth layer stacked on the fourth layer has a second coplanar waveguide having a second signal line and a second ground region, the second signal line and the second ground region are electrically connected to the second array antenna, a sixth layer stacked on the fifth layer forms a third ground layer, a seventh layer stacked on the sixth layer has a third coplanar waveguide having a third signal line and a third ground region, the third signal line and the third ground region are electrically connected to the third array antenna, a plurality of fourth ground layers and a plurality of non-metal regions formed at inner regions of the plurality of fourth ground layers are disposed on eighth to twelfth layers stacked on the seventh layer, and the third array antenna is disposed in a non-metal region of the twelfth layer.

2. The antenna module of claim 1, wherein the second surface of the outermost surfaces of the PCB comprises a first array antenna disposition region, and a region forming a first ground wall by the plurality of ground layers respectively disposed on the plurality of layers.

3. The antenna module of claim 1, wherein:

first connection lines are disposed to electrically connect the first array antenna and the RFIC, the first connection lines respectively comprising first horizontal lines formed on the first layer, first vertical lines vertically connecting the first layer to the third layer, and a plurality of first coplanar waveguide formed on the third layer, and each of the first vertical lines has a first length and each of the plurality of first coplanar waveguides has a second length, such that the first connection lines have equal lengths.

4. The antenna module of claim 1, wherein a fourth array antenna is disposed on a fifth surface, perpendicular to the third surface and the fourth surface, of the outermost surfaces of the PCB, and the second surface and the fifth surface form opposing surfaces.

5. The antenna module of claim 1, wherein the third surface of the outermost surfaces of the PCB comprises a second array antenna disposition region, and a region forming a second ground wall by the ground layers respectively disposed on the plurality of layers.

6. The antenna module of claim 1, wherein:

second connection lines are disposed to electrically connect the second array antenna and the RFIC, and the second connection lines respectively comprising second horizontal lines formed on the first layer, second vertical lines vertically connecting the first layer to the fifth layer, and a plurality of second coplanar waveguides formed on the fifth layer.

7. The antenna module of claim 6, wherein each of the second vertical lines has a third length and each of the plurality of second coplanar waveguides has a fourth length, such that the second connection lines have equal lengths.

8. The antenna module of claim 7, wherein the plurality of second coplanar waveguides are provided in an even number and are symmetrical with respect to an X-axis.

9. The antenna module of claim 8, wherein:

the second array antenna comprises fourteen antenna elements, four pins disposed in a first region of the RFIC are respectively electrically connected to first to fourth antenna elements of the second array antenna by first to fourth waveguides among the plurality of second coplanar waveguides, four pins disposed in a second region of the RFIC are respectively electrically connected to fifth, sixth, ninth, and tenth antenna elements of the second array antenna by fifth, sixth, ninth, and tenth waveguides among the plurality of second coplanar waveguides, four pins disposed in a third region of the RFIC are respectively electrically connected to eleventh to fourteenth antenna elements of the second array antenna by eleventh to fourteenth waveguides among the plurality of second coplanar waveguides, and two pins disposed in a fourth region of the RFIC are respectively electrically connected to seventh and eighth antenna elements of the second array antenna by seventh and eighth waveguides among the plurality of second coplanar waveguides.

10. The antenna module of claim 9, wherein the first region and the third region of the RFIC are disposed opposite to each other, the second region and the fourth region of the RFIC are disposed opposite to each other, the two pins in the fourth region of the RFIC are disposed closest the seventh and eighth antenna elements among the fourteen antenna elements of the second array antenna, and the second coplanar waveguides are symmetrical with respect to a central axis crossing between the seventh and eighth antenna elements of the second array antenna.

11. The antenna module of claim 8, wherein the plurality of second coplanar waveguides are disposed in a direction along the X-axis, and the first coplanar waveguides are disposed in a direction along a Y-axis.

12. The antenna module of claim 1, wherein:

the third array antenna disposed on the fourth surface among the outermost surfaces of the PCB comprises a plurality of third array antenna elements, each of the plurality of third array antenna elements comprises two patch antennas, a first patch antenna of the two patch antennas is disposed on the fourth surface of the PCB, a second patch antenna of the two patch antennas is disposed to be spaced apart from the first patch antenna and is disposed on one of the plurality of layers inside the PCB, and a portion of the first patch antenna and a portion of the second patch antenna are disposed to overlap each other.

13. The antenna module of claim 12, wherein the fourth surface of the outermost surfaces of the PCB is formed of a metal layer connected to a ground, and an inner region of the metal layer is formed as a non-metal region of the plurality of non-metal regions where the first patch antenna is disposed.

14. The antenna module of claim 13, wherein:

the non-metal region of the PCB forms a first inner space defining a first vertical region extending inwardly from an outermost surface of the PCB to a ground layer on which a plurality of third coplanar waveguides are disposed, a second patch antenna is disposed on a tenth layer of the first inner space, and peripheral surfaces of the first inner space form third ground walls wherein respective grounds of layers corresponding to the first inner space are connected by vias.

15. The antenna module of claim 12, wherein:

third connection lines are disposed to electrically connect the third array antenna and the RFIC, and the third connection lines respectively comprise third horizontal lines formed on the first layer, third vertical lines vertically connecting the first layer to the seventh layer, a plurality of third coplanar waveguides formed on the seventh layer, and fourth vertical lines vertically connecting the third coplanar waveguides and the second patch antennas.

16. The antenna module of claim 15, wherein a radius of the first patch antenna is longer than a radius of the second patch antenna, and a center of the second patch antenna, a center of the first patch antenna, and a feed region to which the fourth vertical line is connected are disposed on a straight line.

17. The antenna module of claim 16, wherein the each of the third vertical lines has a fifth length, each of the second coplanar waveguides has a sixth length, and the each of the fourth vertical lines has a seventh equal length, such that the third connection lines have equal lengths.

18. The antenna module of claim 16, wherein the third horizontal lines formed on the first layer form a plurality of first layer signal connection lines, a first group of the third horizontal lines is disposed in a first region of the first layer with respect to a first horizontal axis, and a second group of the third horizontal lines is disposed in a second region of the first layer with respect to the first horizontal axis.

19. The antenna module of claim 15, wherein the third coplanar waveguides formed on the seventh layer form a plurality of seventh layer signal connection lines, a first group of the third coplanar waveguides is disposed in a first region of the seventh layer with respect to a first horizontal axis, and a second group of the third coplanar waveguides is disposed in a second region of the seventh layer with respect to the first horizontal axis.

20. The antenna module of claim 15, wherein the third coplanar waveguides are provided in an even number and are symmetrical with respect to an X-axis.

21. The antenna module of claim 15, wherein:

the third array antenna comprises twelve antenna elements, six pins disposed in a second region of the RFIC are respectively electrically connected to second, fourth, sixth, seventh, ninth, and eleventh antenna elements of the third array antenna by second, fourth, sixth, seventh, ninth, and eleventh waveguides among the plurality of third coplanar waveguides, and six pins disposed in a fourth region of the RFIC are respectively electrically connected to first, third, fifth, eighth, tenth, and twelfth antenna elements of the third array antenna by first, third, fifth, eighth, tenth, and twelfth waveguides among the plurality of third coplanar waveguides.

22. The antenna module of claim 21, wherein third coplanar waveguides disposed in the fourth region and third coplanar waveguides disposed in the second region form a top-bottom asymmetric structure with respect to a Y-axis, the third coplanar waveguides disposed in the fourth region are symmetrical with respect to an X-axis, and the third coplanar waveguides disposed in the second region are symmetrical with respect to the X-axis.

* * * * *